US011991078B2

(12) United States Patent
Simu et al.

(10) Patent No.: US 11,991,078 B2
(45) Date of Patent: *May 21, 2024

(54) ACCESS CONTROL AND OWNERSHIP TRANSFER OF DIGITAL CONTENT USING A DECENTRALIZED CONTENT FABRIC AND LEDGER

(71) Applicant: Eluvio, Inc., Berkeley, CA (US)

(72) Inventors: Serban Simu, Berkeley, CA (US); Michelle Munson, Berkeley, CA (US)

(73) Assignee: Eluvio, Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,810

(22) Filed: Feb. 7, 2023

(65) Prior Publication Data

US 2023/0318972 A1 Oct. 5, 2023

Related U.S. Application Data

(63) Continuation of application No. 17/655,355, filed on Mar. 17, 2022, now Pat. No. 11,606,291, which is a (Continued)

(51) Int. Cl.

*H04L 45/64* (2022.01)
*G06F 9/455* (2018.01)
(Continued)

(52) U.S. Cl.

CPC .......... *H04L 45/64* (2013.01); *G06F 9/45516* (2013.01); *G06F 9/4552* (2013.01); (Continued)

(58) Field of Classification Search

CPC ..... H04L 9/3247; H04L 9/0861; H04L 9/083; H04L 49/25; H04L 67/10; H04L 65/60; (Continued)

(56) References Cited

U.S. PATENT DOCUMENTS

| | | | |
|---|---|---|---|
| 8,832,816 | B2 | 9/2014 | Wright |
| 8,868,915 | B2 | 10/2014 | Counterman |

(Continued)

FOREIGN PATENT DOCUMENTS

| | | | |
|---|---|---|---|
| JP | 6710401 | B1 | 6/2020 |

OTHER PUBLICATIONS

Abu-El-Haija, et al., "YouTube-8M: A Large-Scale Video Classification Benchmark" arXiv preprint arXiv:1609.08675, 2016.

(Continued)

*Primary Examiner* — Amare F Tabor

(74) *Attorney, Agent, or Firm* — Weaver Austin Villeneuve & Sampson LLP

(57) ABSTRACT

Disclosed are examples of systems, apparatus, devices, computer program products, and methods implementing aspects of a decentralized content fabric. In some implementations, one or more processors are configured to provide fabric nodes of an overlay network, including one or more fabric nodes that receive a client's request to access digital content on the overlay network. The request includes an authorization token digitally signed by or on behalf of a user of the client. The fabric node(s) extract a user identifier (ID) from the authorization token, then determine that one or more rules maintained on the overlay network are satisfied. The one or more rules condition access to the digital content upon the extracted user ID matching an ID associated with an owner of a digital instrument. The digital instrument, which can be a non-fungible token, is stored in a blockchain ledger as a unique representation of the digital content.

30 Claims, 57 Drawing Sheets

Related U.S. Application Data continuation-in-part of application No. 16/948,194, filed on Sep. 8, 2020, now abandoned, which is a continuation of application No. 16/840,092, filed on Apr. 3, 2020, now Pat. No. 10,805,084, which is a continuation of application No. 16/655,033, filed on Oct. 16, 2019, now Pat. No. 11,218,409.

(60) Provisional application No. 63/162,447, filed on Mar. 17, 2021, provisional application No. 62/746,475, filed on Oct. 16, 2018.

(51) Int. Cl.

| | |
|---|---|
| ***G06F 21/60*** | (2013.01) |
| ***G06N 20/00*** | (2019.01) |
| ***G06Q 10/10*** | (2023.01) |
| ***G06Q 20/12*** | (2012.01) |
| ***G06Q 20/36*** | (2012.01) |
| ***G06Q 20/38*** | (2012.01) |
| ***G06Q 20/40*** | (2012.01) |
| ***G06Q 50/26*** | (2012.01) |
| ***H04L 9/06*** | (2006.01) |
| ***H04L 9/08*** | (2006.01) |
| ***H04L 9/14*** | (2006.01) |
| ***H04L 9/32*** | (2006.01) |
| ***H04L 9/40*** | (2022.01) |
| ***H04L 41/00*** | (2022.01) |
| ***H04L 45/00*** | (2022.01) |
| ***H04L 45/02*** | (2022.01) |
| ***H04L 45/7453*** | (2022.01) |
| ***H04L 49/15*** | (2022.01) |
| ***H04L 49/25*** | (2022.01) |
| ***H04L 49/60*** | (2022.01) |
| ***H04L 65/60*** | (2022.01) |
| ***H04L 65/612*** | (2022.01) |
| ***H04L 67/104*** | (2022.01) |
| ***H04L 67/1061*** | (2022.01) |
| ***H04L 67/1074*** | (2022.01) |
| ***H04L 67/1087*** | (2022.01) |
| ***H04L 67/568*** | (2022.01) |
| ***H04L 69/325*** | (2022.01) |
| *H04L 9/00* | (2022.01) |
| *H04L 67/01* | (2022.01) |
| *H04L 69/329* | (2022.01) |

(52) U.S. Cl.

CPC ........... *G06F 21/602* (2013.01); *G06N 20/00* (2019.01); *G06Q 10/10* (2013.01); *G06Q 20/1235* (2013.01); *G06Q 20/3674* (2013.01); *G06Q 20/3825* (2013.01); *G06Q 20/3829* (2013.01); *G06Q 20/401* (2013.01); *G06Q 50/265* (2013.01); *H04L 9/0637* (2013.01); *H04L 9/0643* (2013.01); *H04L 9/083* (2013.01); *H04L 9/0861* (2013.01); *H04L 9/14* (2013.01); *H04L 9/3213* (2013.01); *H04L 9/3234* (2013.01); *H04L 9/3239* (2013.01); *H04L 9/3247* (2013.01); *H04L 41/20* (2013.01); *H04L 45/04* (2013.01); *H04L 45/08* (2013.01); *H04L 45/14* (2013.01); *H04L 45/70* (2013.01); *H04L 45/7453* (2013.01); *H04L 49/1553* (2013.01); *H04L 49/25* (2013.01); *H04L 49/602* (2013.01); *H04L 63/0428* (2013.01); *H04L 63/0478* (2013.01); *H04L 65/60* (2013.01); *H04L 65/612* (2022.05); *H04L 67/104* (2013.01); *H04L 67/1065* (2013.01); *H04L 67/1076* (2013.01); *H04L 67/108* (2013.01); *H04L 67/1091* (2013.01); *H04L 67/568* (2022.05); *H04L 69/325* (2013.01); *G06Q 2220/10* (2013.01); *H04L 9/50* (2022.05); *H04L 67/01* (2022.05); *H04L 69/329* (2013.01); *H04L 2209/56* (2013.01)

(58) Field of Classification Search

CPC ....... H04L 41/20; H04L 45/08; H04L 67/104; H04L 49/602; H04L 49/1553; H04L 67/568; H04L 9/14; H04L 63/0428; H04L 9/0637; H04L 45/04; H04L 45/70; H04L 9/3213; H04L 63/102; H04L 7/1065; H04L 67/1076; H04L 45/14; H04L 45/64; H04L 45/7453; H04L 9/3234; H04L 9/3297; H04L 65/612; H04L 63/0478; H04L 67/1091; H04L 9/3239; H04L 9/0643; H04L 63/123; H04L 67/108; H04L 69/325; H04L 67/01; H04L 2209/56; H04L 9/50; H04L 69/329; G06F 9/45516; G06F 21/602; G06F 21/64; G06F 9/4552; G06F 21/10; G06Q 20/3674; G06Q 20/1235; G06Q 20/3829; G06Q 10/10; G06Q 20/401; G06Q 50/265; G06Q 2220/10; G06N 5/01; G06N 20/20; G06N 20/00

USPC .......................................................... 713/176

See application file for complete search history.

(56) References Cited

U.S. PATENT DOCUMENTS

| | | | | |
|---|---|---|---|---|
| 9,270,660 | B2 | 2/2016 | Smith et al. | |
| 9,379,895 | B2 | 6/2016 | Kailash et al. | |
| 10,355,869 | B2 * | 7/2019 | Bisti | H04L 9/0891 |
| 10,797,994 | B1 | 10/2020 | Munson et al. | |
| 10,805,084 | B1 | 10/2020 | Munson et al. | |
| 10,827,416 | B2 | 11/2020 | Lou et al. | |
| 10,873,587 | B2 | 12/2020 | Kuperman et al. | |
| 10,880,200 | B1 | 12/2020 | Munson et al. | |
| 10,917,332 | B1 | 2/2021 | Munson et al. | |
| 10,938,791 | B1 | 3/2021 | Munson et al. | |
| 10,970,411 | B2 * | 4/2021 | Judka | H04L 63/0218 |
| 11,063,864 | B2 | 7/2021 | Munson et al. | |
| 11,063,865 | B2 | 7/2021 | Munson et al. | |
| 11,140,077 | B2 | 10/2021 | Munson et al. | |
| 11,218,409 | B2 | 1/2022 | Munson et al. | |
| 11,233,734 | B2 | 1/2022 | Munson et al. | |
| 11,494,761 | B2 * | 11/2022 | Goeringer | G06F 21/45 |
| 11,606,291 | B2 | 3/2023 | Simu et al. | |
| 2013/0238903 | A1 | 9/2013 | Mizunuma | |
| 2013/0283362 | A1 | 10/2013 | Kress et al. | |
| 2015/0006902 | A1 | 1/2015 | Chang et al. | |
| 2015/0269559 | A1 | 9/2015 | Inotay et al. | |
| 2016/0028547 | A1 | 1/2016 | Yao et al. | |
| 2017/0134161 | A1 * | 5/2017 | Goeringer | G06Q 20/065 |
| 2017/0221029 | A1 | 8/2017 | Lund et al. | |
| 2018/0083971 | A1 | 3/2018 | Brown et al. | |
| 2018/0089651 | A9 * | 3/2018 | Lund | H04L 9/14 |
| 2019/0149550 | A1 | 5/2019 | Brakeville et al. | |
| 2019/0238327 | A1 | 8/2019 | Li et al. | |
| 2021/0092059 | A1 | 3/2021 | Munson et al. | |
| 2021/0092060 | A1 | 3/2021 | Munson et al. | |
| 2022/0210061 | A1 | 6/2022 | Simu et al. | |

OTHER PUBLICATIONS

Arandjelovic, et al., "NetVLAD: CNN architecture for weakly supervised place recognition" Proceedings of the IEEE Conference on Computer Vision and Pattern Recognition, 2016.

Bestavros, Azer: Comprehensive List of Publications, Department of Computer Science, Boston University, Jul. 18, 2018.

(56) References Cited

OTHER PUBLICATIONS

"CBOR" Wikipedia article, https://en.wikipedia.org/wiki/CBOR, 2020.
Chen, et al., "XGBoost: A Scalable Tree Boosting System" Proceedings of the 22nd ACM SIGKDD International Conference on Knowledge Discovery and Data Mining, ACM, pp. 785-794, 2016.
"DPP leads the way at IBC on IMF adoption" Digital Production Partnership, Sep. 2018.
"General Data Protection Regulation (GDPR)" Intersoft Consulting Table of Contents: https://gdpr-info.eu, 2020.
Herbaut, N. et al., "A Model for Collaborative Blockchain-Based Video Delivery Relying on Advanced Network Services Chains", Advances in Network Services Chain, IEEE Communications Magazine, Sep. 2017, pp. 70-76.
International Preliminary Report on Patentability dated Sep. 28, 2023, in Application No. PCT/US2022/020826.
International Search Report and Written Opinion dated Jun. 24, 2022, in PCT Application No. PCT/US2022/020826.
Jacobson, et al., "Networking Named Content" Commun. ACM 55, 2009.
Jordan, et al. "Hierarchical mixtures of experts and the EM algorithm" Neural Computation, vol. 6, Issue 2, Mar. 1994.
Ke, et al., "LightGBM: A Highly Efficient Gradient Boosting Decision Tree" 31st Conference on Neural Information Processing Systems (NIPS), 2017.
Little, Amy, "Named Data Networking—YouTube." https://www.youtube.com/watch?v=W4dPKFDLCP4, Dec. 10, 2014.
Maymounkov, et al., "Kademlia: A Peer-to-peer Information System Based on the XOR Metric" MIT Computer Science and Artificial Intelligence Laboratory (CSAIL) Parallel & Distributed Operating Systems Group (PDOS), Oct. 2002.
McKinnon, John D., "Big Tech Companies to Appear Before Senate to Discuss Privacy" The Wall Street Journal, Sep. 12, 2018.
"Merkle Tree" Wikipedia article, https://en.wikipedia.org/wiki/Merkle_tree, 2020.
Miech, et al., "Learnable pooling with Context Gating for video classification" arXiv preprint arXiv:1706.06905, 2017.
"OV 2067-0:2018—SMPTE Overview Document—Interoperable Master Format" IEEE Xplore, Jun. 25, 2018.
Ramezan, G. et al., "A Survey of Secure Routing Protocols in Multi-Hop Cellular Networks", IEEE Communications Surveys & Tutorials, 2018, vol. 20, No. 4, pp. 3510-3541.
Robertson, et al., "New Evidence of Hacked Supermicro Hardware Found in U.S. Telecom" Bloomberg, Oct. 9, 2018.
Robertson, et al., "The Big Hack: How China Used a Tiny Chip to Infiltrate US Companies" Bloomberg Businessweek, Oct. 4, 2018.
Rowstron, et al., "Pastry: Scalable, decentralized object location and routing for large-scale peer-to-peer systems" IFIP/ACM International Conference on Distributed Systems Platforms (Middleware), Heidelberg, Germany, pp. 329-350, Nov. 2001.
Singer, Natasha, "Just Don't Call It Privacy" The New York Times, Sep. 22, 2018.
Stoica, et al., "Chord: A Scalable Peer-to-peer Lookup Protocol for Internet Applications" MIT CSAIL PDOS, Feb. 2003.
Sutskever, et al., "Seq+B50uence to Sequence Learning with Neural Networks" Advances in Neural Information Processing Systems, 2014.
"The LLVM Compiler Infrastructure" LLVM project: http://llvm.org/, 2020.
"The Zettabyte Era: Trends and Analysis—Cisco" Cisco Visual Networking Index, Jun. 2017.
Tufekci, Zeynep, "How social media took us from Tahrir Square to Donald Trump" MIT Technology Review, Aug. 14, 2018.
U.S. Notice of Allowance dated Nov. 9, 2022 in U.S. Appl. No. 17/655,355.
U.S. Final Rejection dated Oct. 14, 2022, in U.S. Appl. No. 17/655,355.
U.S. Non-Final Office Action dated Jun. 24, 2022, in U.S. Appl. No. 17/655,355.
Wang, C. et al., "Integration of Networking, Caching, and Computing in Wireless Systems: A Survey, Some Research Issues, and Challenges" IEEE Communications Surveys & Tutorials, 2018, vol. 20, No. 1, pp. 7-38.
Xu, Q. et al., "Blockchain-based Decentralized Content Trust for Docker Images", Multimedia Tools and Applications, Jul. 2018, vol. 77, pp. 18223-18248.

* cited by examiner

Assigning Partitions to Nodes

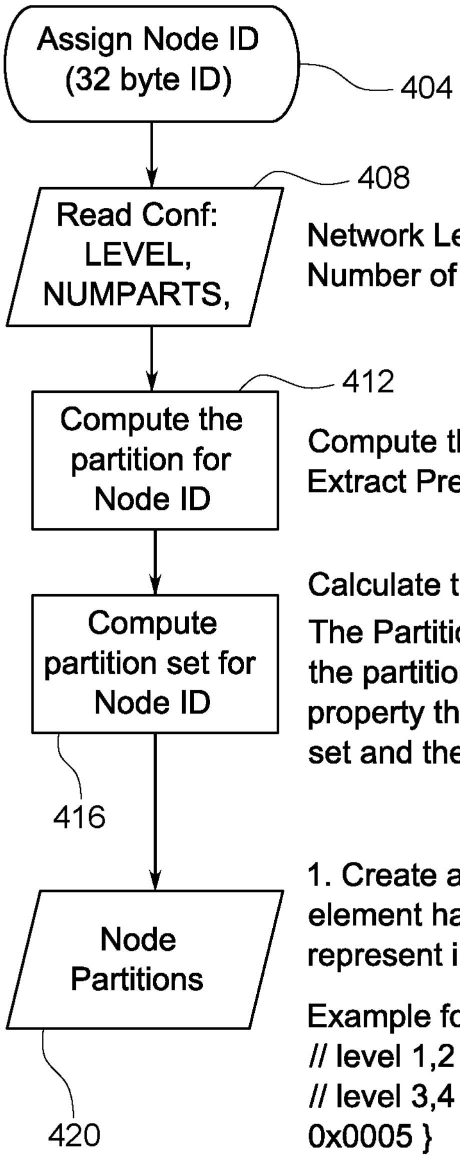

Network Level (LEVEL)
Number of Partitions per Node (NUMPARTS)

Compute the partition for a given node ID (the base partition):
Extract Prefix = First n hex digits of node ID where n= LEVEL Calculate the 'partition set' that the node is responsible for
The Partition set is a set of NUMPARTS partitions, including the partition for the node ID determined above, with the property that the XOR distance between any partition in the set and the base partition for the node is <= NUMPARTS.

1. Create a set of length NUMPARTS - 1, where each element has the same bit-size as the base partition, and represent in order numbers 1 through NUMPARTS - 1.

Example for the partition levels 1 through 6:
// level 1,2 : { 0x00, 0x01, 0x02, 0x03, 0x04, 0x05 }
// level 3,4 : { 0x0000, 0x0001, 0x0002, 0x0003, 0x0004, 0x0005 }
// level 5,6 : { 0x000000, 0x000001, 0x000002, 0x000003, 0x000004, 0x000005 }

2. Compute XOR of the base partition and each of the elements of the set above to find the remaining elements of the partition set:

```
FOR (m=0; m++, m ≤ NUMPARTS - 1)
 Partitions[m] = XOR(BasePartition, PartitionSet[Ml]))
```

FIG. 4

Verification of a sub portion (chunk) of a content object part (when part is "big")

```
-/ELV2/info (master) $ curl
http://localhost:8008/qlibs/ilibKRYmBlvGXzTA2sGdYJm5hi/q/hq__QmdWFbfvLiJyGYi6V
8EzbuAB2xjq4QFfWorNYbudrANW9a/meta | jq
% Total      % Received % Xferd  Average  Speed    Time        Time       Time Current
                                 Dload  Upload    Total       Spent      Left Speed
100    8460      0  8460      0      0     192k        0 --:--:--  --:--:--  --:--:--  196k
{
"id": "iq__Hvkav9kNRHxmdt6pA9iFTt",
"hash": "hq__QmdWFbfvLiJyGYi6V8EzbuAB2xjq4QFfWorNYbudrANW9a",
"type": "hq__QmZeoweblC8JS9XvxdbtziwForbgMUr7gDTUDLyiADPnP9",
"meta": {
"assets": {
"01747a01-2906-4f82-9271-742b3de1968d": "OPL_OPP_IMF_IBC2018_Without_Leader_German.xml",
"2b1Obe23-2b5d-425e-a448-044100fe6545": "DPP_IMF_IBC2018_video_2.mxf",
"43195ef2-d212-4f52-bac3-b7bbb5599493": "DPP_IMF_IBC2018_video_1.mxf",
"49a325ea-3eca-473c-9ee0-da8fb5cad139": "DPP_IMF_I8C2018_EnglishAudio_1_stereo.mxf",
"4bad9785-038b-4b9f-a710-aef47aea211c": "DPP_IMF_IBC2018_video_lead_in.mxf",
"5852225d-f00f-4c76-beb6-97478cfc9acf": "OPL_DPP_IMF_IBC2018_Without_Leader_English.xml",
"8696c1a5-c92f-41d9-89f4-364029c6054": "DPP_IMF_IBC2018_GermanAudio_audio_stereo.mxf",
"a5459644-272b-4789-95bf-818bfe9dc40P: "CPL_CIPP_IMF_IBC2018_trailer_without_lead_in.xml",
"c3753827-7440-4780-aca6-474c71a176df": "PKL_c3753827-7440-4780-aca6-474c71a176df.xml",
"c8594a14-3001-44ae-957b-9bbfbb015706": "CPL_OPP_IMF_IBC2018_with_lead_in.xml",
"cf919e20-0747-4c03-8b0f-89861b8a89ea": "DPP_IMF_IBC2018_EnglishAudio_silence_stereo.mxf",
"f1798564-2ead-4801-8e68-3417d5cf961c": "DPP_IMF_I8C2018_6ermanAudio_silence_stereo.mxf",
"f8d4c364-93e3-4819-b1774115c0040,67": "DPP_IMF_IBC2018_EnglishAudio_2_stereo.mxf"
```

GUiLCiwcmencmFtX2x1bmd0aCI6IlBUMEgwTTIxLj8TIiwiYXVkaW9fc2VxdWVuY2UiOnsicmVzb3VyY2VzIjpbey3IbnRyeV9
wb2ludCI6MCwic291cmNlX2R1cmF0aW9uIjoxMDA4NDAwLCJOaWllbGluZV9lbmQi0jIxIjAsInRpbWVsaW51X3NOYX.
30IjowLCJOcmFjalemaWxlX21kIjoiODY5NmMxYTUtYzky2100MWQ5LTg5ZjQtMzYOYTky0WM2MDUOIiwic6F0aCI6Ii
9Vc2Vycy9taWNoZWxsZS9EZXNrdG9wL01FREIBLEHARilDT138TC9jb3JhbF9y2WVmX2Vzc2VuY2VzLORQUF93TUZ
fSUJDMjAx0F9HZXJtYW58dWRpb19hdWRpb19zd6Vy2W8ubXhmIiwicGhhc2giOm51bGx9XSwic2lkeF9001Ic2Nhb6Ui0
jp4MDAwfSwidmlk2W9fc2VxdWVuY2UiOnsicmVzb3VyY2VzIjpbeyJlbnRyeV9wb2ludCI6MC4wLCJzb3VyY2Vf2HVyYXR
pb24i0jI2MSwid6ltZWxpbmVfZW5kIjoxMC4ONCwidGltZWxpbmVfc3RhcnQi0jAsInRyYWNrX22pb6VfaKi0iI0MzE5NWV
MMilkMjEyLTRmNTItYmEjMy1iN23iYjUlOTkOOTMiLC]wYXRoIjoiLlVz2X)A21pY2h1bGxlLORlc2t0b3AvTUVESUEvSU1
GLUNPUkFML2NvcmFsX37I2W2f2XNz2W5j2XMvREBQX01NR193QkMyMDE4X32p26VvXzEubXhmIiwicGhhc2giOm5
1b6x9lHsiZW5Ocnlfc69pbnQi0jAuMCwic291cmN1X2R1cmF0aW9uIjoyNjQsInRpbWVsaW5lX2VuZCI6MjEuMCwid6ltZW
xpbmVfc3Rhcnpi0jEwLjIZOLC30cmFjal9maWxlX21kIjoiMmIxM631MjMtMmIlZCOOMjVlLWEONDgtYTQOMTAwZmU2N
TQ1IiwicGFOaCI6Ii9Vc2Vycy9taWNoZlftsZS9EZXNrd69wL01FREIBLOINRi1DT1J8TC9jb3JhbF9y2WVmX2Vzc2VuY2V
zLORQUF9JTUZfSUJDMjAx0F92aWRlb18yLm142ilsInBolalloIjpudWxsfV0sIntip2Hhfd61t2XNjWxlIjoyNX0sImF1261vX3
NhbX6s2V9yYXRlIjoOODAwMCwiZnihbWVfcmFOZV9mcmFjd61vbiI6IjIlLzEifSwiZGEzaF9vcHRpb25zIjp7ImF1261vX3R
pbWzY2FsZSI6MTAwHDAwMCwidmlk2W9fdGlt2XNjYWxlIjoaMDAwMDAwfX0K",
"offering.en":
"ey3y2X8y2DilbnRhdGlvblepbm2vIjp7ImF126IvX2NodW5rcyl6MjgyLCandWRpb19y2X8zIjpbeyiuYW1IljoiC3R1cmVvIiwiY
mlOcmFOZSI6MTI4MDAwfV0sImF1ZGlvX3NlZ19kdX3hdGlvb19kYXNoIjo2MDENDAwLjAsImF1ZGlvX3N1Z19kdX3hdGl
vb19z2WNzIjo2LjAxNiwidmlk2W9f2nahbWVzIjoxNTAsInZp26VvX3alcHMiOlt7Indp2HRoIjo2NDAsImShbY/Ui0iIzNjBwIiwi
aGVp22h0IjozNjAsImJpdH3hdGUi0jk2MDAwMHOsey.33aWROaCI6ODUzLCJOW1IljoiNDgwcCIsImhloWdodCIENDgwL
C3iaXRyYXRlIjokMjgwMDAwfSx7Indp2HRoIjoxMjgwLC3unilIljoiNzIwcCIsImhlaWdodCI6NzIwI.C3iaXRyYXRlIjoyNTYwM
DAwfSx7Indp2HRoIjoxOTIM.C3uM1IljoiMTA4MHAiLCJoZWlnaHQ(OjEwODAsimJpdH3hdGUi0jUxMjAwMD89XSwidmlk
ZW9fc2VnX2R1cmF0aW9uX2Rhc2giOjYwMDAwMDAuMCwidmlkZW9fc2VnX2R1cmF0aW9uX3NlY3Mi0jYuMHOsIm9m (C)

```
},
"description": "Demonstration only",
"eluv.access.charge": "4",
"eluv.access.type": "paid",
"eluv.contract_address": "0x475f4dd200721782818b3b4b8e150ael8b05faa3",
"eluv.image": "hqp_QmVffrzLocDfNDAFX8sBuEaA37gTtQUXbmdASuGtbf3YFc",
"eluv.name": "Corals vi",
"eluv.status": "Approved",
"eluv.type": "avmaster2000.imf",
"image": "hqp_QmVffrzlocDfNDAFX8s8uEaAligTtQUXbmdASuGtbf3YFc",
"languages": [
  "de",
  "en",
  "de",
  "en"
],
"name": "Corals vi",
"offering.de":
"ey3y2X8y2XplbnRhdGlvb19pbm2vIjp7ImF126lvX2NodW5rcyI6MjgyICihdWRpb19y2X8zIjpbeyiunlIljoic3R1cmVvIiwiYallOc
mFOZSI6MTI4MDAwfV0sImF126lvX3Nl219kdX]hdGlvb19kYXNoIjo2MDE2MDAwLjAsImF1261vX3Nl219kdX3hd6lvbl9z2W
NzIjo2LjAxpiwidmlk2W9f2nihbWVzIjoxNTAsInZp26VvX33lcHMiOlt7Indp2HRoIjo2NDAsIm5hbni0ilzNj8wIiwia6Vp22h0IjozNj
AsIm7pdHihdGUi0jk2MDAwMHOsey33aWROaCI6ODUzlaulllilljoiNDgwcCIsImhlaWdodCIENDewLCJioXRyYXR1IjoxMjgwM
DAwfSx7Indp2HRoIjoxMjgwICiuYW1IljoiNzIwcCIsImhlaWdodCI6NzIwLClicaRyYXRlIjoyNTYwMDAwfSx7Indp2HRoIjoxOTI
M.C.MW1IljoiMTA4MHAiLCJoZWlnaHQi0jEwODAsIm)pdHAdGUi0jUxMjAwMD89XSwidmlk2W9fc2VnX2R1cmF0aW9uX2R
hc2giOjYwMDAwMDAuMCwidmlk2W9fc2VnX2R1cmF0aW9uX3NlY3Mi0jYuMHOsIm9m2mVyaW5nIjp7ImxhbmdlYWdlIjoiZ
```

2mVyaW5nIjp7ImxhbmdlYWdlIjoi2W4iLC3wcm9ncmFtX2x1bmdeaCI6IMMEgeTIxLj8TIiwiYXVkaW9fc2VxdWVuY2UiOns
icmVzb3VyY2VzIjpbey3lbnRyeV9wb2ludCI6MC4wLC3zb3VyY2Vf2HVyYXRpb24i0jUwMTEyMCwid61t2WxpbmVf2W5kIj
oxMC4ONCwid61t2WxpbmVfc3RhcniliOjAsInRyYWNrX22pb6VfaKi0iI0OWEzMjVlYS0z2WNhLTQ3M2MtOWV1MC1kYT
hmYjVjYWQMzkilawYXRoIjoiLlVz2X32121pY2hlbGxlLORIc2t0b3AvTUVESUEvSU1GLUNPUkFML2NvcmFsX3J1ZW2f2
XNz2W5j2XMvRF8QX0lNR19.)QkMyMDE4X0VuZ2xpc2hBdWRpb18xX3NOZX7Iby5teGYiLC]wa6FzaCI6bnVsbH0seyJl
bnRyeV9wb2ludCI6MC4w1C]zb3VyY2Vf2HVyYXRpb24i0jUwNjg4MCwidGltZWxpbmVf2W5kIjoyMS4wLCiOaWlIbGluZV
9zd6FydCI6MTAuNDQsInRyYWNrX22pbGVfaNQi00mOGQ0YzM2NCO5M2UzLIQ4MTktYjE3NylmMTE1Y2EwN6NhNjc
iLCiwYXRoIjoiL1Vz2X)zL21pY2h1b6xlLOR1c2t0b3AvTUVESUEvSU1GLUNPUkFML2NvemEsX3312W2f2XNz2W5j2XM
vREBQX01NR193QMHyMDE4X0Vu22xpc2h8dWRpb18yX3NOZX3lbySteGYiLawaGFziaCI6bnVsbH1dLC3zaWR4X3Rp
bWVzY2FsZSI6N0gwMDB9LC32aWR1b19z2XF1ZW5j2SI6ey3y2XNvdX)j2XMiOlt7ImVudH35X3BvaWSBIjowLjAsInNvd
X)j2V9kdX)hd6lvbiI6MjYxLCJOAllbGluZV9lbmQi0jEwLjQIBLCJ0011bGluZV9zdGFydCI6MCwidHJhY2tf2m1s2V9p2CI6Ij
QZMTkIZWYyLWQyMTItNGYlMiliYWMzLW13YmJiNTUSOTQ5MyIsInElhd6gi0iIvVXNIcnMvbilljaGVsb6UvR6Vza3RvcC
9NRUR3QS9JTUYtII09SQUwvY29yYftfcmV12191c3N1bmNlcy9EUFBfSU1GX0lCQzIwMThfdmlk2W9fMS5teGYiLC3wa
6FzaCI6bnVsbHOseyilbnRyeV9wb2ludCI6MC4wLCizb3VyY2Vf2HVyYXRpb2410jI2NCwid6ltZWxpbmVf2W5kIjoyMS4w
CJOaWl1b6luZV9zdGFydCI6MTAuNDQsInRyYWNrX22pbGVfoWQi0ilyYjEwYmUyMy0yYjVkLTQyNWUtYTQOOC1hN0
QxMO8m2TY1NDUiLC3wYXRDIjoiLlVz2XJzL21pY2hlbGx1LOR1c2t0b3AvTUVESUEvSU1GLUNPUkFML2NvcmFsX3J
l2W2f2XNz2W5j2XMvREBQX01.NR193QkMyMDE4X32p26VvXzIubXhmIiwicGhhc2giOm51b6x9XSwic2lkeF900W11c
2Nhb6Ui0jIlfSwiYXVkaW9fc2FtcGxlX33hdGUi0jQ4M0AwLC3mcmFtZV9yYXR1X2ZyYWN0aW9uIjoiMjUvMS39LCAYX
NoX29wd6lvbnMiOnsiYXVkaW9fdG1t2XNjWxlIjoxIMDAwMDAwla2aWRlb1900W11c2NhbGUi0jEwMDAwMDB9fQo=",
"pkg": {
"ASSETMAP.json": "hqp_QMW3113W7PNiKSq28m6sRDssEANtoDSUIdxjivCCipZdyU",
"ASSETMAP.xml": "hqp_QmaW3Mh5qpRVYtAyuELFaYpqNqxLQCzru3A4Hq287vgvNM",
"CPL_DPP_IMF_IBC2018_trailer_without_lead_in.json": "hqp_QmWvOgdPhfuBrkYFO3iiDolmzwMcxj3FjwaHq21z37Fq9e",

"CPL_OPP_IMF_IBC2018_trailer_without_lead_in.xml": "hqpilmT2pC3798LQzfnCUMRkFNLEkXqhCqYhZoKT44DhkUZEp",
"CPL_OPP_IMF_IFIC2018_with_lead_in.json": "hqp_OmbrI.MkoakfiEi4Y884efg5GC8KHLAESMQ68XQCfbk5L9w",
"CPL_DPP_IMF_IBC2018_with_lead_in.xml": "hqp_IlmR5zUxu6p68Ms7H8cyckT1388vXNTcVKWDg5qFXKxjejC",
"DPP_IMF_I8C2018_EnglishAudio_1_stereo.mxf": "hqp_QmT2RsSvMsq4xnidtONR6KKunHSSxcTd5dmX9KCmcgegqq",
"DPP_IMF_IBC2018_EnglishAudio_2_stereo.mxf": "hqp_Qm2HVV9Vag3yo3eYsfEelsER7aKzpurbcHa9Ei8AjbfQ2z,
"DPP_IMF_I8C2018_EnglishAudio_silence_stereo.mxf": "hqp_QmbUd8ontivBswhbRUxr8Nrxs2AqTe3dwFGzST9gegyYyBZ",
"DPP_IMF_IBC2018_GermanAudio_audio_stereo.mxf": "hqp_pmfTc5YMC6TErokY0KdEEByVC2qoqE9PFP6nT3qttrbqf3",
"DPP_IMF_IBC2018_6ermanAudio_silence_stereo.mxf": "hqp_Qmck25x2w2TtVSTi8CfT6Ld1y08uKkdNuG8wUkAUue4nu8",
"DPP_IMF_I8C2018_video_l.mxf": "hqp_QmRhV8V6cgCRQMUUqwxENljb5G2f9C69fiuHkABH4ZyTsF",
"DPP_IMF_I8C2018_video_2.mxf": "hqp_QmWRXv6tnigfNz2fyKgHfU351nk5YWyNon6dKRBML8nDuG",
"DPP_IMF_I8C2018_video_lead_in.mxf": "hqp_Qmbad6iaVfr2SdNLJdFoWrE826j626dvng9GpdKcjgnUFQ",
"OPL_OPP_IMF_IBC2018_Without_Leader_English.json":"hqp_QmWiGwQj9EzKncj8S3w6xAE843YE4MENNCvneCGq1za
S8q",
"OPL_OPP_IMF_IBC2018_Without_Leader_English.xml": "hqp_pmcDcGheSVqapYQ242228MPPgHficEDYS2KCdCv8D
7TpJV",
"OPL_DPP_IMF_IBC2018_Without_Leader_German.json": "hqp_QmWxymI6Gopacrx4vR2bhz827kQf9snsi6v23uhq8Lo
3Yf",
"OPL_DPP_IMF_IBC2018_Without_Leader_German.xml": "hqp_QmR6W7h864GzgjVan67ShX4N3RqjR449o1T4ysREU
ic2TD",
"PKL_c3753827-7440-4780-aca6-474c71a176df.json": "hqpilmQATbbxqaF6k2p1NHT8m9AkrtiFR5TDQSLcx7tzcii9Dz",
"PKI_c3753827-7440-4780-aca6-474c71a176df.xml": "hqp_QmTrp1TcZySRLskTZsrBKE8mruTyyZ9Ah12nWEhLUDJ9z",
"VOLINDEX.xml": "hqp_QmQKUWPSdSeB5dMYYXGceyfP6CYcr3K8gYAi8oNbmbDVdf",
"coral-reef-poster.jpg": "hqp_QmVffrzlocDfNDAFX8s8uEGAJ3gTtQUXbmdASuGtbf3YFc"

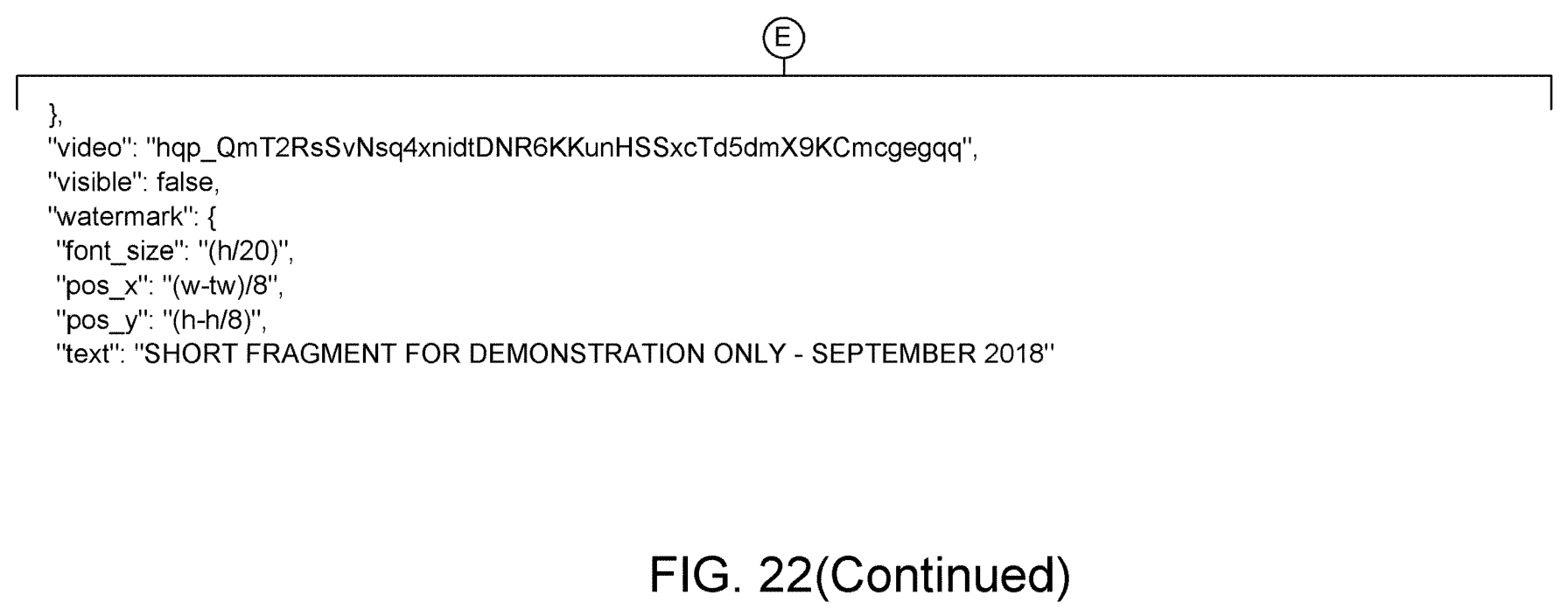

```
},
"video": "hqp_QmT2RsSvNsq4xnidtDNR6KKunHSSxcTd5dmX9KCmcgegqq",
"visible": false,
"watermark": {
 "font_size": "(h/20)",
 "pos_x": "(w-tw)/8",
 "pos_y": "(h-h/8)",
 "text": "SHORT FRAGMENT FOR DEMONSTRATION ONLY - SEPTEMBER 2018"
```

FIG. 22(Continued)

```
{
 "title":  "The IMF Movie",
 "description":  "Drama - IMF saves the day! ",
 "language":  "en",
 "program_length":  "PT0H23M30.665",
 "audio_sequence":  {
   "resources":  [
     {
       "entry_point":  83.66691666666667,
       "source_duration":  348348,
       "timeline_start":  0,
       "timeline_end":  7.25725,
       "track_file_id":  "11111111-1111-1111-1111-111111111111",
       "path":  "/MEDIA/IMF Movie studio logo audio stereo.mxf"
     },
     {
       "entry_point":  148.81533333333334,
       "source_duration":  7173166,
       "timeline_start":  7.25725
       "timeline_end":  156.69820833333333,
       "track_file_id":  "22222222-2222-2222-2222-222222222222",
       "path":  "/MEDIA/IMF Movie opening credits audio stereo.mxf"
     },
     {
       "entry_point":  0,
       "source_duration":  60190130,
       "timeline_end":  1410.65925,
       "timeline_start":  156.69820833333333,
       "track_file_id":  "33333333-3333-3333-3333-333333333333",
       "path":  "/MEDIA/IMF Movie main soundtrack English stereo.mxf"
     }
   ]
 },
 "video_sequence":  {
   "resources":  [
     {
       "entry_point":  83.66691666666667,
       "source_duration":  174,
       "timeline_start":  0,
       "timeline_end":  7.25725,
       "track_file_id":  "44444444-4444-4444-4444-444444444444",
       "path" :  "/MEDIA/IMF Movie studio logo video.mxf"
     },
```

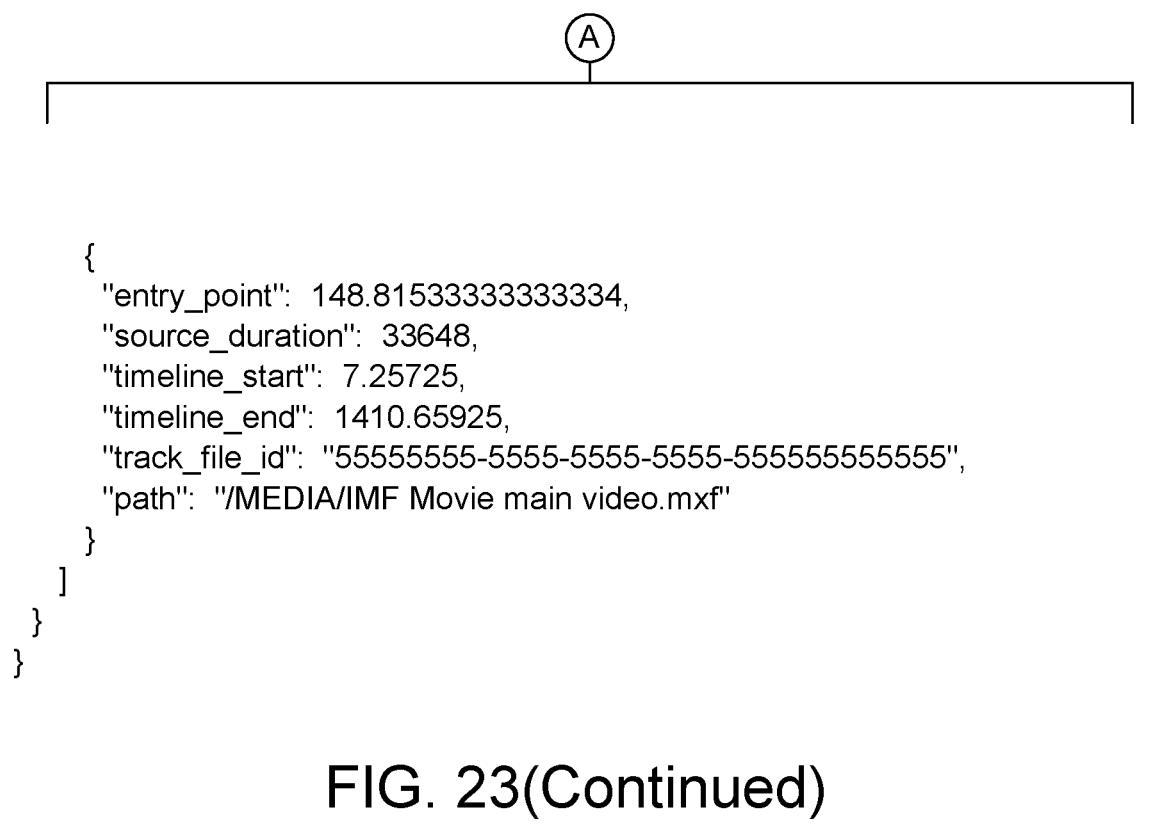

```
    {
     "entry_point":  148.81533333333334,
     "source_duration":  33648,
     "timeline_start":  7.25725,
     "timeline_end":  1410.65925,
     "track_file_id":  "55555555-5555-5555-5555-555555555555",
     "path":  "/MEDIA/IMF Movie main video.mxf"
    }
   ]
  }
}
```

FIG. 23(Continued)

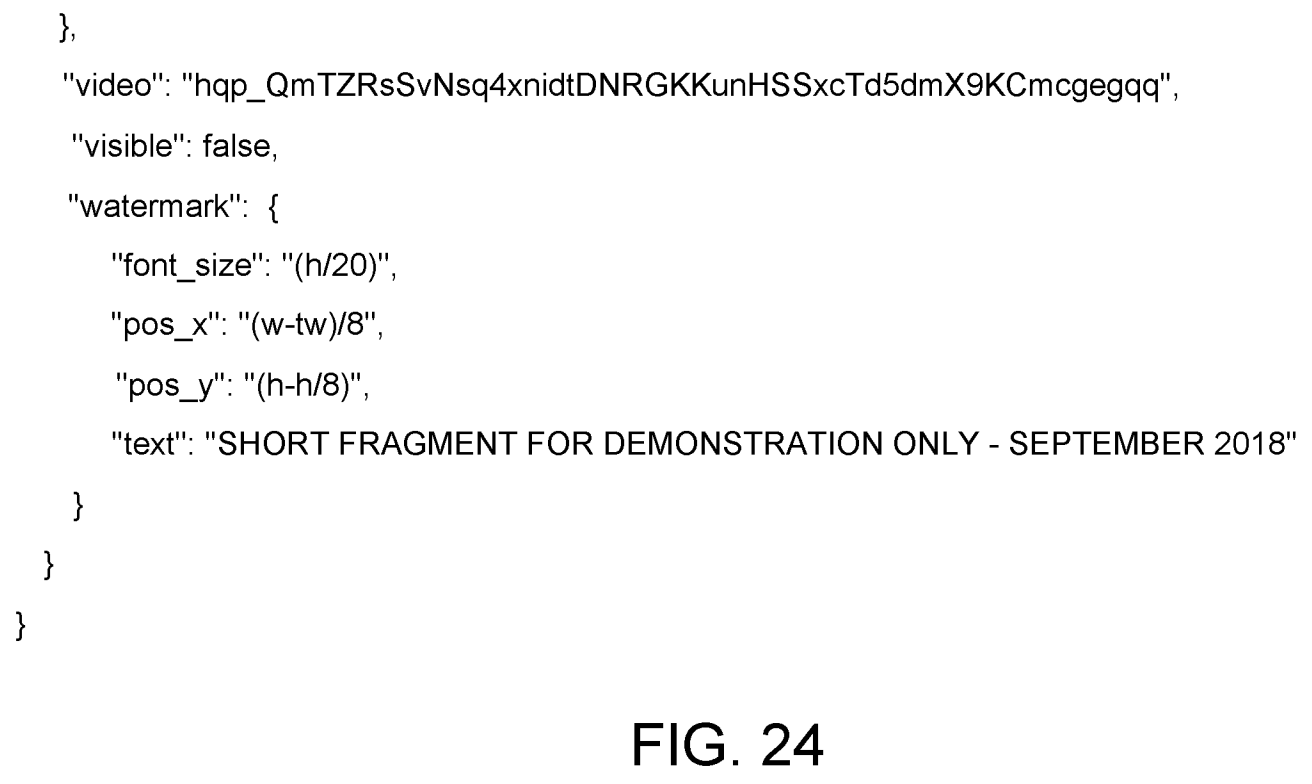

```
    },
    "video": "hqp_QmTZRsSvNsq4xnidtDNRGKKunHSSxcTd5dmX9KCmcgegqq",
    "visible": false,
    "watermark":  {
        "font_size": "(h/20)",
        "pos_x": "(w-tw)/8",
        "pos_y": "(h-h/8)",
        "text": "SHORT FRAGMENT FOR DEMONSTRATION ONLY - SEPTEMBER 2018"
    }
  }
}
```

FIG. 24

ETHEREUM BLOCK

```
{
 difficulty: 1,
 extraData: "0xd783010803846765746887676d312e ... 382e31856c696e7578000000000000000c23219",
 gasLimit: 4712388,
 gas used: 104966,
 hash: "0x1bbb0764af01d1b819b0e52b0d483a730e6bacef6a40700dbcb723e16309a4ee",
 logsBloom: "0x0000000000000000000000800000 ... 0000800000000000000000",
 miner; "0x0000000000000000000000000000000000000000",
 mixHash: "0x0000000000000000000000000000000000000000000000000000000000000000",
 nonce: "0x0000000000000000",
 number: 5129,
 parentHash: "0x5c8c7fdb00993c181f9c2e00b90272f3632f487465d1714922a81c588d9413be",
 receiptsRoot: "0x55071ed2e6a29273009f09be5c828313302549aa18a199678ab821b51a780e76",
 sha3Uncles: "0x1dcc4de8dec75d7aab85b567b6ccd41ad312451948a7413f0a142fd40d49347",
 size: 2042,
 stateRoot: "0x9ac77a57b13e8b2c07aa39a2719fbbd1ce0a5d1b2c016ea9ca1c78f7f34761f7",
 timestamp: 1521233520,
 totaldifficulty: 6840,
 transactions: [ "0x491eec1437cb1eae6909e9ccf5358d845ae279d0b630c5e1edc99fff9a8c          "],
 transactionsRoot: "0x0cb2e230a55ea025bff4878b7c8672717fb709a640b0dc0e1b273a39d1411a5",
 uncles: []
}
```

"From": Address of a account calling the contract

TRANSACTION

```
{
 blockHash: "0x1bbb0764af01d1819b0e52b0e52b0d483a730e6bacef6a40700dbcb723e16309a4ee",
 blockNumber: 5129,
 from: "0x76bbb0984ac61f295a936bfeb091ae2cfae8e47",
 gas: 1800000,
 gasPrice: 2000000000,
 hash: " 0x491eec1b437cb1eae690901e9ccf535848ae279d0b630c5e1edc99fff9a8c          ",
 input: "0x24e27684c0bee6ac7ddfa9d9f1048877afa007f0eb ... 127076d0575982afb4ba17f4228d81",
 nonce: 4,
 r: "0x1be4f8e0611fb8a88d22383fdd760ef59980c38efcea6ca53a585a47ddacbe",
 s: "0x1d6c1da1432753d6360bb831e43acdef25684a2cef3f9a9255069adacdef5",
 to: "0x1723ec365f6ffb933cc21ee57df8067db0360553",
 transactionIndex: 0,
 v: "0x1c",
 value: 8000000000000000000
}
```

"To": Address of the contract

FIG. 28(Continued)

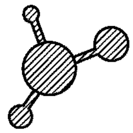

Content Verification Info - VERIFIED!

```
{
 "hash": "hq_QmQedd9AuQSdoBjMzNUVp7BaqWRXAJiJGAdcLXLWWKyqiV",
  "qref": {
   "valid": true,
  "hash": "hqp_QmQedd9AuQSdoBjMzNUVp7BaqWRXAJiJGAdcLXLWWKyqiV"
  },
  "qmd": {
   "valid": true,
   "hash":hqp_QmU4wn795KbSGvTH2uki6UwWT1xbv1yqDCM7bEdweYiad8",
   "check": {
    "valid": true,
    "invalidValues": []
   }
  },
  "qstruct": {
   "valid": true,
   "hash": "hqp_QmSHqXe9cr5EtgsYcg7dP9irZ4MHsTFo4Rc5e4hh8oHfPT",
   "parts":  [
    {
     "hash": "hqp_QmUv75ETf9x22cjNNbTncVPMuKZpXLPHF7tVz2D9ACthqD",
     "proofs": {
      "rootHash": "acda1564dfc542064b7becdbc2d107c84fe1f942337bfe3c06
      f2b4eec5e806b8",
      "chunkSize": 49,
      "chunkNum": 49,
      "chunkLen": 50,
      "finalized": 116
     },
     "size": 2634
    },
    {
```

FIG. 29

Content Verification Info - FAILED!

```
{
 "hash": "hq_QmZ7oxvpECVgvED7QwMHgmKZGpEEoHkRhHWo2NNpeFZV2e",
 "qref": {
   "valid": true,
   "hash": hqp_QmZ7oxvpECVgvED7QwMHgmKZGpEEoHkRhHWo2NNpeFZV2e"
 },
 "qmd": {
   "valid": true,
   "hash":hqp_QmPaddxjFwCc9TPAg652MSRoV9iada8gjB1FSR2wKadbGf",
   "check": {
     "valid": true,
     "invalidValues": []
   }
 },
 "qstruct": {
   "valid": false,
   "error": "Hashes do not match",
   "hash": "hqp_QmUfPJ4ehcbi17fH26QvwY6ViFhACaMsENyvxyptdBPq4T"
 },
 "valid": false
}
```

FIG. 30

ACCESS CONTROL AND OWNERSHIP TRANSFER OF DIGITAL CONTENT USING A DECENTRALIZED CONTENT FABRIC AND LEDGER

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

INCORPORATION BY REFERENCE

An Application Data Sheet is filed concurrently herewith as part of this patent document. Each patent application that this patent document claims benefit of or priority to as identified in the concurrently filed Application Data Sheet is incorporated by reference herein in its entirety and for all purposes.

TECHNICAL FIELD

This patent document generally relates to access control and ownership transfer of digital content routed over a data network. More specifically, this patent document discloses techniques for access control and ownership transfer of digital content using a decentralized content fabric providing an overlay network situated on top of an internet protocol layer.

BACKGROUND

Digital content consumption over the Internet is growing explosively. However, the elemental technology of the Internet, which is open and scalable for web data (not large form content), has not evolved to keep up with growing consumer demand. Instead, the "client-server-edge-cache" architecture that emerged on top of the open packet based routing Internet to serve web data (documents) over 20 years ago has been stretched to try to support digital content. It is not difficult to appreciate the incongruence of this design: after all, digital content is typically orders of magnitude larger than web documents and creates massively higher storage and traffic demands on the core of the Internet. With the current trend towards interactive and live streaming content, the resource burden on the Internet core will only increase over time.

Further, Internet architecture has not kept up with the expectations of content publishers (e.g., creators of digital content). From a publisher perspective, the explosion of piecemeal digital rights management (DRM) and a potpourri of device formats means large form content is re-versioned into many end package formats, and in combination with the edge caching requirements, has further multiplied storage and transmission requirements. The increase in the number of content versions and the variety of digital rights that can be attached to such content makes managing rights cumbersome. Additionally, rights management is typically implemented separately from access control. Legacy Internet, including what is known as "Web 2.0," provides content distribution and management solutions that do not permit content publishers to easily transfer (e.g., sell) their digital content to end users, or end users to own digital content such that owning users can easily participate in onward transfer of the digital content. Instead, legacy Internet systems are generally designed to grant end users access to media licensed from publishers via middle-layer access control systems, via centralized platforms hosted by the middle-layer access control systems. Permission to access content is directly controlled by the provider of the centralized platform, through technology that is inherently separate from the content itself and requires the content owner to give ownership of the content to the middle platform, ceding ownership of the content. Further, users have no general purpose ability to transfer ownership of content to one another.

SUMMARY

Some examples of systems, apparatus, devices, computer program products, and methods implementing aspects of a decentralized content fabric are provided. In some implementations, a decentralized content-centric system includes one or more memory devices and one or more processors in communication with the one or more memory devices. The one or more processors are configured to execute software to provide a plurality of fabric nodes of an overlay network. The plurality of fabric nodes includes one or more fabric nodes configured to: (i) receive, from a client, a request to access digital content on the overlay network, the request including an authorization token that is digitally signed by or on behalf of a user of the client, (ii) extract, from the authorization token, an identifier (ID) associated with the user, (iii) determine that one or more rules maintained on the overlay network and associated with the content are satisfied, where the one or more rules condition access to the digital content upon the ID associated with the user matching an ID associated with an owner of a digital instrument, and where the digital instrument is stored in a blockchain ledger as a unique representation of or unique reference to the digital content, and (iv) provide the client with access to the digital content in response to determining that the one or more rules are satisfied.

In some implementations, the digital instrument is a non-fungible token having a single owner. Further, in some implementations, the ID associated with the user can be an address of a cryptocurrency wallet.

Optionally, the request may reference a content hash generated through a one-way hash operation on the digital content. The overlay network can be configured to communicate the content hash to the client in response to receiving an address of the digital instrument from the client.

In some implementations, the authorization token is generated by an authority service based on verification of an identity credential supplied by the client. The identity credential can be in the form of a digital ticket or sign-on token that is exchanged for the authorization token. In some implementations, the authorization token may contain a message signed with a private key allowing the authorization token to be associated with a blockchain address and cryptocurrency wallet. The association between the authorization token and the blockchain address/cryptocurrency wallet can be performed as part of generating the authorization token, for example, such that the blockchain address can be extracted cryptographically from the authorization token as the ID associated with the user (e.g., the owner of the cryptocurrency wallet).

Access to the digital content may involve transferring ownership of the digital content to a second user. To transfer ownership to the second user, the overlay network can be configured to associate an ID of the second user with the digital instrument and/or verify ownership of a separate digital instrument by the second user. Additionally or alternatively, access may sometimes involve creating a second digital instrument as a unique representation of a derivative of the digital content. Additionally or alternatively, providing the client with access may include providing the client with the capability to decrypt the digital content, which can be stored encrypted on the content fabric. In some implementations, the encrypted content is re-encrypted by the content fabric in connection with access by the client, for example, through proxy re-encryption.

In the above-described decentralized content-centric system, the one or more processors can be configured to process the request through calling a blockchain smart contract associated with the digital content. The blockchain smart contract is sometimes referred to herein as a "digital contract" and can include code that implements the one or more rules. Accordingly, in some implementations, this blockchain smart contract (a first blockchain smart contract) is executed to evaluate the one or more rules. Further, the ID associated with the owner of the digital instrument can, in some instances, be indicated by a second blockchain smart contract that is referenced by the first blockchain smart contract. In some implementations, the second blockchain smart contract is a contract associated with one or more non-fungible tokens.

In some implementations, the functionality provided by the one or more processors of the above-described decentralized content-centric system is realized through program code stored on a non-transitory computer-readable medium. The program code includes instructions configured to cause the one or more processors to provide the plurality of fabric nodes.

BRIEF DESCRIPTION OF THE FIGURES

The included drawings are for illustrative purposes and serve only to provide examples of possible structures and operations for the disclosed systems, apparatus, methods and computer program products. These drawings in no way limit any changes in form and detail that may be made by one skilled in the art without departing from the spirit and scope of the disclosed implementations.

In the drawings, Figures (FIGS.) 1-37 illustrate examples of some systems, apparatus, methods and computer program products of aspects of a decentralized content fabric according to some implementations.

FIG. 4 shows an example of a method for assigning partitions to fabric nodes.

FIG. 22 shows an example of IMF package content in the content fabric after ingest of the selected content type, implemented with bitcode.

FIG. 23 shows an example of description for an English language version of a consumer streaming deliverable from an interoperable master format (IMF) package where the package specifies multiple language versions.

FIG. 24 shows an example of metadata stored in an original content object created from an IMF source package used to specify content, dimensions and placement of a watermark by bitcode in generating an output stream.

FIG. 28 shows an example of a transparent, provable chain of record for content.

FIGS. 29 and 30 show examples of content object verification trees.

DETAILED DESCRIPTION

Figure 1:
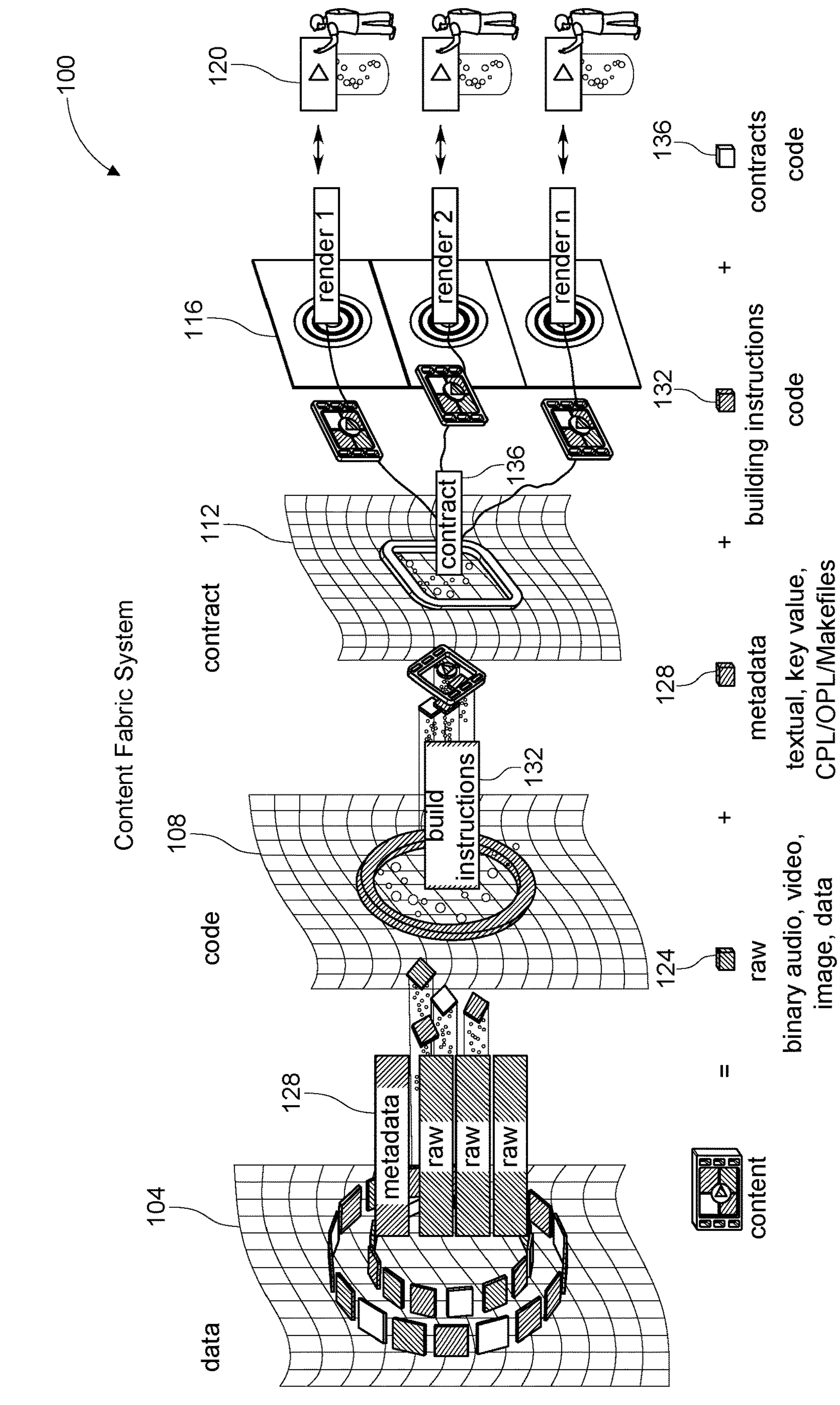
FIG. 1 shows an example of a content fabric architecture.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Described herein are examples of systems, apparatus, methods and computer program products implementing infrastructure, techniques and other aspects of a decentralized content fabric. In some implementations, some aspects of the content fabric are configured for granting access to digital content and/or delegating ownership of digital content. Some implementations provide mechanisms for an owner of media or other types of digital content published into the content fabric to set up access to the digital content by a user. The owner may provide the user with access in return for payment or a transfer of value. In some implementations, access does not involve payment, but is instead based on one or more non-payment based criteria, for example, winning a game or being granted an entitlement such as a ticket or token. In some instances, access may be granted free of any conditions or obligations on the part of the receiving user. Also or alternatively, an owner can sell or otherwise transfer ownership of the digital content to a further owner.

Aspects of the present disclosure relate to techniques for using a decentralized content fabric that includes a blockchain as well as a dynamic trustless content storage and distribution platform to enable direct transfer of ownership of content and/or its derivatives (such as streaming, download, viewing, or other digital rendering versions of content) from an original owner to a user, and from a user to another user, using digital instruments or certificates that are stored on the blockchain. The content fabric leverages the ability of such certificates to support proof of ownership for end users. In some implementations, the certificate is a non-fungible token. Ownership of content on the blockchain, once proven, can be used to directly authorize access to, or transfer of ownership of, content or its derivatives, e.g., from a content publisher to an end user. In the case of streaming access, various aspects of the content fabric may be configured to provide for presentation of content with high quality of service. Ownership transfer may involve a direct sale of the content and/or its derivatives from a publisher to a user, as well as re-sale or onwards transfer from user-to-user. Transfers of ownership can be recorded in the blockchain of the content fabric, and the content fabric may permit transfers to occur at scale in order to meet any volume of transfer activity. Unlike a system that attempts to use a token on a blockchain to unlock access to content stored on and rendered from a separate system, the content fabric can take advantage of its native coupling between (i) owner-controlled content storage and (ii) distribution and blockchain access control, in order to authorize access to content and its derivatives based on blockchain ownership of the content and to provide a trustless (no middle party, tamper-proof) direct transfer of ownership from owner to user, and user to user. The techniques described herein can be applied to provide access to and transfer of numerous forms of content, including audio, video, e-books or other electronic documents, multimedia presentations, and the like.

In some implementations, the transferred ownership is in the form of proxy ownership, in which two or more entities co-own the content and are bound by one or more co-ownership rules, as described in greater detail herein. Ownership, as used herein, generally refers to blockchain ownership of digital content maintained as a content object in the content fabric by an owner who has a key set that includes a public/private key pair. In general, each entity within or interacting with the content fabric is identified by a unique address and owns a set of keys including a public/private key pair. The set of keys can be used to perform various actions such as digital signing, encryption, and decryption. Accordingly, in some implementations, a content object can be encrypted using the key set of an original owner (e.g., a publisher or creator) of the content so that an entity (e.g., a fabric node) storing data of the content object does not have access to the plain-text or unencrypted form of the data. Further, in some implementations, the content fabric may support proxy re-encryption using a key set of the current owner, who may not necessarily be the original owner. Using some aspects of the content fabric, the provisioning of content access and/or transfer of content ownership can be carried out with blockchain-based digital assets.

In some implementations, content access and/or transfer of content ownership can be carried out using a digital ticket or other type of credential issued to a user. For instance, a digital ticket can be obtained by buying the digital ticket from a digital payment system or winning an electronic auction. A client can interact with aspects of the content fabric to exchange the digital ticket for an authorization token, in some implementations. The authorization token provides a generalized mechanism for initiating an access request to consume digital content generated using content objects of the content fabric, for instance, by streaming, viewing, downloading, etc. The authorization token can be signed with a private key of the user and may be usable for extracting a user identifier (ID) such as a public blockchain address owned by the user. The access request is processed by the content fabric, using a blockchain smart contract in the content object and one or more policies of the blockchain smart contract.

In some implementations, the authorization token is generated by an authority service residing in the content fabric. For instance, the authority service may correspond to a fabric node that is managed by an operator of the content fabric. Alternatively, the authority service can be a decentralized entity such as a third-party service that provides authorization functionality on behalf of a tenant (e.g., a content publisher) of the content fabric. As described in detail below, the content fabric can be implemented to run in a "trustless" environment to prevent unintentional or intentional unauthorized access to content. The use of an authority service is consistent with this trustless approach because the content fabric may support one or more verification mechanisms for checking whether a user presenting the authorization token has permission to access a content object. An example of such a verification mechanism is the policy-based evaluation of information associated with a digital instrument, described below.

In some implementations, ownership is recorded in association with a user ID (e.g., a blockchain address associated with the user) as part of a digital instrument maintained in a blockchain so that the digital instrument is owned by the user's blockchain address or user ID. The digital instrument represents a content object (or derivative) and itself has a unique ID. The digital instrument can be stored in a smart contract on the blockchain. The contract containing the digital instrument can be separate from a smart contract associated with the content object itself. When a user's application requests access to content, an authorization token can be created to access a corresponding content object (or derivative). The digital instrument may be referred to in the smart contract of the content object to be accessed. When the access request is evaluated, an authorization transaction can execute against the smart contract associated with the content object (or derivative). This execution against the smart contract associated with the content object/derivative can involve verifying the requesting user's ownership of the digital instrument, such as verifying the user's ownership of the digital instrument on the blockchain. In some implementations, the digital instrument can be a non-fungible token (NFT), where a token ID of the NFT is a unique entry in a hash map that links the token ID to the user's address on the blockchain, and where the hash map is part of a smart contract stored in the blockchain. When implemented as an NFT, the digital instrument can have a 1:1 token-to-owner relationship since an NFT is typically associated with a single owner. However, as discussed above, content can be co-owned. Accordingly, ownership of an NFT or other digital instrument does not necessarily imply ownership of the entire content object or ownership of all the access rights associated with the content object. For example, the authorization transaction can potentially verify multiple token addresses owned by the same owner, and/or multiple token addresses owned by multiple owners (permitting multiple owners of the same content) or multi-owner verification for single owner access.

As indicated above, access or ownership transfer may relate to a content object but can also relate to a derivative of the content object. For example, the digital instrument may correspond to a streaming instance or other dynamic representation of the content object that is created specifically for the purpose of providing limited access rights (e.g., viewing permission) to the owner of the digital instrument. Thus, multiple owners can each have their own digital instrument that provides for the same or different access rights (e.g., access to different parts of the object) in accordance with one or more policies of the contract. The one or more policies can be evaluated by the content fabric to determine, based on ownership of the digital instrument, whether to grant access to a user who has presented the above-described authorization token in an access request. Ownership of a digital instrument can therefore be synonymous with possession of a right to perform some action with respect to at least part of the data (or a derivative of such data) stored in association with a content object. The digital instrument serves as proof of that right. Since a digital instrument may be sold or otherwise transferred, the rights tied to the digital instrument, which can extend up to exclusive ownership of the content object, may also be transferred between users.

In some implementations, a cryptocurrency wallet held by a user can be used to accumulate and spend a cryptocurrency such as Ethereum's ERC-20 tokens, which can serve as a proof of payment or be used to purchase a proof of payment, in different implementations. Thus, a cryptocurrency can be used to purchase access to a content object and/or ownership of a content object. Ownership of a digital instrument can be indicated through associating an address of the cryptocurrency wallet with the digital instrument.

The ERC-20 token is one of many examples of blockchain-based digital assets that can be used as a cryptocurrency in various implementations. For instance, a user can pay to purchase some ERC-20 tokens to top up the user's cryptocurrency wallet. Access to digital content implemented as a content object in the content fabric can have a price in ERC-20 token value. Also or alternatively, content ownership can have a price, which can be set by an owner and be reflected in the ERC-20 token value. ERC-20 tokens or alternative items of cryptocurrency value can be managed and transferred in a variety of manners. For instance, a content owner could give ERC-20 tokens to fans of a particular title of digital content or fans of an artist, actor, or some other entity affiliated with the digital content. Fans could also use ERC-20 tokens to purchase a particular title of digital content, or a derivative, such as streaming access and then sell the asset to other fans using ERC-20 tokens in a marketplace. Thus, using some of the disclosed aspects of the content fabric, ERC-20 tokens can have a community-based trading value.

In some implementations, a content object managed in the content fabric can have a price set in the content object's smart contract. The price can be a digital asset value, such as an ERC-20 token value. ERC-20 tokens or other types of digital assets can accumulate in a buyer's cryptocurrency wallet as well as a seller's cryptocurrency wallet. The cryptocurrency wallet tokens can be exchanged for another cryptocurrency or fiat currency.

Some of the disclosed implementations provide an overlay network, which is implemented primarily with application software, as opposed to conventional networks with operations implemented using hardware or low-level system software. The term "overlay" is used to describe examples of the overlay network disclosed herein because aspects and operations are often implemented in an application layer or other type of layer situated on top of a conventional Internet Protocol (IP) layer. Thus, when the overlay network is implemented in the application layer, some of the disclosed techniques provide for routing by content, as opposed to conventional techniques for routing by host. Thus, in some implementations, hardware such as hosts, servers, other types of computing devices, etc. are of little relevance when addressing by content. That is, in the application layer, it generally does not matter which particular computing device stores the content or some part of the content. In some implementations, content-centric routing provides foundational differences between the disclosed content fabric's implementation using an overlay network versus conventional IP-based routing. For instance, a content representation used by the disclosed content fabric can be de-duplicated and served from an original source, in contrast with the duplication of content data accompanying conventional host-centric IP-based routing schemes.

In some implementations, a translation layer is situated between the application layer and a conventional IP network implementing transmission control protocol/internet protocol (TCP/IP), so the translation layer serves as an intermediary. For instance, the translation layer can facilitate determining which computing device stores content, which is being requested at the application layer, and can facilitate reliably transmitting the content over IP.

FIG. 1 shows an example of a content fabric architecture. In FIG. 1, a decentralized content fabric system 100 provides an audiovisual pipeline (AV pipe) through which media such as video can be generated. In the example of FIG. 1, there are three main logical layers to implement an overlay network: a data layer 104, a code layer 108, and a contract layer 112. When media is retrieved through system 100, layers 104, 108 and 112 work together in near real-time using one or more software stacks to serve the media as a consumable 116 through the overlay network. By incorporating software stacks, system 100 has both vertical and horizontal dimensions; that is, content is retrieved and composed in a supply chain along a horizontal direction from data layer 104 through code layer 108 and contract layer 112 to a player 120 providing an output in the form of consumable media 116 at a consumer's computing device, while a software stack at a fabric node provides a vertical dimension, as explained in greater detail herein.

In the example of FIG. 1, data layer 104 stores and manages content such as large form content. Data layer 104 provides an underlying structure for content, which can get passed around the overlay network. Data layer 104 includes an interconnected network of content object parts, which have been stored as data files or other blocks of raw data. As explained in further detail below, each content object part can be identified by a hash value, the result of a one-way hash operation maintained using cryptography. In some implementations, a content object part is immutable once finalized and identified by a hash value that is calculated across all of the data stored in the content object part. Using a cryptographic hash method, the authenticity of a content object part's data can be verified by recalculating the hash. The hash also serves as a criterion for data deduplication.

In the example of FIG. 1, media provided as an input to data layer 104 is broken into pieces of "raw" data 124, often in the form of binary audio, video, and/or images. Another input to data layer 104 is metadata 128, which describes how to make an output in the form of consumable media 116, and can be in the form of text, key values, etc. Building instructions 132, also referred to herein as build instructions 132, are situated in code layer 108 and are configured to build consumable media 116 from raw data 124 and metadata 128. Build instructions 132 are a type of code such as bitcode to facilitate execution in a secure way. Another type of code appearing in system 100 is contracts 136, situated in contract layer 112 and often implemented using blockchain and described in greater detail herein.

In implementations such as that illustrated in FIG. 1, a content object, described in greater detail herein, includes content object parts in the form of raw data 124 as well as metadata 128. The content object can be made dynamic and transactional by build instructions 132 and contracts 136. Thus, when a movie or other type of media is assembled from content object parts, code to render the movie from the content object parts is immediately available.

In FIG. 1, fabric logic can be implemented in code layer 108. Thus, content routing operations can be provided by code layer 108, among other dynamic operations. Code layer 108 is configured to transform and deliver media for consumption through the AV pipe. In some implementations, continuous machine learning is integrated to tag content and otherwise facilitate operation of code layer 108 by determining highest bandwidth, lowest latency paths. In code layer 108, content can be classified, and content objects can be identified. Code layer 108 can generate consumable media just-in-time (JIT) on user request. Code layer 108 is programmable to combine raw data, metadata and code for dynamic, personalized output.

In FIG. 1, contract layer 112 controls content access via a blockchain ledger, in some implementations. Contract layer 112 can be configured to protect content, for instance, by re-encrypting accessed content using trustless encryption. Contract layer 112 also protects user data using, for instance, a cryptographic wallet. In some implementations, contract layer 112 can provide content transparently and securely to third parties. Also, in some implementations, aggregate user data can be collected with "zero knowledge," as explained in greater detail herein. In some examples, contract layer 112 can be configured to prove versions of content cryptographically. Version and access history can be recorded in the ledger. Also, contribution of work by fabric nodes can be recorded and compensated.

In some implementations, a blockchain-based versioning protocol is provided for media, as explained in greater detail herein. Such a customization and application of blockchain can facilitate a decentralized store of version histories of the content object parts, since versioning/history can be made part of what blockchain holds. Such versioning techniques are applicable since many content object parts evolve to have different versions. A new version is typically defined by one or more changes, and such a change is often by reference. Versioning can occur with a single content object part and across a number of content object parts.

In some implementations, a content object's data is stored in data containers referred to herein as content object parts. A content object can have a referential object structure to facilitate use in the content fabric. Any media or any large structured or unstructured data in the content fabric like a video stream, a file, a package, a set of files, or a data object, e.g., a software program or game, genomics data, structural or mechanical design object, etc. can be made to have a content object structure using some of the disclosed techniques. A content object structure or structures can be generated as part of ingesting media or any source data.

Different implementations of content routing methods are disclosed herein that facilitate distribution of content object parts as well as finding the content object parts inside a domain and, in some instances, outside of a domain in near real-time. In some examples, an intra-domain routing protocol is provided. In some implementations, intra-domain routing can be integrated with distributed and decentralized hashing. As explained in greater detail herein, in some examples, an inter-domain routing protocol with lightweight routing tables is provided.

In some implementations, machine learning (ML) methods can be used to select best paths among fabric nodes in the content fabric. ML can be used to identify a particular fabric node for communicating with a consumer's computing device, as well as be used to identify upstream fabric nodes to get content object parts from.

Some implementations are applicable to different digital media supply chains, such as over-the-top streaming distribution using single "master" formats, low latency live content distribution, personalized content with dynamic and JIT operations such as watermarking, clipping, validation and automatic metadata tagging, and digital asset marketplaces for scalable value exchange between content owners, viewers, sponsors and licensees.

In some implementations, the content fabric incentivizes participation to drive performance and efficiency, including: for owners and licensees, scalable, transparent capabilities for rights management, audience reporting and content commerce; for users, transparency for providing data for their attention to content; and for infrastructure providers, automatic compensation (payment and cost offset) for contributing bandwidth, computation and storage.

In some implementations, the disclosed content fabric incorporates: blockchain decentralized ledgers for large scale consensus on distributed data, tamper resistant storage, and scalable low cost microtransactions; large scale ML and deep-learning; and scalable compute infrastructure with graphics processing units (GPUs), tensor processing units (TPUs), and other specialized compute platforms. Additionally, blockchain ledgers and smart contracts, crypto-economics, e.g., combining game theory, decentralized ledgers and classic market economics, make it possible to create large scale pricing systems that will incentivize supply, demand, and performance in decentralized systems.

In some implementations of the overlay network, a software stack provides relevant operations, and each fabric node runs the same software stack. A fabric node that runs this stack is also referred to herein as a "content node". In some implementations, the content fabric enables fabric nodes to communicate with one another to securely store and serve content using a decentralized framework, meaning no state need be shared via any centralized entities such as databases, tables, ledgers, etc.

In some implementations, content and metadata may be stored once, and consumable media is rendered on demand. Internally, the content fabric allows digital content to be stored in an object structure, namely a content object, which can include content object parts, e.g., raw data as well as metadata, and code which operates on the raw data and metadata JIT at serving time to yield consumable media versions. The code, such as build instructions, that operates on the raw data and metadata allows for flexible re-use of media, updates of the code without updating a software stack (for scalability), and sandboxing for security and metering.

In some implementations, the content fabric may be "trustless" in that content is encrypted and re-encrypted for authorized receivers without the software stack or fabric node on which a software stack runs having to access content in plain-text, and without having access to the content's encryption keys.

In some implementations, access to content objects in the content fabric including create, update (write), and view (read) is mediated by transactions on an embedded blockchain ledger that runs within a software stack. An application interface of the content fabric supports a blockchain platform virtual machine, such as the Ethereum virtual machine, and, in turn, blockchain smart contracts. Each operation on a content object can be implemented as a transaction against a smart contract for that object, in turn recording the address of the entity/user that requested the operation, the identifier of the content object and any details of the transaction.

In some implementations, content operations are programmable. For instance, base smart contracts for content objects can have custom insertion points (hooks) that allow for invoking any transaction—credit or debit of an account, event logging, authorization, verification check, etc. —before and after any content operation, providing intrinsic commerce, rights management, and workflow capabilities.

In some implementations, content versions are provable and tamper-resistant. Content objects can have a version proof, such as a Merkle tree calculation of the object's hashes for fast verification of the integrity of the object. The root value of the Merkle proof is recorded in the blockchain transactions for that content object allowing for a tamper-resistant record of the version history of the object ("who changed what when").

In some implementations of the disclosed content fabric, a content routing system locates content object parts throughout the overlay network using an original distributed hash table (DHT) structure and global, continuous ML to ensure low latency high bandwidth delivery of those content object parts to client devices, also referred to herein as clients. Unlike conventional peer-to-peer networks, some implementations achieve low latency high bandwidth serving even as the system grows in number of fabric nodes and number of content objects to giant scale. By the same token, some implementations of the disclosed systems are incentivized to grow in direct benefit to maintain this high performance.

In a DHT, the fabric nodes in the network can be treated as the buckets in a hash map that spans the entire network. The DHT can be keyed by each fabric node's ID, and the values are any resource associated with or stored by that fabric node, such as file hashes or keywords. In this way, the fabric node ID not only serves as identification of the fabric node, but also as a direct map to a set of values to be located in the network. In some contexts, the crux of the DHT's characteristics is the particular method the DHT uses to search its network to locate the fabric node ID that can return the desired value in response to an application or user request.

In some implementations, each fabric node is identified with a 32-byte node ID, which also is a node address on the embedded blockchain ledger. In some instances, content object part hashes can be shared over the fabric nodes using a partitioning method that, with the routing method, is designed to a) locate content object parts on a fabric node with low latency consistently, even as the number of fabric nodes and number of content objects in the content fabric grows, and b) not require moving around content as new fabric nodes and content are added.

In some implementations, the partitioning method has global configuration parameters including: 1) a "level," which defines the number of partitions in the network, 2) a "number of partitions per node" (np), which defines the number of partitions each fabric node stores, and 3) a static configuration of the number of copies of a partition (cp). In some instances, each partition is itself identified by a partition ID (e.g., 4 bits or one hexadecimal number for every position in the partition ID), and content object part hashes are also represented as 32-byte IDs.

Content object parts can be assigned to be stored in a partition by matching a prefix in their part hash to the partition ID, where the length of this prefix is controlled by the current partition level of the network. Similarly, fabric nodes can be assigned to store and serve a set of partitions by matching a prefix in their node ID to all partition IDs that are within (e.g., less than or equal to) an XOR distance calculation that is equal to the configured number of partitions per node, also referred to herein as "numparts." In some examples, for calculation of the XOR distance, the 32-bytes that make up the node ID, the content object part hash, and the partition ID are expressed as 32 pairs of hexadecimal characters (each hex character representing 4 bits). When content object parts are retrieved from the network, the routing method locates the fabric nodes that can serve the partition to which the content object part belongs, and uses the most favorable fabric node to serve the content object part. In some implementations, as the number of fabric nodes in the overlay network increases to accommodate more content, the network dynamically repartitions with minimal "reshuffling" of existing content object parts.

In some implementations, given a number of partitions in a network=p, a number of partitions per fabric node=np, and a number of copies=nc, the network desirably has (p/np)* nc fabric nodes. For example, for a network that has 16 partitions, and maintains 8 partitions per fabric node, and 7 copies of each partition, the network has (16/8)* 7=14 fabric nodes. As those partitions start to fill with new content and as the number of fabric nodes in the network increases, some implementations can divide each partition space into 16 smaller partitions, increasing the number of partitions from 16 to 256, for example, with each existing fabric node shedding a portion of the now more specific partition space and new fabric nodes taking on the new partition space. Assuming the part hashes are generally evenly dispersed over the partition space, some implementations can introduce the new partitions and scale up the network while not having to move any content or renumber fabric nodes/content and still maintain the same redundancy of each partition.

In some implementations, each subsequent level uses the next pair of hexadecimal characters to identify the partition, and contained content object parts, and fabric nodes storing the partition. For example, considering the partition ID:

0f 1a 66 aa 4d 5e 6f 7a ab be cd de ef 76 e3 a8 44 98 b4 c5 11 00 34 dd 3d 47 a8 91 32 fa 01 12

Level 1—uses "0"

Level 2—uses "0f"

Level 3—uses "0f 1", etc.

In an example, consider a content object part with a hash starting with 0f 1a 66 aa . . . . That is assigned to 'level 3' partition ID:

0f1, and a node ID with a hash starting with:

0f 1a 00 00 . . . .

The content object part may stay on this fabric node as the network grows from Level 3 through Level 4 because the XOR distance is 0:

XOR distance (0f1, 0f1)=0

XOR distance (0f 1a, 0f 1a)=0

At level 5, the XOR distance calculation between the node ID and partition ID yields a value of "6":

XOR distance (0f 1a 6, 0f 1a 0)=6

Assuming the numparts configuration of the network is 7 or greater (XOR distance of 0 through 6), the partition may stay on this fabric node.

Finally, at level 6, the partition ID and node ID diverge beyond the XOR distance constraint and the partition is shed from this fabric node and assumed by a new fabric node:

XOR (0f 1a 66, 0f 1a 00)»6

Note that the network grew by 3 orders of magnitude before any changes were made to where this content is located.

In some implementations, eligible content nodes store desired content object parts inside of domains of content nodes that are reachable, for instance, by layer 2 broadcast for intra-domain content routing. In some implementations, inter-domain routing methods can be performed to locate content object parts on fabric nodes outside of the domain. The disclosed approaches can be implemented to integrate with large-scale, continuous ML to select fabric nodes and paths in the overlay network (both within domain and out of domain) that are predicted to serve the requesting client with low latency and high bandwidth, at the client's bottleneck bandwidth capacity.

In some implementations, the content fabric provides to applications (and, in turn, consumers) two primitives for content publishing and retrieval: GET and PUT. Each primitive takes a content object part hash as its primary argument. The content fabric is then responsible to either locate and return the content object part (GET) or to publish the content object part (PUT) to the appropriate fabric nodes based on the partitioning method.

"Private" IP networks such as small office LANs, corporate WANs and public clouds, include host computing devices that can reach one another via layer 2 broadcast. IPv6 multicast is by default available within these private networks without special configuration. The content fabric can be configured to take advantage of this capability to use the native capability of the network to learn what fabric nodes within the domain have a content object part and to retrieve the content object part directly from the selected fabric node, for instance, selected by ML score. Fabric nodes join a set of IPv6 multicast groups where the addresses are directly computed from the partition IDs the fabric node is responsible for, and directly reply to requests for content object parts they are responsible for.

Figure 2:
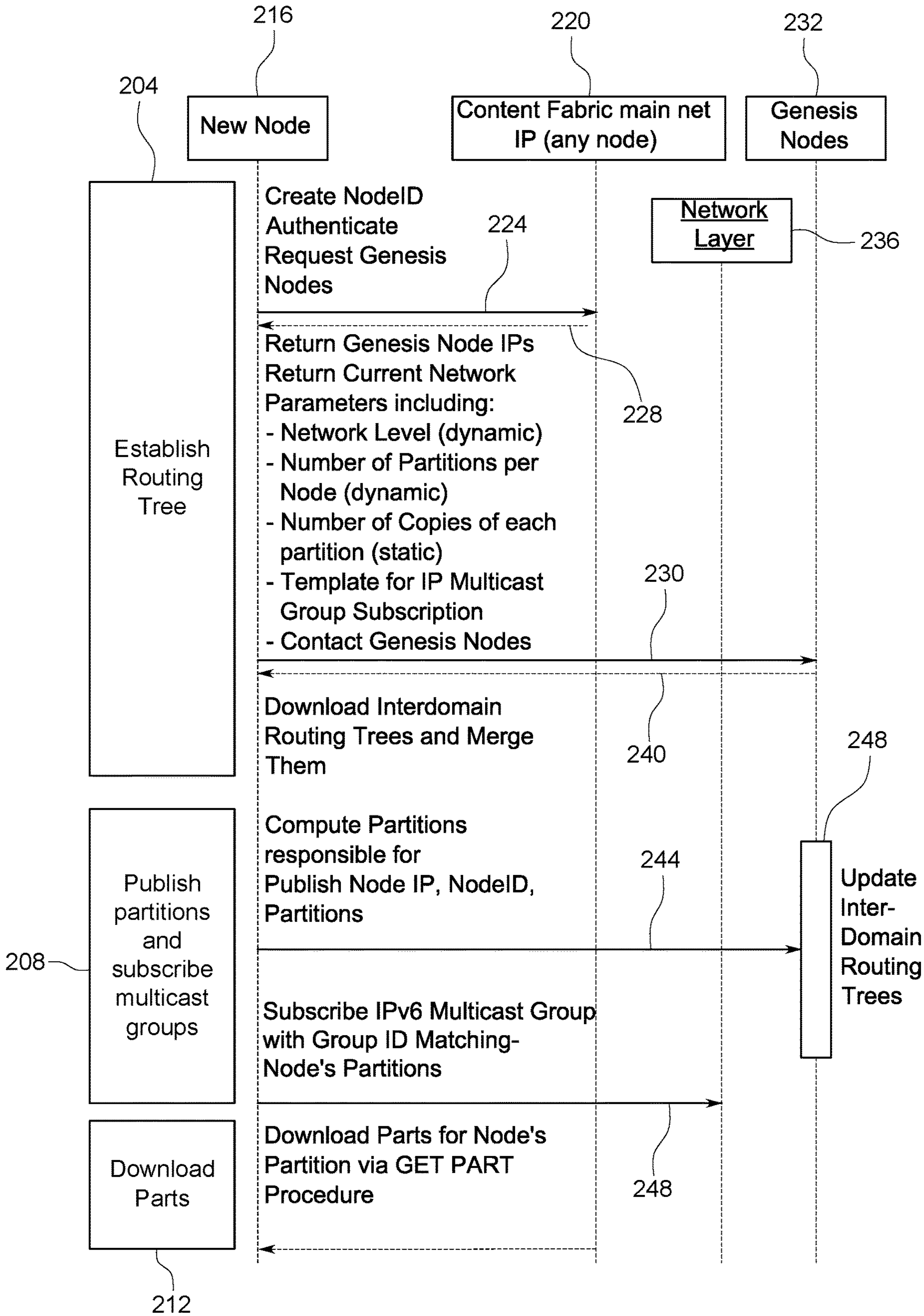
FIG. 2 shows an example of a bootstrapping method for a new fabric node to join a content fabric.
Figure 3:
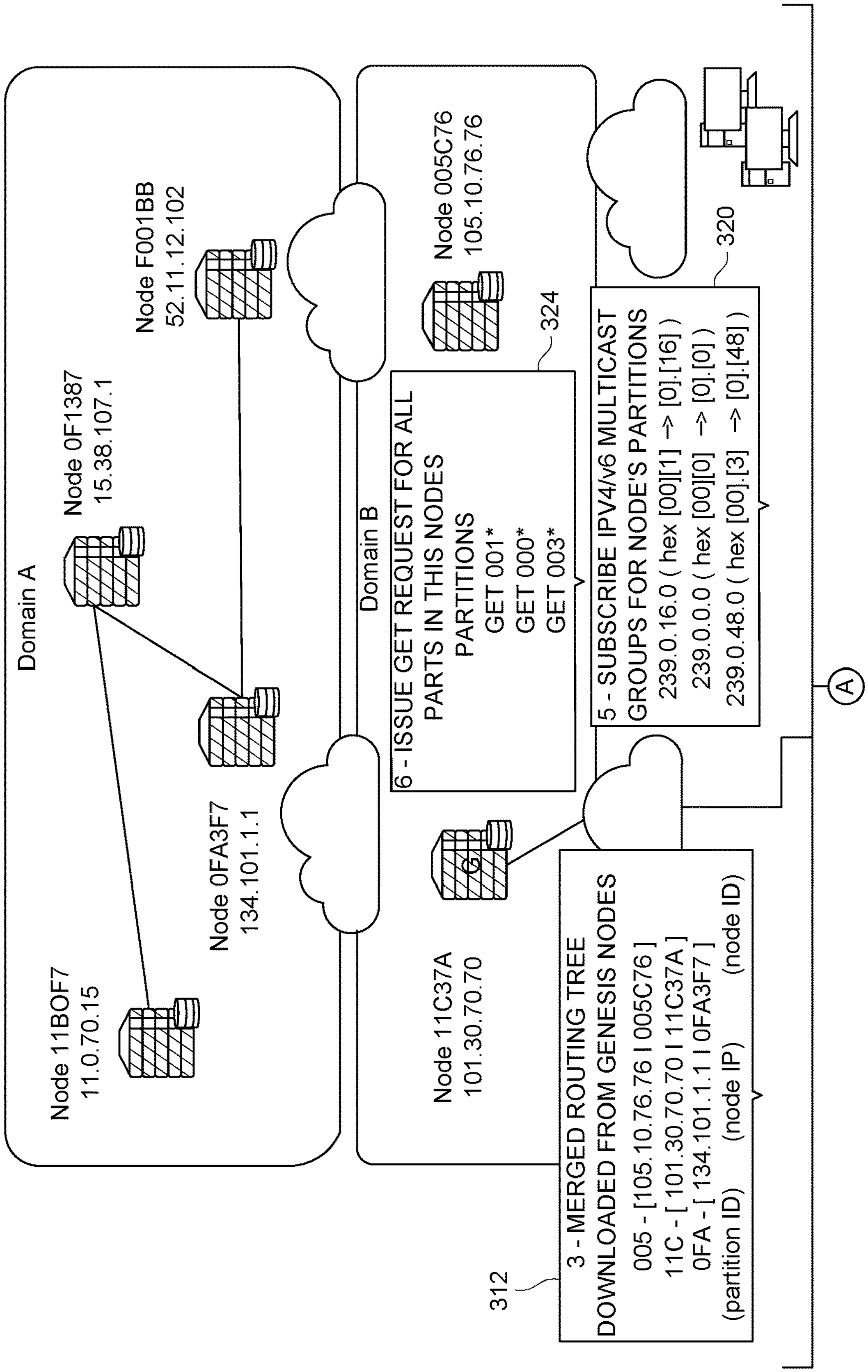
FIG. 3 shows an example of a sequence of events in an instance of the bootstrapping method of FIG. 2.
Figure 3:
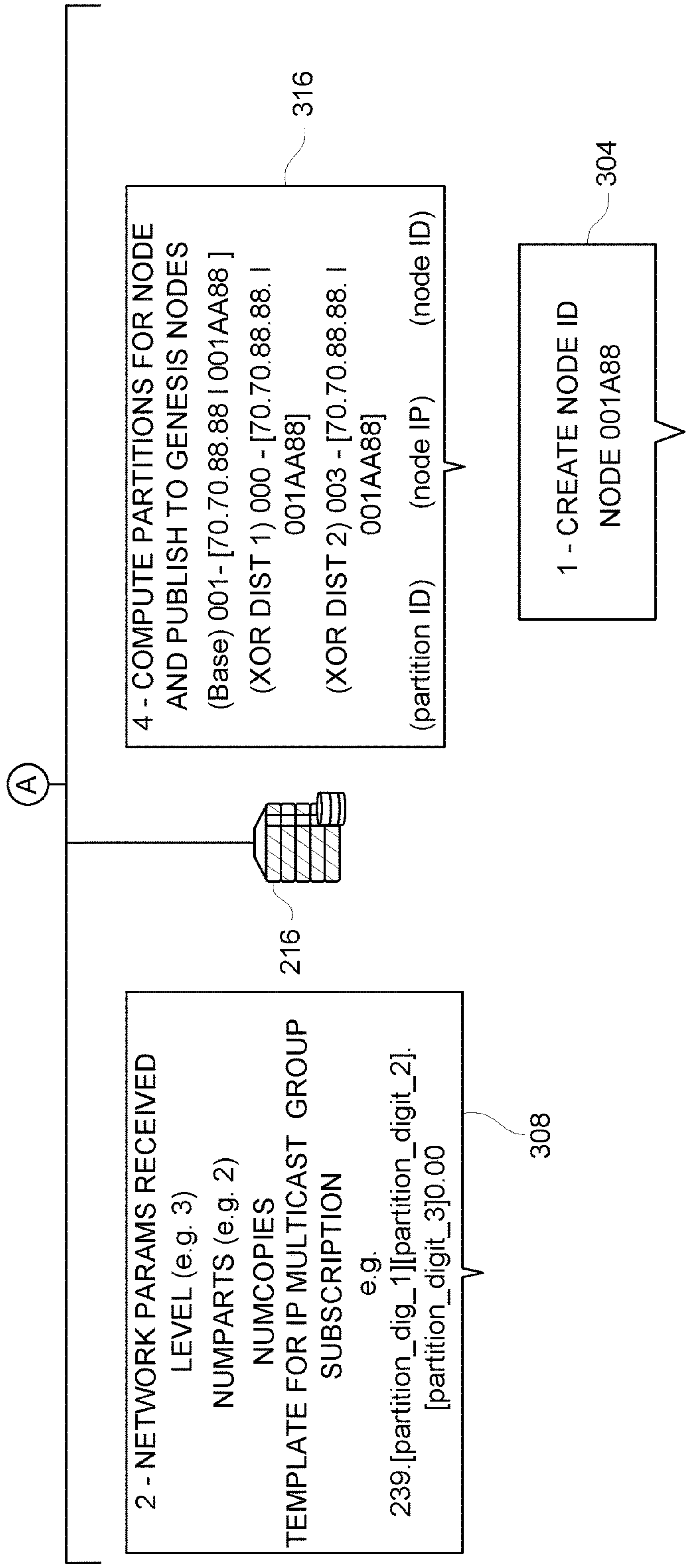

FIG. 2 shows an example of a bootstrapping method for a new fabric node to join a content fabric. FIG. 3 shows an example of a sequence of events in an instance of the bootstrapping method of FIG. 2. Some implementations of the method of FIG. 2 can be broken into stages, namely stage 204, in which a routing tree is acquired, stage 208, in which a fabric node's partitions are computed and published, and a subscribe operation to subscribe the fabric node to local multicast groups for those partitions is performed, and stage 212, in which content object parts can be downloaded.

In the example of FIGS. 2 and 3, a new fabric node 216 generates a node ID for itself as illustrated by block 304 of FIG. 3, and an authentication can be performed. Fabric node 216 then sends a request message at 224 of FIG. 2 to any existing fabric node 220 of the content fabric. In response to the request, at 228, existing fabric node 220 returns a list of genesis fabric nodes, referring to fabric nodes that have been present since the initial state of the overlay network, and thus usually have the richest inter-domain partition knowledge. At 228 of FIG. 2, existing fabric node 220 also returns a number of current network parameters, which can include a current network level, the current numparts per node, a number of copies of each partition (numcopies), and a template for IP multicast group subscription. An example of these network parameters received by new fabric node 216 is shown in block 308 of FIG. 3.

In FIG. 2, in response to receiving the network parameters, new fabric node 216 can send a request 230 for inter-domain routing trees to one or more genesis nodes 232 through a network layer 236. An example of a genesis node is node 11C37A of FIG. 3. The genesis node or nodes 232 can respond at 240 of FIG. 2 with the latest versions of inter-domain routing trees, which can be merged at new fabric node 216 for the most up-to-date version. An example of merged routing trees downloaded from genesis nodes is shown in block 312 of FIG. 3.

In FIG. 2, new fabric node 216 computes the partition IDs that node 216 will cover as described in greater detail herein. An example of the computed partition IDs is shown in block 316 of FIG. 3. New fabric node 216 then publishes, at 244 of FIG. 2, the new fabric node's node ID, public IP address, partition IDs and any other associated details to the genesis fabric node(s) 232 who update their routing trees at 248 with the details of new fabric node 216.

In FIG. 2, after 244, new fabric node 216 subscribes at 248 to an IPv6 multicast group whose address can be directly computed from the partition IDs that new fabric node 216 is responsible for. An example of the subscribe operation is shown in block 320 of FIG. 3. Once new fabric node 216 has established its routing tree, new fabric node 216 will start a background method for acquiring the content object parts the new fabric node is responsible for. For instance, in block 324 of FIG. 3, since new fabric node 216 is now 'online' and could receive requests for content object parts the new fabric node hasn't yet acquired, new fabric node 216 can acquire content object parts on demand through GET requests using the GET operation described in greater detail herein.

FIG. 4 shows an example of a method for assigning partitions to fabric nodes. At 404, a node ID, for instance, in the form of a 32 byte ID, is assigned to a fabric node. In some implementations, the node ID and assignment can be self-generated by the fabric node. The method proceeds from 404 to 408, at which the fabric node retrieves network parameters including, in this example, network level and numparts. At 412, following 408, the partition for a given node ID for the fabric node is computed, and the computed partition is referred to as the base partition. For example, the first n hex digits of the node ID, where n=level, can be extracted as a prefix. The method then proceeds to 416, at which the partition set that the fabric node is responsible for is calculated. In this example, the partition set is a set of partition IDs of size equal to numparts, including the partition ID for the node ID determined above, with the property that the XOR distance between the IDs of any partition in the set and the base partition for the fabric node is less than or equal to numparts. At 420, a method implementing a deterministic algorithm is performed to create a set of size numparts, where each element has the same bit size as the base partition and is represented as illustrated in FIG. 4. And, at 420, an XOR of the base partition and each of the elements of the set illustrated in FIG. 4 is computed to find the remaining elements of the partition set.

Figure 5:
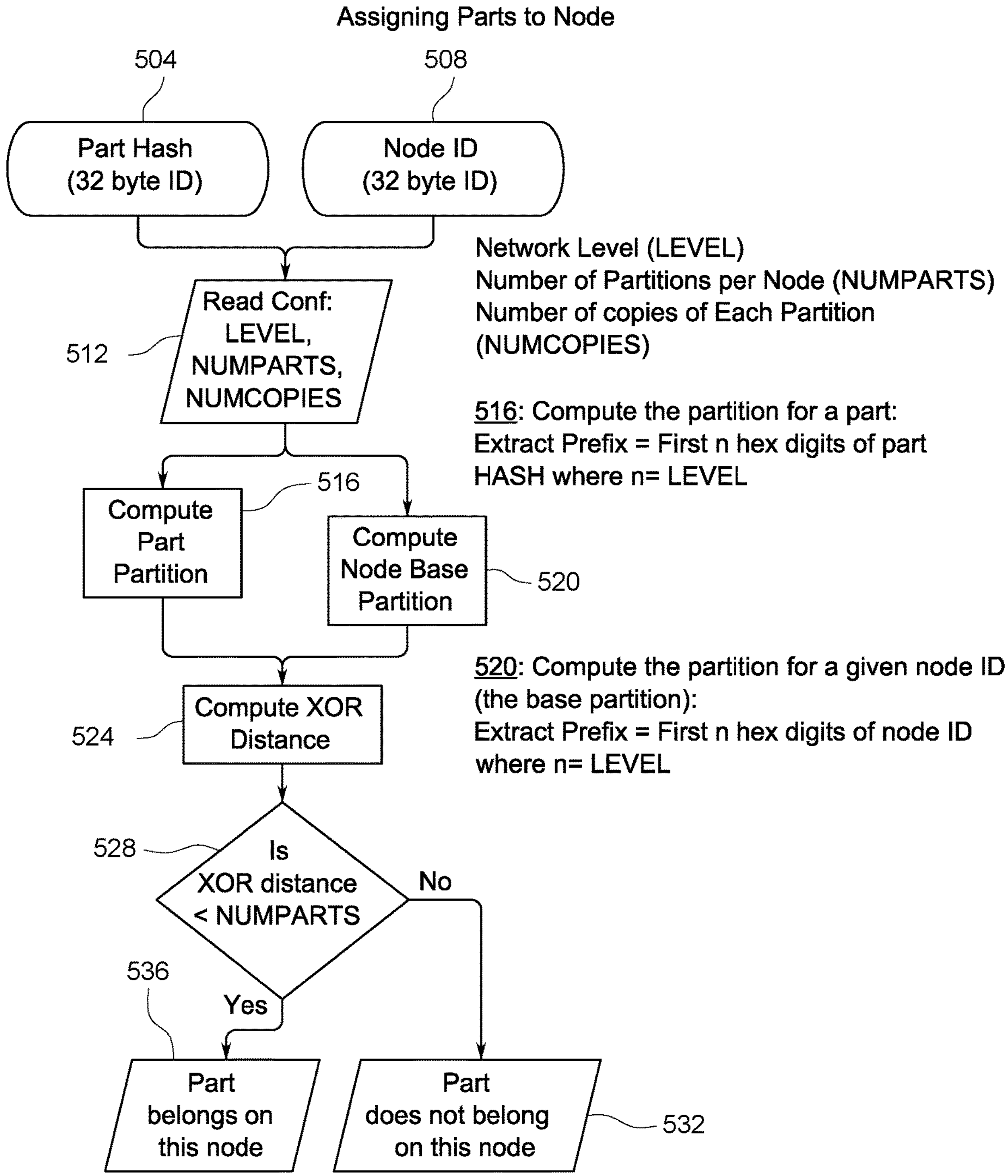
FIG. 5 shows an example of a method for assigning content object parts to a fabric node.

FIG. 5 shows an example of a method for assigning content object parts to a fabric node. At 504 and 508, inputs in the form of a content object part hash and a node ID, for example, in the form of 32 byte IDs, are provided. At 512, other inputs in the form of a network level and numparts, as described above at 408 of FIG. 4, are provided. In this example, at 512, numcopies is also provided as an input. At 516, following 512, a partition for the content object part is computed. Also, in this example, a prefix is extracted, where the prefix is the first n hex digits of the content object part hash, where n is the network level.

In FIG. 5, also following 512, at 520, a node base partition is computed to extract a prefix as described above at 412 of FIG. 4. At 524, following 516 and 520, an XOR distance is computed between the values determined at 516 and 520. At 528, it is determined whether the XOR distance is less than numparts. If not, the method proceeds to 532, at which it is determined that the content object part does not belong on the fabric node being considered. Returning to 528, if the XOR distance is less than numparts, the method continues to 536, at which it is concluded that the content object part belongs on the fabric node.

Figure 6:
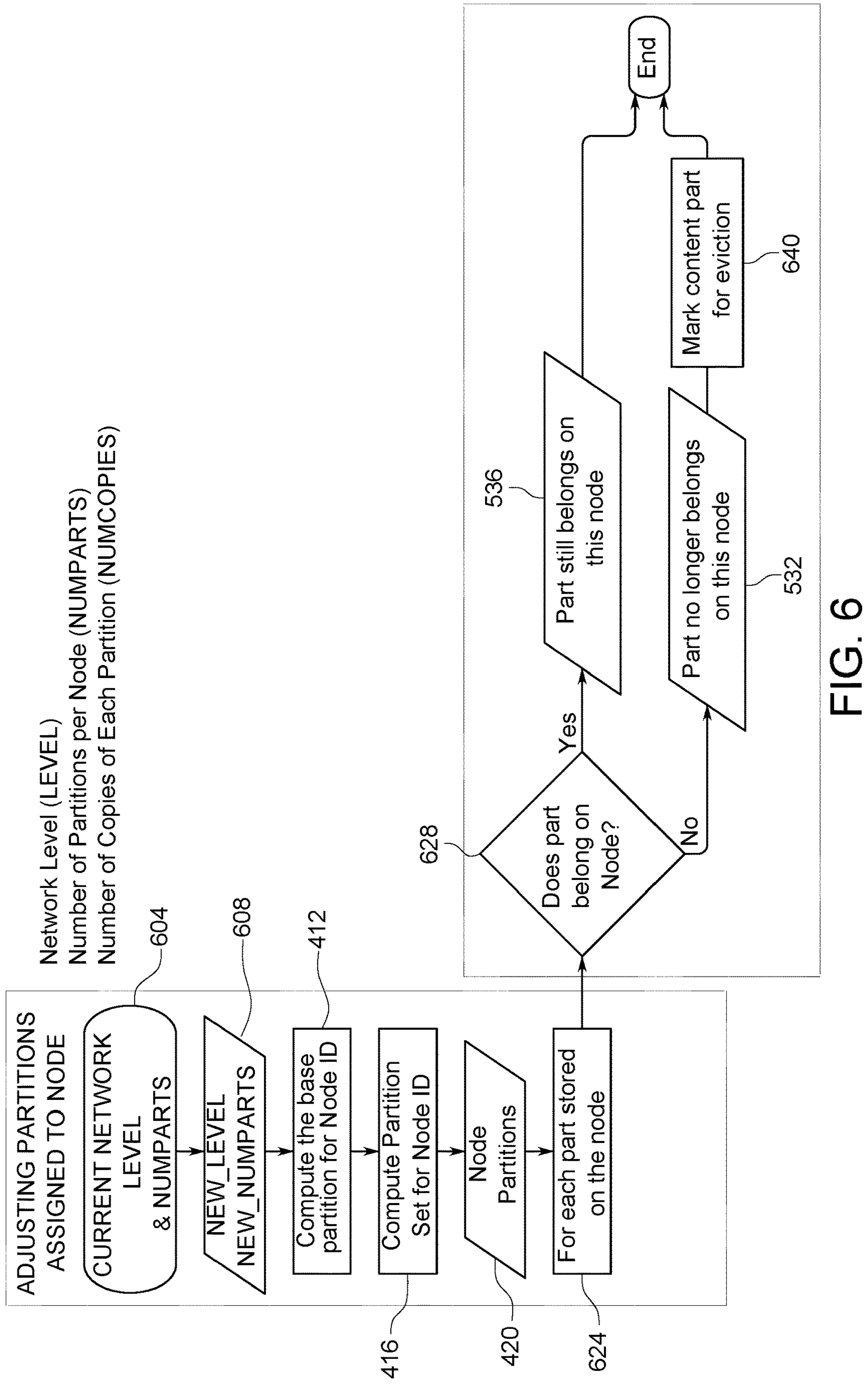
FIG. 6 shows an example of a method for re-partitioning the overlay network of the content fabric.

FIG. 6 shows an example of a method for re-partitioning the overlay network of the content fabric. In some implementations, using the method of FIG. 6, partitions assigned to a particular fabric node can be adjusted. At 604, current network parameters including network level, numparts and numcopies are retrieved. At 608, input parameters in the form of at least new network level and new numparts for adjusting the partitioning are provided to desirably replace the current parameters retrieved at 604. Following 608, operations 412, 416 and 420 of FIG. 4 are performed.

In FIG. 6, at 624, following 420, for each content object part stored on the fabric node, it can be determined at 628 whether the given content object part belongs on the particular node, for instance, using techniques as described above at operations 516, 520, 524 and 528 of FIG. 5. Possible outcomes of 628 in FIG. 6 include 532 and 536 of FIG. 5. In this example, when it is determined at 532 that the content object part no longer belongs on the fabric node, the particular content object part can be marked at 640 for eviction, for instance, for later addressing during a background cleanup method or during live cache processing on the node.

Figure 7:
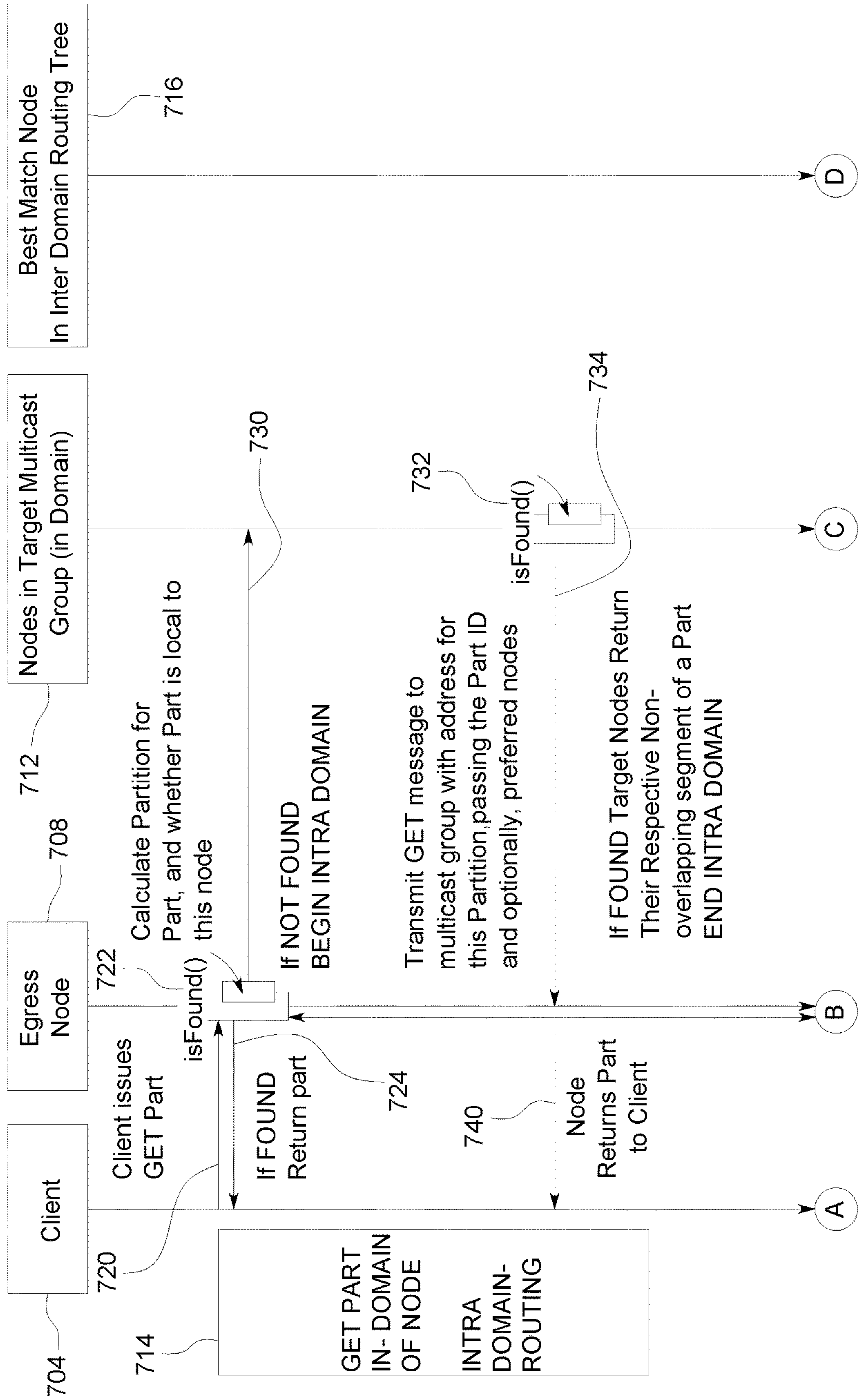
FIG. 7 shows an example of a content routing method for retrieving a content object part.
Figure 7:
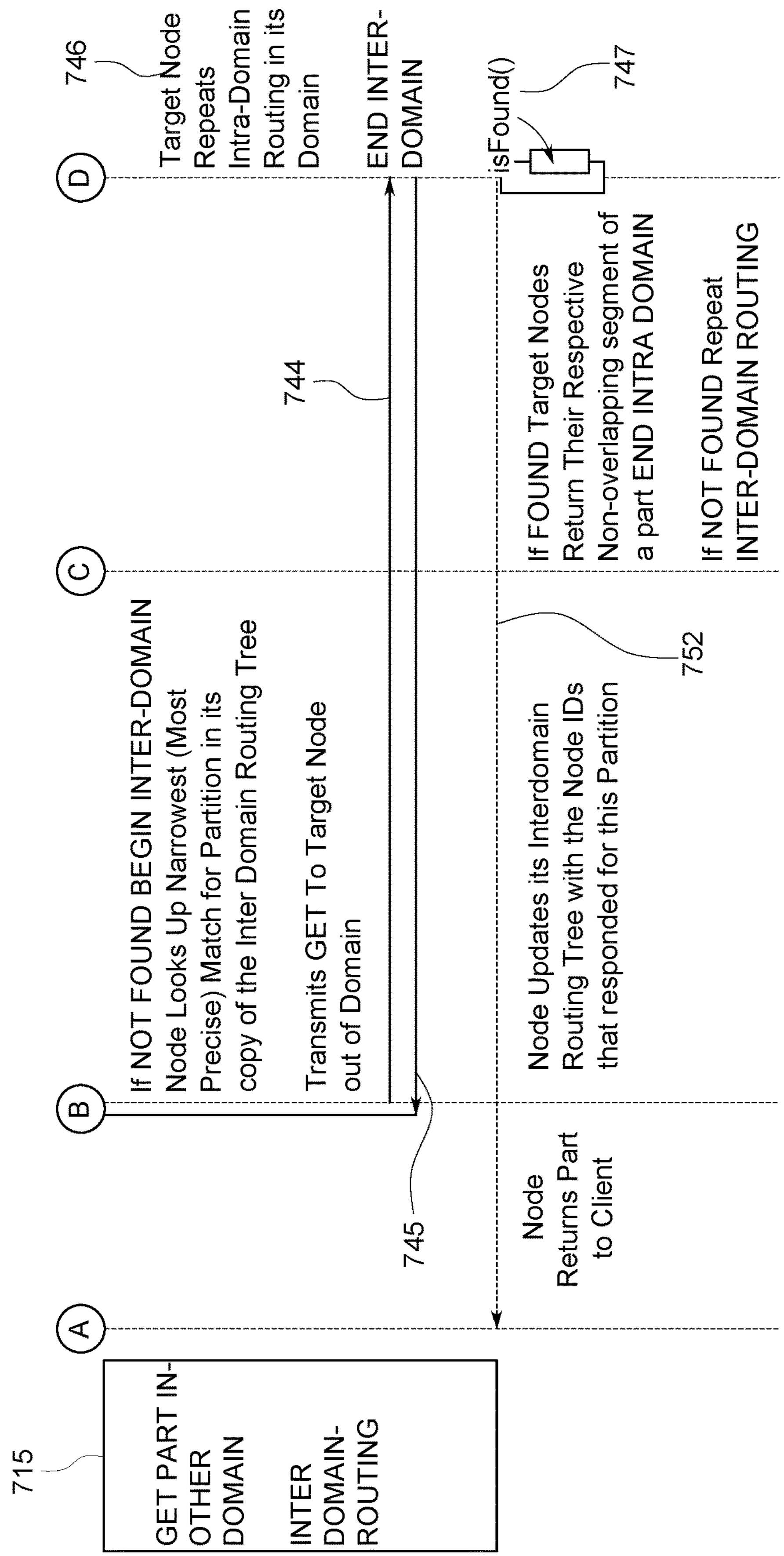
Figure 8:
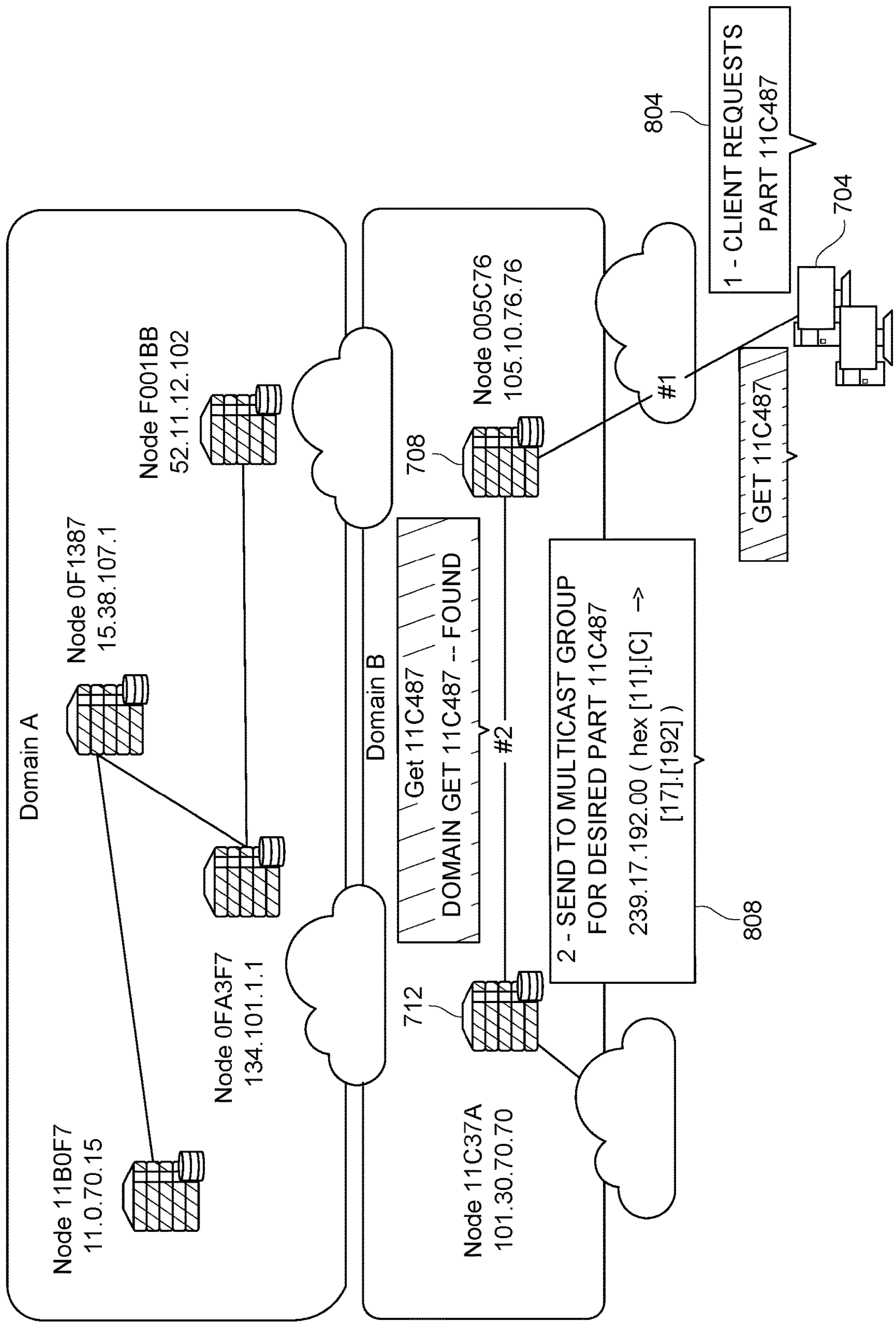
FIG. 8 shows an example of a first fabric node in a domain acquiring a content object part from a second fabric node in the same domain in response to a client sending a request for the content object part to the first fabric node, when the first fabric node does not have the content object part.

FIG. 7 shows an example of a content routing method for retrieving a content object part, and FIG. 8 shows an example of a first fabric node in a domain acquiring a content object part from a second fabric node in the same domain in response to a client sending a request for the content object part to the first fabric node, when the first fabric node does not have the content object part. In FIGS. 7 and 8, a client 704 is in communication with an egress node 708, which is in communication with other fabric nodes 712 in a target multicast group within the domain of egress node 708, labeled "Domain B" in FIG. 8.

In FIG. 7, two stages of content routing are illustrated: first, intra-domain routing 714, and then inter-domain routing 715. Both types of routing are explained in greater detail herein. At 720, client 704 sends to egress node 708 a request to GET a content object part, illustrated in box 804 in FIG. 8. In response to this request, egress node 708 calculates a partition for the requested content object part and determines whether the requested part is local to node 708, that is, in one of the partitions of node 708, as shown in FIG. 7. If egress node 708 finds, at 722, the requested content object part stored on a disk or other memory at egress node 708, egress node 708 returns the found part to client 704 at 724.

If egress node 708 does not find the requested content object part locally, egress node 708 initiates an intra-domain GET at 730, where egress node 708 transmits a GET message to intra-domain nodes 712 using a network address for the calculated partition such as a multicast address, passing the content object part's part ID and, in some instances, identifiers of preferred nodes based on the fabric nodes' ML-predicted performance scores. An example of the GET message is illustrated in box 808 of FIG. 8. In FIG.

7, if one or more of intra-domain nodes 712 find the requested content object part at 732, the node(s) 712 return at 734 the requested part to egress node 708, which can then relay the found part to client 704 at 740. In some implementations, when two or more of intra-domain nodes 712 have the requested content object part, each node 712 returns a respective non-overlapping segment of the content object part. Such can be desirable to avoid a redundant transmission of data from multiple fabric nodes that respond to a request. Responding fabric nodes can compute non-overlapping segments within the requested content object part according to a position derived from data in the multicasted request.

In FIG. 7, when no intra-domain nodes 712 are able to find the requested content object part, inter-domain routing 715 begins. In some implementations, egress node 708 looks up a narrowest, or most precise, match for the partition in egress node 708's copy of an inter-domain routing tree. In some implementations, egress node 708 finds the most specific match to the target partition that has currently known fabric nodes and sends a request to the best scoring of these fabric nodes, identified in FIG. 7 as best match node 716.

Figure 9:
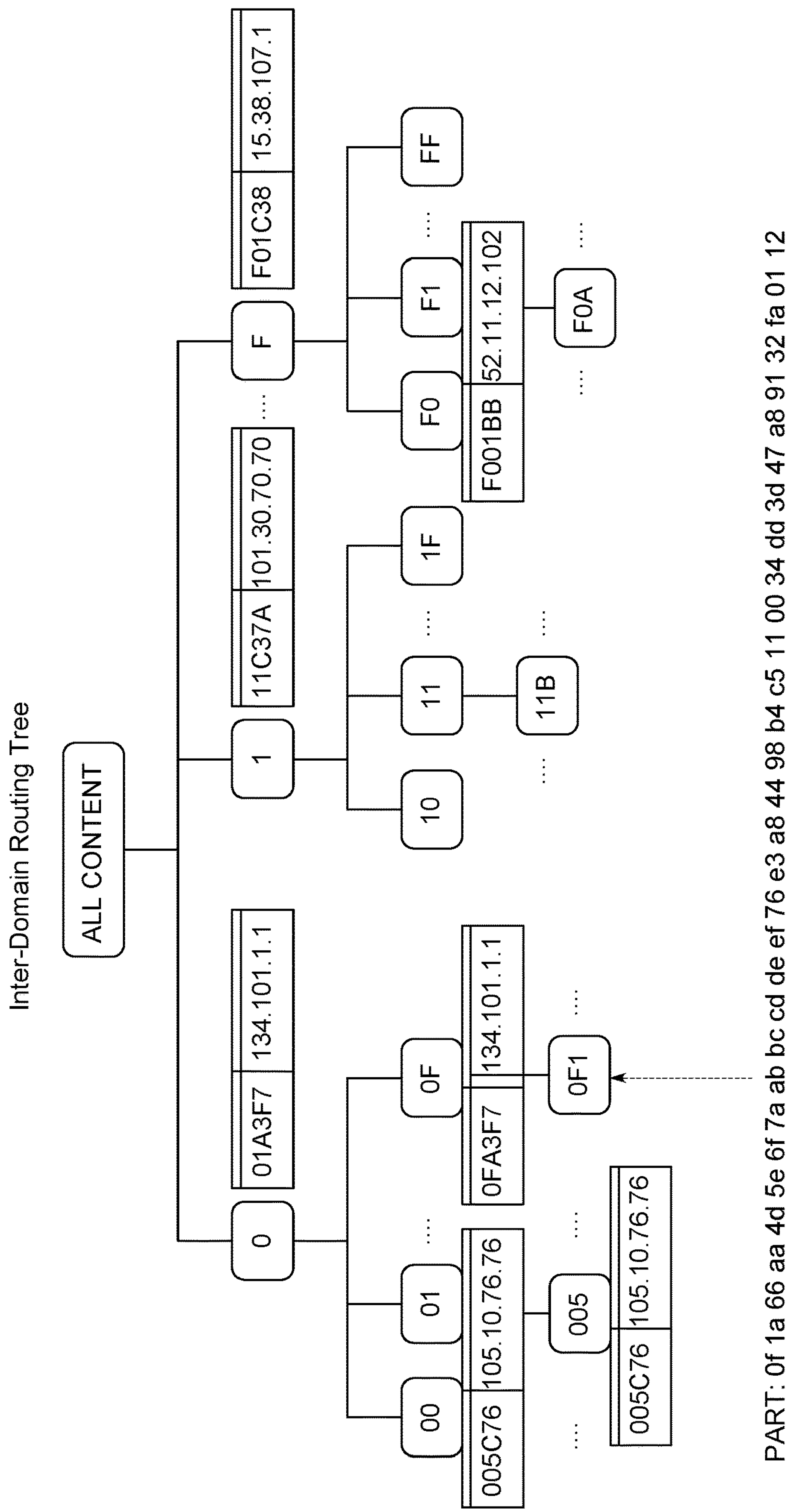
FIG. 9 shows an example of an inter-domain routing tree illustrating the location of a content object part using a designated partition level.

For instance, FIG. 9 shows an example of an inter-domain routing tree illustrating the location of a content object part, '0f 1a 66 aa 4d 5e 6f 7a ab be cd de ef 76 e3 a8 44 98 b4 c5 11 00 34 dd 3d 47 a8 91 32 fa 01 12', using a designated partition level. Using such a routing tree, returning to FIG. 7, an IP address of best match node 716 is retrieved, so egress node 708 can send, at 744, a GET to best match node 716 to request the content object part.

In some implementations, the inter-domain routing converges on average to find a domain outside of egress node 708's domain containing the content object part within well fewer than log(n) steps and within a maximum of log(n) steps (where n is the number of domains in the network), and once the domain is found, the intra-domain lookup is performed in the external domain to return the content object part immediately. In some implementations, the inter-domain routing protocol uses a routing table, such as that illustrated in FIG. 9, structured as a binary tree where each level in the tree corresponds to increasingly specific "levels" within the partition ID being searched for, and a list of node IDs and their address details that are known to have that partition ID.

Figure 10:
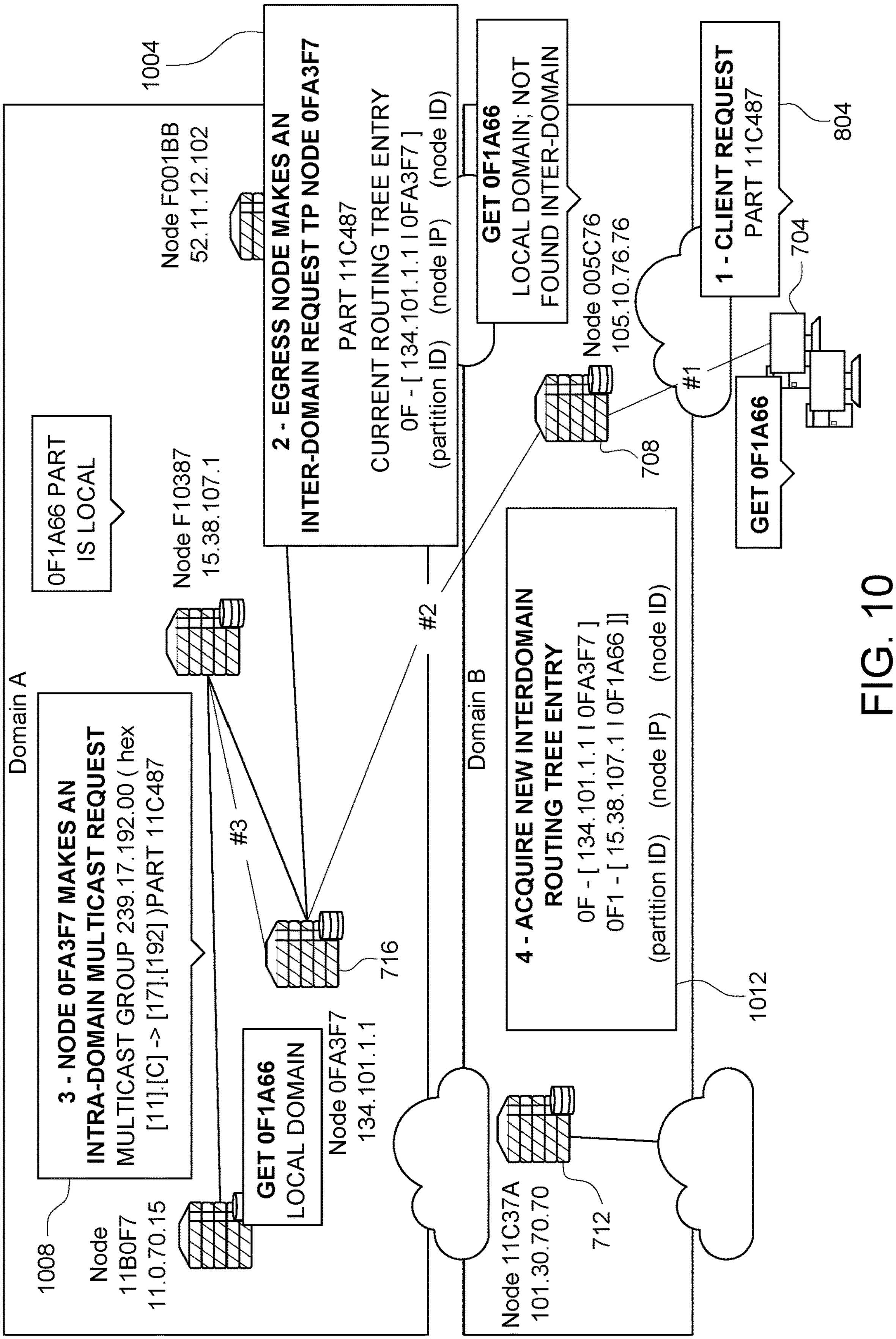
FIG. 10 shows an example of a first fabric node in a first domain acquiring a content object part from a second fabric node in a second domain outside of the first domain in response to a client sending a request for the content object part to the first fabric node, when the first fabric node does not have the content object part.

FIG. 10 shows an example of a first fabric node in a first domain acquiring a content object part from a second fabric node in a second domain outside of the first domain in response to a client sending a request for the content object part to the first fabric node, when the first fabric node does not have the content object part. FIG. 10 is similar to FIG. 8 in some respects, with like reference numerals indicating like parts. In FIG. 10, inter-domain routing requests are sent from Domain B to Domain A, as illustrated. For instance, an example of egress node 708 making an inter-domain GET request 744 is illustrated by box 1004. Returning to FIG. 7, if best match node 716 has the requested content object part, at 745, best match node 716 returns the requested part to egress node 708. If best match node 716 does not have the requested content object part, at 746, best match node 716 can perform operations 730 and 734 within Domain A to find a fabric node within Domain A that has the requested part. Returning to the example of FIG. 10, operations 730 and 734 performed by node 716 are illustrated in box 1008.

If the requested content object part is retrieved in Domain A at 747 of FIG. 7, target nodes in Domain A send respective non-overlapping segments of the content object part back through egress node 708 to client 704 at 752. At this stage, it is desirable for egress node 708 to update its inter-domain routing tree of FIG. 9 with node IDs that responded with content object parts for the designated partition. An example of such an update is illustrated in box 1012 of FIG. 10.

It should also be noted that in instances when no fabric nodes in Domain A of FIG. 10 have the requested content object part, additional inter-domain routing can be performed between Domain B and other domains such as Domains C, D, etc. That is, egress node 708 can send requests to high scoring fabric nodes in the next level up, e.g., less specific, that are known to have matching partitions.

In some implementations, PUT-ing a new content object part into the overlay network uses a similar method as GET-ing a content object part. For instance, when a client makes a request to a fabric node, such as an ingress node as described below, to PUT the content object part, the ingress node can multicast the content object part on the multicast groups associated with the ingress node's partition ID, and desirably enough fabric nodes respond to meet a replication requirement for the network. Else the ingress node consults the inter-domain routing tree and publishes the content object part by again finding the most specific matching known fabric node(s), which apply intra-domain routing until a sufficient number of matching target fabric nodes are returned. The new content object part is transmitted to these fabric node(s), and the routing tree is updated with learned node IDs and address details.

Figure 11:
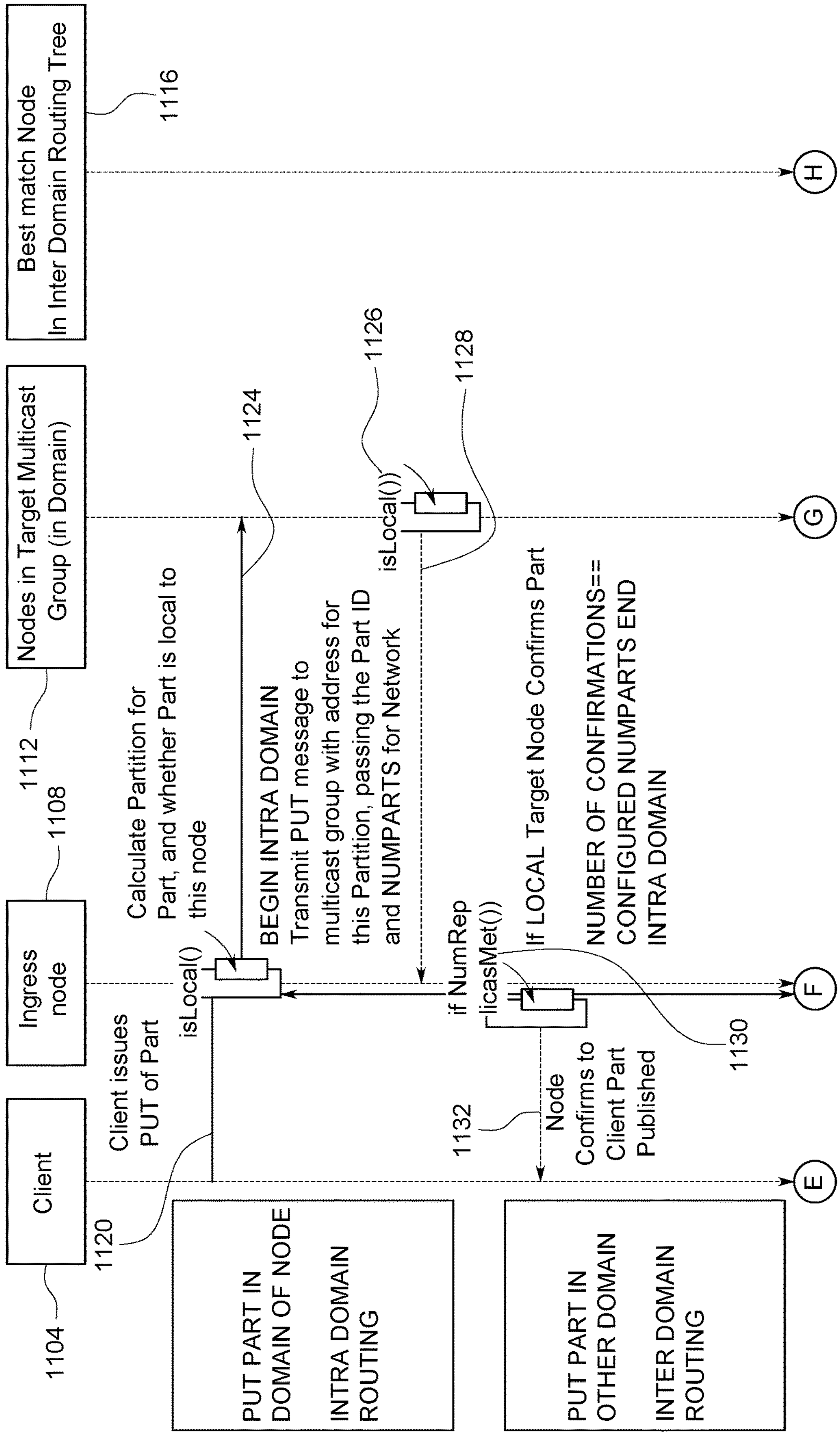
FIG. 11 shows an example of a content routing method for publishing a content object part into the content fabric.
Figure 11:
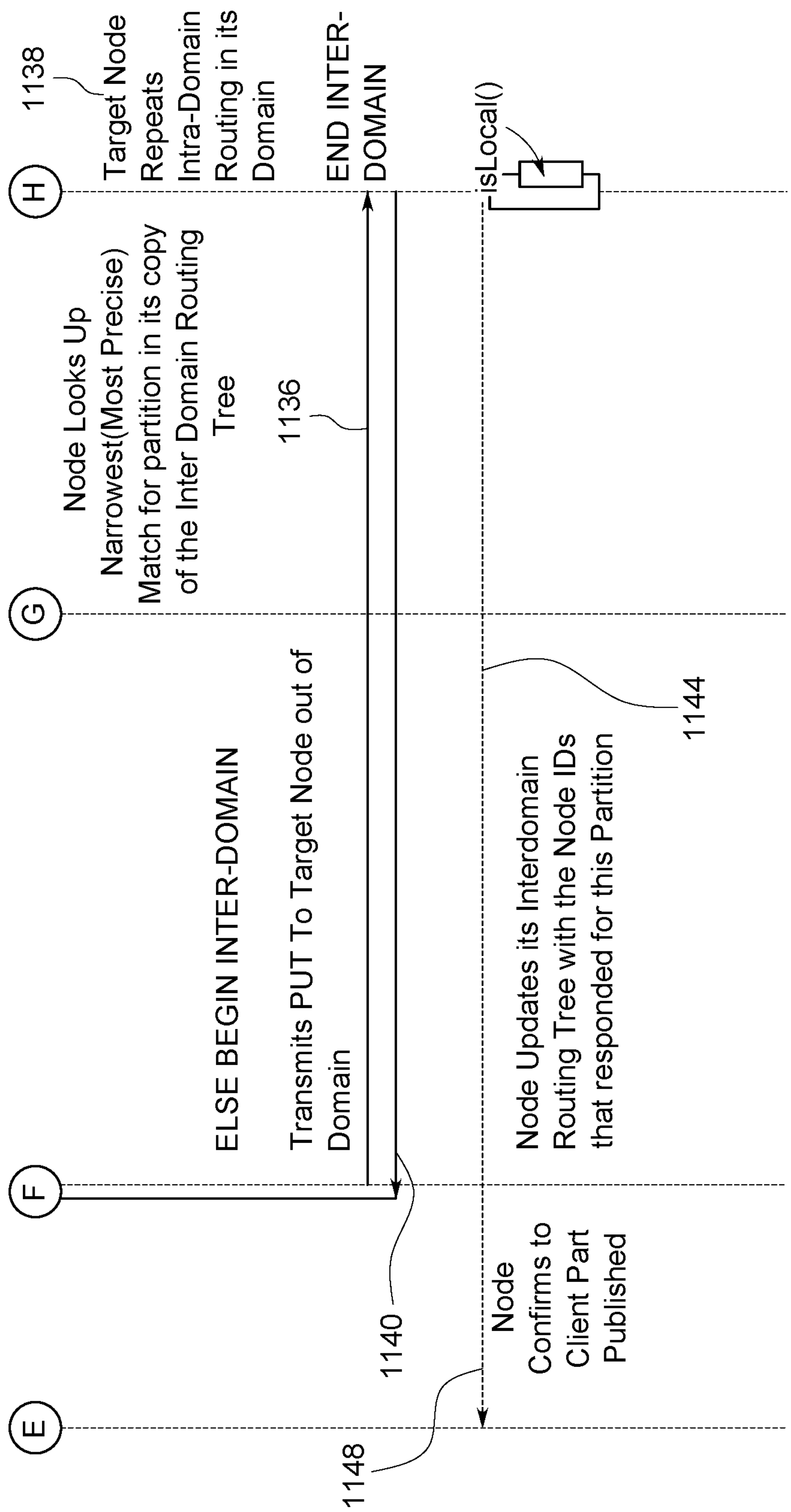

FIG. 11 shows an example of a content routing method for publishing a content object part into the content fabric. In FIG. 11, entities participating in the publishing include a client 1104, an ingress node 1108, intra-domain fabric nodes 1112, that is, in the domain of ingress node 1108, and a best match node 1116 referring to a best match node in an inter-domain routing tree as described above with reference to FIG. 9. In FIG. 11, at 1120, client 1104 issues a PUT of a content object part to ingress node 1108. In response to the PUT, ingress node 1108 calculates a partition for the content object part and determines whether the content object part is to be stored locally at ingress node 1108. At 1124, ingress node 1108 begins intra-domain routing by transmitting a PUT message to intra-domain nodes 1112, with an address for the partition, passing a part ID and numparts. The part ID identifies the content object part.

In FIG. 11, at 1126, if one or more intra-domain nodes 1112 can confirm that the content object part can be stored locally at the one or more nodes 1112, at 1128, the node(s) 1112 communicate(s) back to ingress node 1108 a confirmation message. At 1130, if the number of confirmations is equal to or greater than a desired number of replicas indicated by numparts, then registration is complete, in which case ingress node 1108 can confirm, at 1132, back to client 1104 that the content object part has been successfully published. Returning to 1128, if the number of confirmations received back from nodes 1112 is less than numparts, the method continues at 1136 where ingress node 1108 transmits a PUT to a target node outside of the domain of ingress node 1108. In this example, the target node is best match node 1116 identified using the inter-domain routing tree.

In FIG. 11, best match node 1116 can perform and repeat intra-domain routing in the domain of node 1116, at 1138, as described above. That is, node 1116 can perform PUTs in the fabric nodes in that domain. If, at 1140, the number of confirmations back from nodes in the domain of best match node 1116 plus the number of confirmations at 1128 does not equal or exceed numparts, inter-domain routing to additional different domains can be performed. Target nodes that accept and store the content object part in response to the PUT return confirmations at 1144 back to ingress node 1108, at which point ingress node 1108 can update its inter-domain routing tree with the node IDs of the target nodes that responded for the partition. Then, at 1148, ingress node 1108 confirms back to client 1104 that the content object part was successfully published.

In some implementations, a continuous ML system allows individual clients to learn fabric nodes and paths that yield high performance.

In some implementations, the content fabric provides an overlay network where fabric nodes are equal participants in a full mesh network, and content object parts including raw data, metadata and code are delivered. Thus, it is not required for the overlay network to have direct knowledge of the underlying Internet topology and routing infrastructure. When a client makes a request of the content fabric to GET content, the client is directly served by a fabric node, which is referred to herein as an egress node for the sake of ML. That egress node either has the content object part or searches to find a fabric node that can supply the content object part, as described in greater detail herein. The supplying fabric node is referred to herein as an origin node for the sake of IL.

In some implementations, in terms of delivery quality, it can be desirable to optimize with ML:

- start-up latency: it can be desirable for a client to receive parts with minimum latency, for instance, meeting the "200 milliseconds" considered instantaneous by human perception, to start playing/experiencing served content.
- delivery bandwidth: it can be desirable for clients to receive streams and downloads from the content fabric such that their "bottleneck bandwidth" in their connection to the Internet is the bottleneck in receiving speed.
- least use of core Internet bandwidth: to minimize cost, it can be desirable to use the core Internet bandwidth as little as possible given meeting the client quality targets. Thus, it can be desirable to "localize" the selection of egress and origin nodes to avoid crossing the Internet core as much as possible.

Given the overlay network model, in some implementations, two separate dimensions can be independently optimized and in turn "learned"—the selection of an egress node, and the selection of an origin node relative to an egress, which is called an "egress-origin segment." Additionally some implementations optimize these features for each individual client, meaning that not all clients will prefer the same choices and that some implementations cannot know a priori a good choice for a client except to "learn" from appropriate peers.

Some implementations construct a collaborative filtering system in which individual clients learn the best egress nodes and the best egress-origin segments by learning from "like" clients. Specifically, some implementations train a collaborative filtering model where clients learn from clients in their own regions to select egress nodes and learn from all clients to select egress-origin segments.

Thus, in some implementations, each client request is served by: an origin node with constrained bandwidth and capacity, an egress-origin segment in the overlay comprised of underlying network links that can be congested, an egress node with constrained bandwidth and capacity, and a client-egress segment which may not be controlled by the system.

As client requests are fulfilled, some implementations record the delivery bandwidth and time to first byte attributable to the egress-origin segment and attributable to the egress nodes.

Some implementations use the score of the segments and egress node to train the model. And some implementations use the trained model to identify best segments to route subsequent requests.

In some implementations, a collaborative filtering method simultaneously derives the underlying features and the prediction function and minimizes the cost functions for each in two separate applications of the model: one that maximizes the delivery bandwidth, and a second that minimizes the time to first byte (or time to first segment). Some implementations apply the collaborative filtering method independently to the egress-origin segment measurements and the egress node measurements to predict the future scores for each value (bandwidth and time to first byte), for each client, and the model learns expected scores for new clients.

The training may occur in near real-time to ensure that the content fabric adapts fast to changes in resources, failed fabric nodes etc. In some implementations, a computational matrix to continually train this system can scale with the number of clients and the number of paths between fabric nodes. Modern TPU and parallel processing systems are often equipped to perform fast matrix multiplication on very large scale matrices such as "billion×billion" dimensions and learning.

Figure 12:
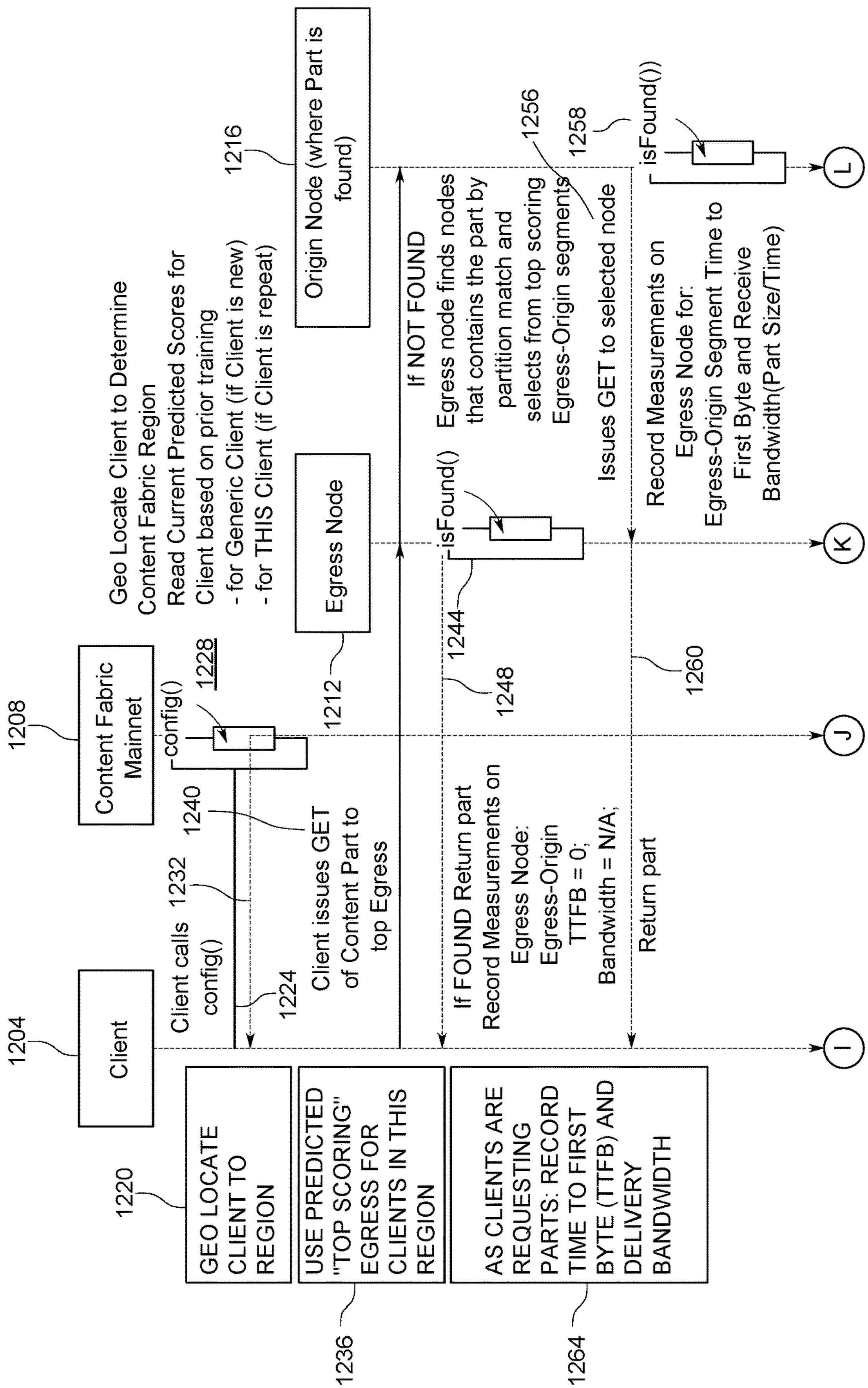
FIG. 12 shows an example of a continuous machine learning (ML) method for predicting best performing egress nodes and egress-origin segments per client.
Figure 12:
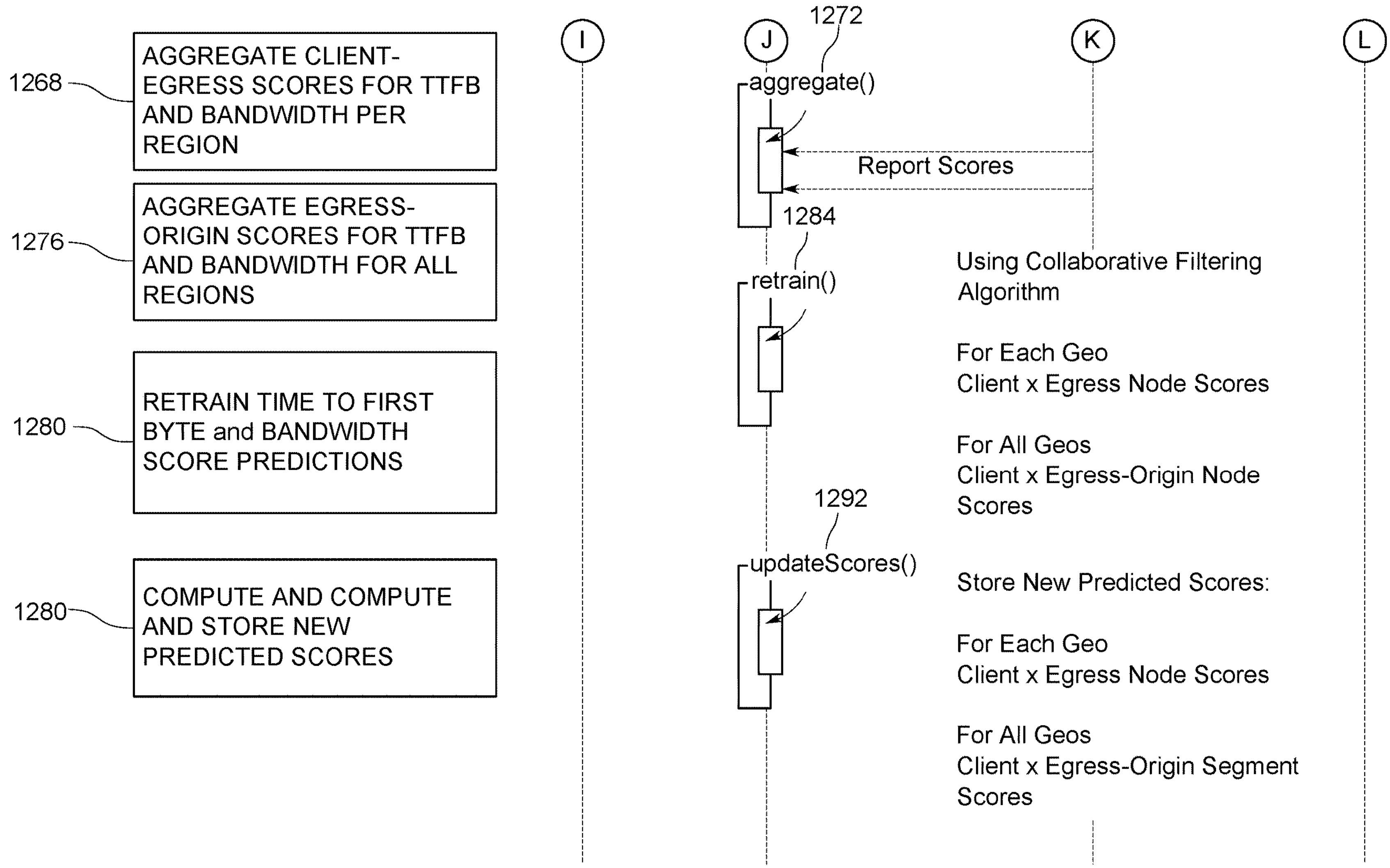

FIG. 12 shows an example of a continuous machine learning (ML) method for predicting best performing egress nodes and egress-origin segments per client. In FIG. 12, participating entities include a client 1204, an ML system 1208 implemented on one or more fabric nodes of the content fabric, an egress node 1212, and an origin node 1216. At stage 1220 of FIG. 12, ML system 1208 is configured to geo-locate client 1204 to determine a geographic region of the content fabric to serve client 1204. In this example, at 1224, client 1204 calls a config( ) method at system 1208. At 1228, ML system 1208 performs the config( ) method to geo-locate client 1204, and the corresponding content fabric geographic region is returned from system 1208 to client 1204 at 1232.

In the example of FIG. 12, current predicted scores for fabric nodes in the determined geographic region for client 1204 are read at 1236 and are based on prior training. The prediction can be for a generic client in situations where client 1204 is new to system 1208. In other instances, when client 1204 is a repeat, the prediction can be specific to client 1204. The current predicted scores are used by ML system 1208 to identify a top scoring egress node for clients in the determined content fabric region. In this example, the top scoring egress node is egress node 1212. Thus, at 1240, client 1204 issues a GET of a content object part to egress node 1212. If egress node 1212 finds at 1244 the requested content object part, at 1248, egress node 1212 returns the found part back to client 1204. In instances where egress node 1212 is unable to find the requested content object part in memory or otherwise local to egress node 1212, at 1252, egress node 1212 finds among the top scoring egress-origin segments the origin nodes that contain the requested content object part by partition match and issues a GET using the intra-domain and inter-domain protocols described in greater detail herein to these origin nodes. In this example, origin node 1216 completes a high scoring egress-origin segment for egress node 1212, and contains the desired contain object part by partition match. Thus, at 1256, egress node 1212 issues a GET to origin node 1216, origin node 1216 identifies the content object part at 1258, and egress node 1212 receives the desired content object part from origin node 1216. The content object part is then returned from egress node 1212 back to client 1204 at 1260.

In FIG. 12, in some implementations, at 1264, measurements can be recorded as content object parts are found and delivered to client 1204. In this example, when egress node 1212 finds the content object part on origin node 1216, egress node 1212 can record measurements detailing the egress-origin segment, time to first byte (TTFB) to receive the content object part, and bandwidth as well as other parameters, as illustrated in FIG. 12. Also, in instances when egress node 1212 has the requested content object part, such measurements can be recorded, in which case, TTFB=0, and bandwidth is not applicable (N/A). Also, as content object parts are returned to client 1204, client-egress scores for TTFB and bandwidth per region can be aggregated at 1268 by ML system 1208. In some implementations, such scores are retrieved from egress node 1212 for aggregation 1272. In some implementations, egress-origin scores are also aggregated for TTFB and bandwidth for all geographic regions at 1276 of FIG. 12.

In the example of FIG. 12, at 1280, TTFB and bandwidth score predictions can be retrained using these aggregated measurements. For instance, as illustrated by reference numeral 1284, ML system 1208 can retrain using a collaborative filtering method using egress node measurements for each geographic region and egress-origin node measurements for all geographic regions in this example. Then, at 1288, new predicted scores can be computed and stored in memory by system 1208. For instance, system 1208 can call an updatescores( ) method 1292 to store new predicted scores. For example, for each geographic region, egress node scores can be stored, and for all geographic regions, egress-origin segment scores can be stored.

In some implementations, in addition to selecting the best egress and content routes based on ML, popular content can be opportunistically cached in the available capacity of the fabric nodes. In some implementations, to select the best content to cache, a second continuous learning model can be used to predict most popular content, and can be used in conjunction with JIT rendering of multiple versions of output media through bitcode in the content fabric.

Predicting popular content can be considered a "time series" problem. For time series prediction, a gradient boosting decision tree is applied in some implementations. In some other implementations, sequential models may be used. In some implementations, the gradient boosting decision tree is applied to a screening data set, where features include content request time, content request duration, content title, playout platform, and other content metadata.

In some implementations, there are two ways to split time series data into training, validation, and testing: a side-by-side split and a walk-forward split. In the side-by-side split, which can be used for a mainstream ML model, the data set is split into at least two portions, one used for training and the other used for testing (with the timeframe of both aligned). The walk-forward split, in comparison, is aimed specifically at data sets with a strong correlation with time.

Figure 13:
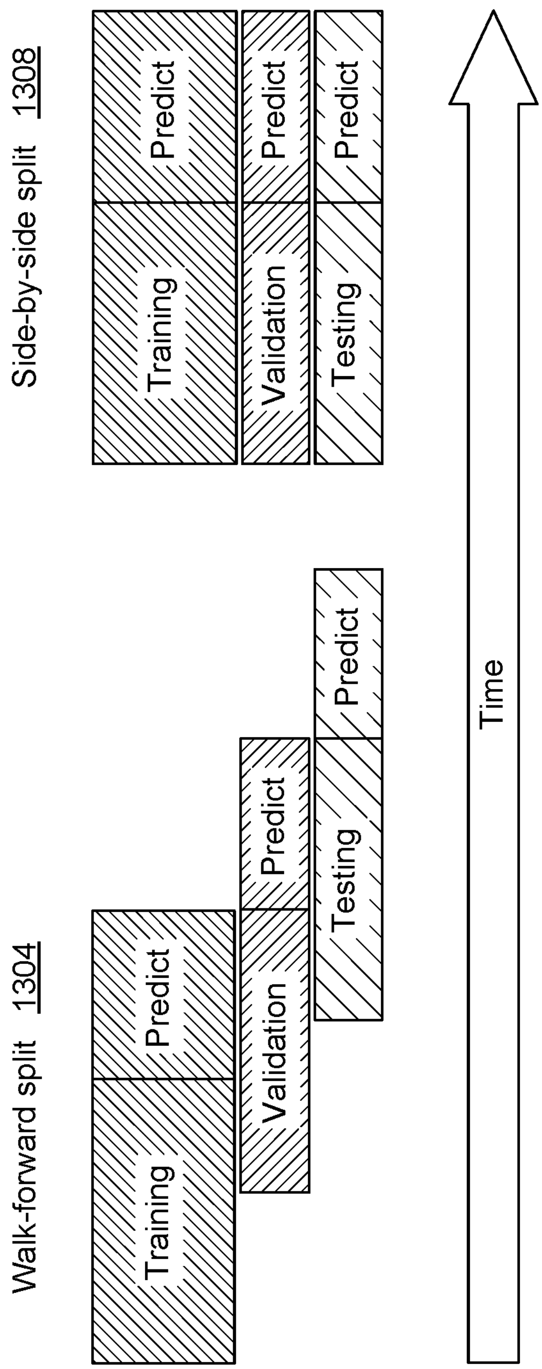
FIG. 13 shows an example of split schemes for training, validation, and testing in a timeframe, where the timeframe of a data set chosen for validation is shifted forward by one prediction interval relative to the timeframe for training.

FIG. 13 shows an example of split schemes for training, validation, and testing in a timeframe, where the timeframe of a data set chosen for validation is shifted forward by one prediction interval relative to the timeframe for training. A walk-forward split 1304 and a side-by-side split 1308 are shown. As shown in FIG. 13, train, validate and test can be performed on the full data set but over different timeframes. Some implementations use a walk-forward split approach, and experimentation can be performed to determine the optimal time duration and time offset in the model.

In some implementations, the model includes a number of features such as content categories, streaming type, request day of the week, and request lifetime, as well as a number of statistical features derived from the data set, such as time windows of popularity, global attention statistics and past request aggregation from previous time periods. For aggregation methods, some implementations use mean, median, max, min, days since, and differences of mean values between adjacent time windows.

In some implementations, the content fabric provides a universal (type and size agnostic) distributed storage solution for digital content that is fundamentally different than conventional distributed file systems and cloud storage in a few key ways: 1) the content fabric avoids duplication of storage or network bandwidth transmission as the content is re-purposed for various output versions, 2) the content fabric provides flexible personalization of the media delivered (programmability), and 3) the content fabric includes intrinsic versioning and an ability to prove the validity of a piece of content and its version history.

In some implementations, a content object's data is stored in data containers called content object parts. A content object part is the fundamental unit of storage, network transfer and caching as mentioned above. A content object part is immutable once finalized and identified by a hash value that is calculated across all of the content object part's content. Thanks to the use of a cryptographic hash function, the authenticity of a content object part's data can be verified by recalculating the hash. The hash also serves as criterion for data deduplication.

In some implementations, when file data is ingested into the content fabric, the file data is automatically partitioned into content object parts to desirably have a consistent part size. Large file data can be split up and stored in multiple content object parts. Multiple small files can be aggregated into a single content object part. User-provided metadata can also be stored in the content object parts, as described above with reference to FIG. 1. In some implementations, even fabric-internal data structures such as a list of content object parts or content verification proofs can be stored in content object parts. In some implementations, the content object is a small data structure that references content object parts by hash and is stored itself as a content object part.

Figure 14:
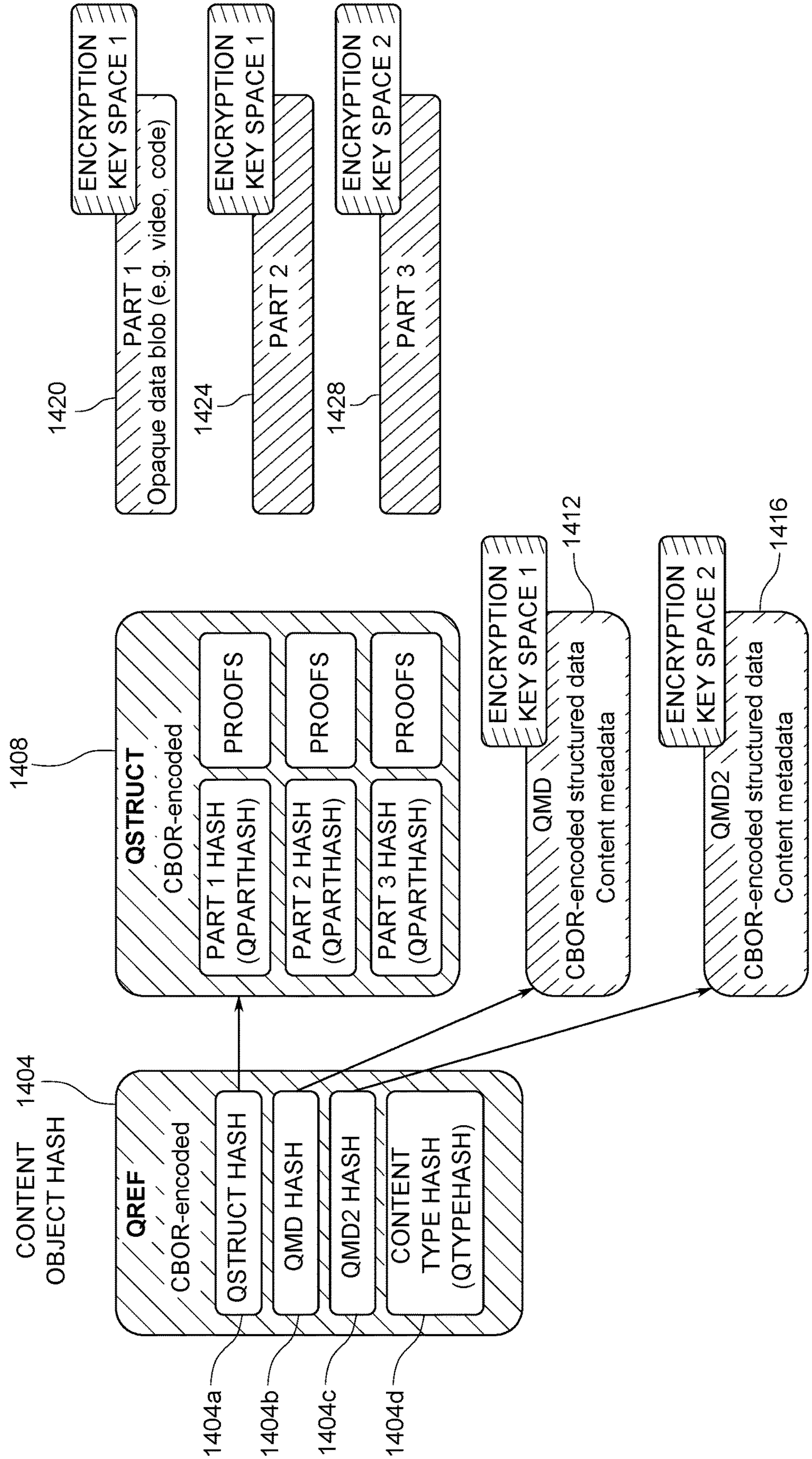
FIG. 14 shows an example of a content object structure in the content fabric.

FIG. 14 shows an example of a content object structure in the content fabric. In this example, a content object includes structural portions in the form of QREF 1404 and QSTRUCT 1408. The content object also includes data portions in the form of metadata QMD 1412 and QMD2 1416, as well as opaque data in the form of opaque data parts 1420, 1424 and 1428. For instance, one or more of opaque data parts 1420-1428 can be an opaque data blob such as raw data and/or code.

In FIG. 14, QREF 1404 of the content object is a content object hash. For instance, the QREF can be encoded in the Concise Binary Object Representation (CBOR) format. CBOR can be desirable in some implementations because CBOR is JSON-like and schema-less, but more efficient in size and faster in processing. The use of a standard encoding format can facilitate validation of the authenticity of metadata: the content object part hash allows validation of the content object part's binary content, while the open format allows extraction of the metadata from it.

In this example, QREF 1404 has sub-components including a QSTRUCT hash 1404*a*, a QMD hash 1404*b*, a QMD2 hash 1404*c*, and a content type hash labeled QTYPEHASH 1404*d*. In this example, QSTRUCT hash **1404*a* is a hash of QSTRUCT 1408, which is also CBOR-encoded in this example. QSTRUCT 1408 includes hashes of opaque data parts 1420, 1424 and 1428 as well as associated proofs. In QREF 1404, QMD hash 1404*b* is a hash of QMD 1412, which is CBOR-encoded structured data stored in an encryption key space 1. By the same token, QMD2 hash 1404*c* of QREF 1404 is a hash of QMD2 1416, which is also CBOR-encoded structured data and stored in encryption key space 2, as shown in FIG. 14. Opaque data parts 1420-1428 can also be stored in designated encryption key spaces as illustrated in FIG. 14**.

In some implementations, using a hierarchical reference structure, content objects scale from small to very large. In some implementations, none of the employed structures impose a limit on size, neither for binary data nor for metadata. The reference structure also provides efficient and fast versioning of content. In some implementations, creating a new version of content includes copying the reference structure, pointing back at the previous version's data, and then creating new structures and data for the pieces that change in the new version. For example, adding a new file to an existing content object results in a new (set of) data, a modified subset of metadata, and updated internal structures. Existing file data (represented as existing content object parts) and the unchanged metadata subset are not duplicated in some implementations.

Figure 15:
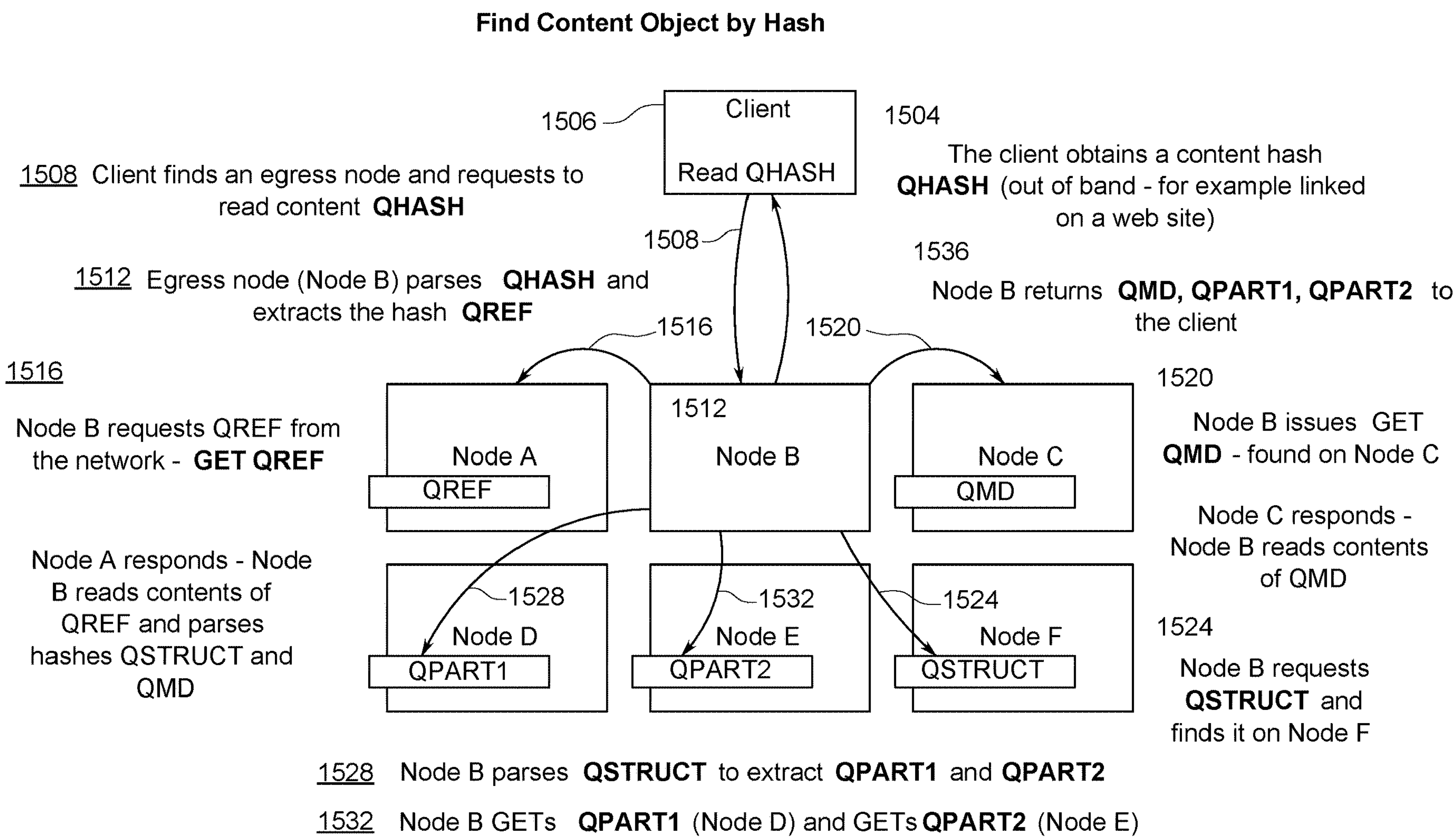
FIG. 15 shows an example of a method for finding content objects by hash.

FIG. 15 shows an example of a method for finding content objects by hash. At 1504, a client 1506 obtains a content hash, QHASH, out of band, for example, linked on a website. At 1508, client 1506 finds an egress node and requests to read content identified by QHASH. An example of such an egress node is node B of FIG. 15. At 1512, node B parses QHASH and extracts a content object hash, QREF, in this example. At 1516, node B requests QREF from the content fabric, for instance, using a GET QREF command. In this example, node A of FIG. 15 has QREF and, thus, responds. Node B can then read contents of QREF and parse hashes QSTRUCT and QMD from QREF, as illustrated in FIG. 14. At 1520 of FIG. 15, node B issues a GET QMD, and node C responds since QMD is stored on node C, as shown in FIG. 15. So node B can read contents of QMD. At 1524, node B requests QSTRUCT and finds QSTRUCT on node F. When node B retrieves QSTRUCT from node F, at 1528, node B parses QSTRUCT to extract QPART 1 and QPART 2. At 1532, node B then gets QPART 1 from node D and gets QPART 2 from node E, as shown in FIG. 15. At 1536, node B can return QMD, QPART1, and QPART2 to client 1506.

Figure 16:
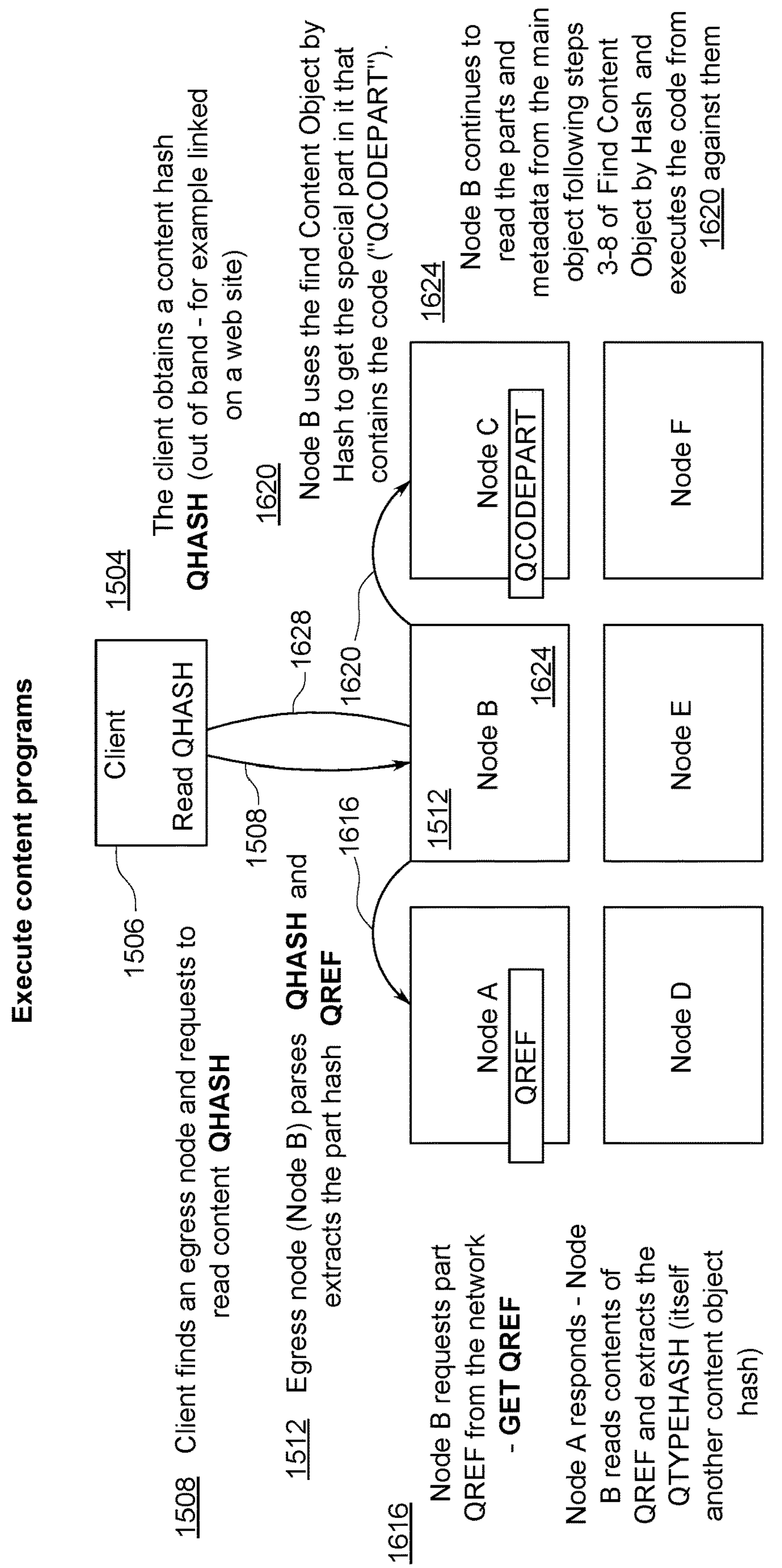
FIG. 16 shows an example of a method for executing content programs against content object parts and metadata.

FIG. 16 shows an example of a method for executing content programs against content object parts and metadata. In FIG. 16, client 1506 performs operations 1504 and 1508 as described above with reference to FIG. 15. Node B performs operation 1512 as also described above. At 1616 of FIG. 16, node B requests QREF from the content fabric using a GET QREF. In this example, node A responds, since node A has QREF. Node B then reads contents of QREF and extracts QTYPEHASH, referring to another content object hash. At 1620, node B finds the other content object by hash and extracts a portion in that content object that contains code, QCODEPART. At 1624, node B continues to read content object parts and metadata as described above at operations 1512-1532 of FIG. 15. Then, QCODEPART can be executed against the content object parts and metadata read at 1624. Results can then be returned to client 1506 at 1628.

Figure 17:
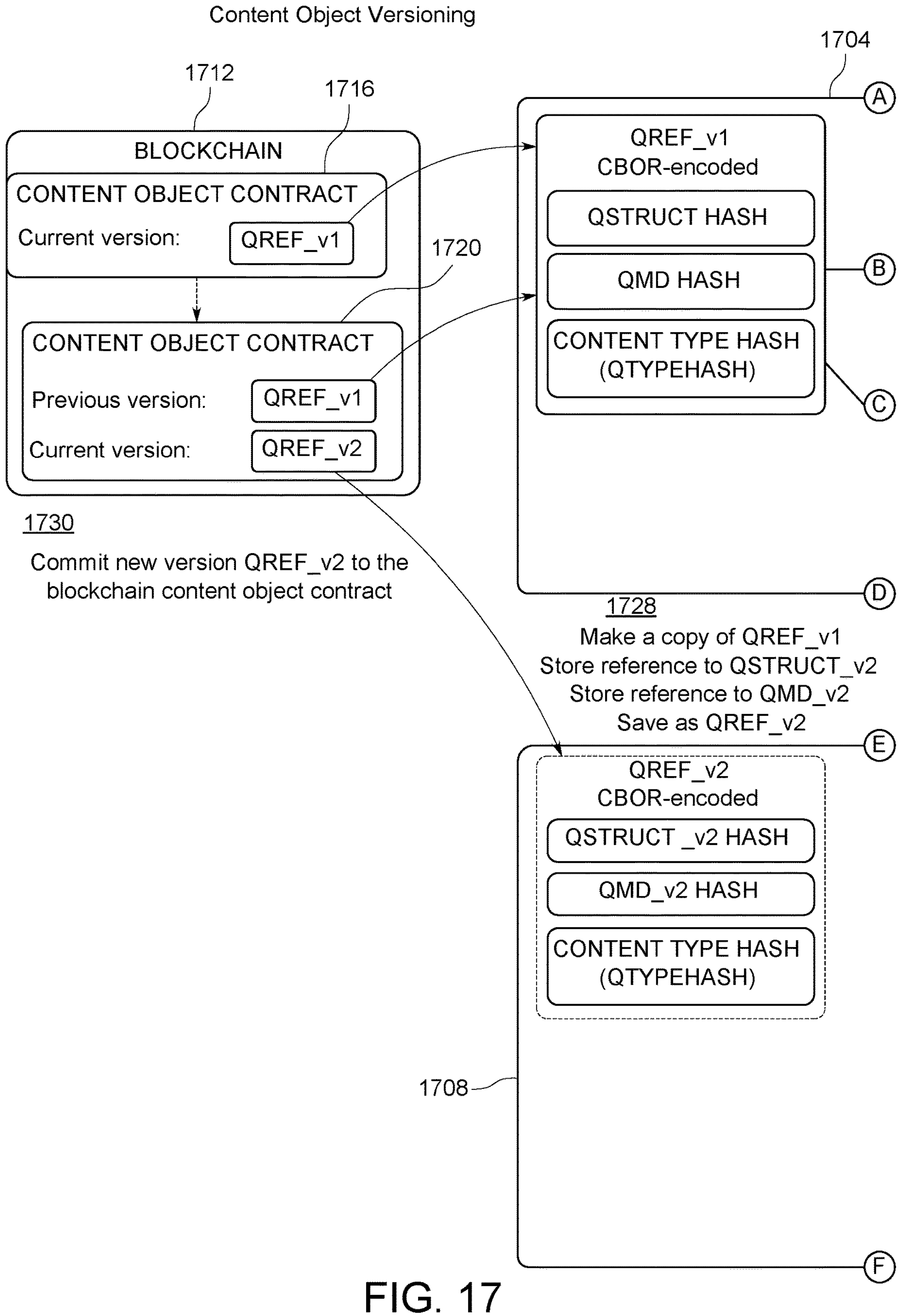
FIG. 17 shows an example of content object versioning.
Figure 17:
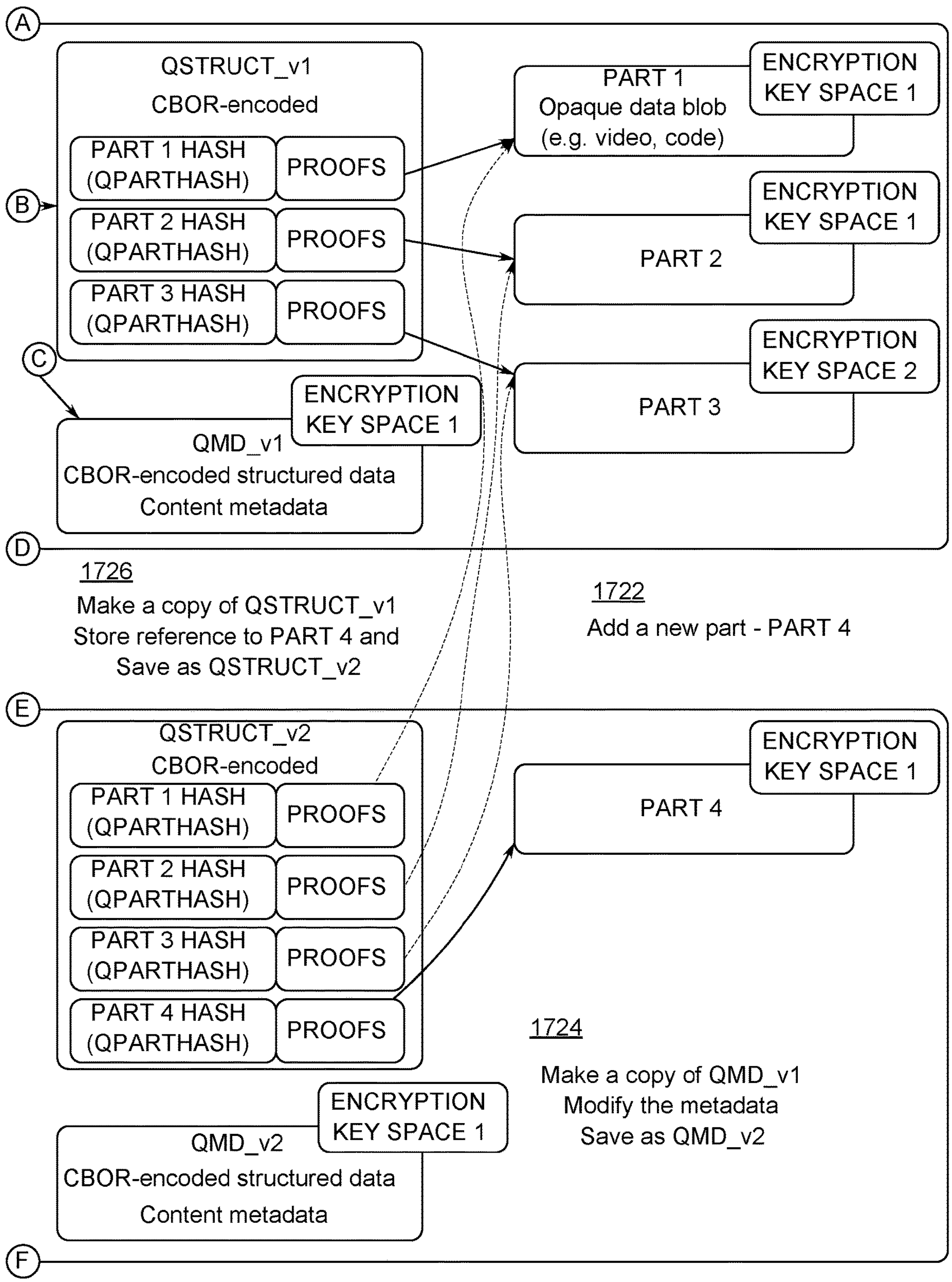

FIG. 17 shows an example of content object versioning. In FIG. 17, a first version 1704 of the content object structure of FIG. 14 is shown. A second version 1708 of the content object structure is also shown. In this example, a blockchain 1712 is also shown. In blockchain 1712 is a content object contract at a first point in time 1716 and at a second point in time 1720. In this example, at first time 1716, the contract identifies QREF_v1, that is, version 1704. At the later time 1720, the content object contract identifies QREF_v1 as the previous version, while QREF_v2, i.e., second version 1708, is identified as the current version.

In the example of FIG. 17, at 1722, there is an instruction to update version 1704 by adding a new part, labeled part 4 in this example. In response to this instruction, at 1724, a copy of the previous version of QMD, QMD_v1, is made, and QMD_v1 is modified and saved as QMD_v2 in second version 1708. At 1726, a copy of the first version of QSTRUCT, QSTRUCT_v1, is made, and a reference to part 4 is added to create a second version of QSTRUCT, QSTRUCT_v2, also shown in second version 1708. At 1728, a copy of QREF_v1 is made. References to QSTRUCT_v2 and QMD_v2 are stored and then saved as QREF_v2 in second version 1708. At 1730, QREF_v2 is recorded as the current version to the content object contract of blockchain 1712.

Figure 18:
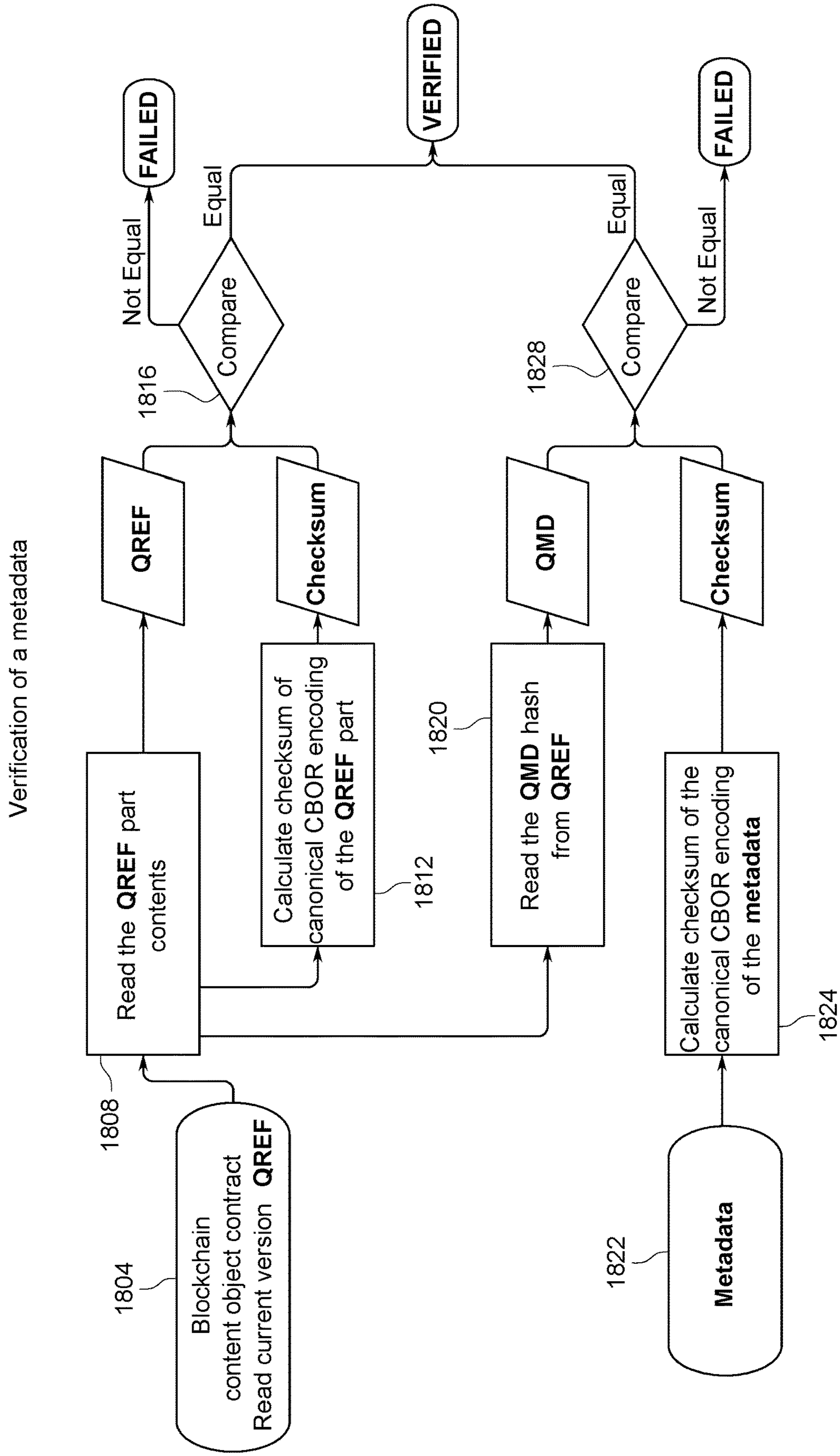
FIG. 18 shows an example of a method for verification of metadata in a content object.

FIG. 18 shows an example of a method for verification of metadata in a content object. In FIG. 18, at 1804, a current version of QREF is provided using a blockchain content object contract such as the contract at time 1720 of FIG. 17. At 1808 of FIG. 18, QREF contents are read, for instance, in the form of hashes **1404*a*-1404*d* of FIG. 14. A checksum of canonical CBOR encoding of QREF is calculated at 1812 of FIG. 18. The checksum and QREF are compared at 1816. When QREF and the checksum are not equal, verification of the metadata fails. At 1816, when QREF and checksum are equal, verification is established. Returning to 1808, after reading the contents of QREF, at 1820, QMD hash 1404*b* of FIG. 14 is read. Metadata 1822 provided as an input in FIG. 18 is processed at 1824, where a checksum of canonical CBOR encoding of the metadata is calculated. This checksum is then compared at 1828 with the QMD hash read at 1820. When the QMD hash and checksum of 1824 are equal, verification is established. When the QMD hash and checksum of 1824** are not equal, verification fails.

Figure 19:
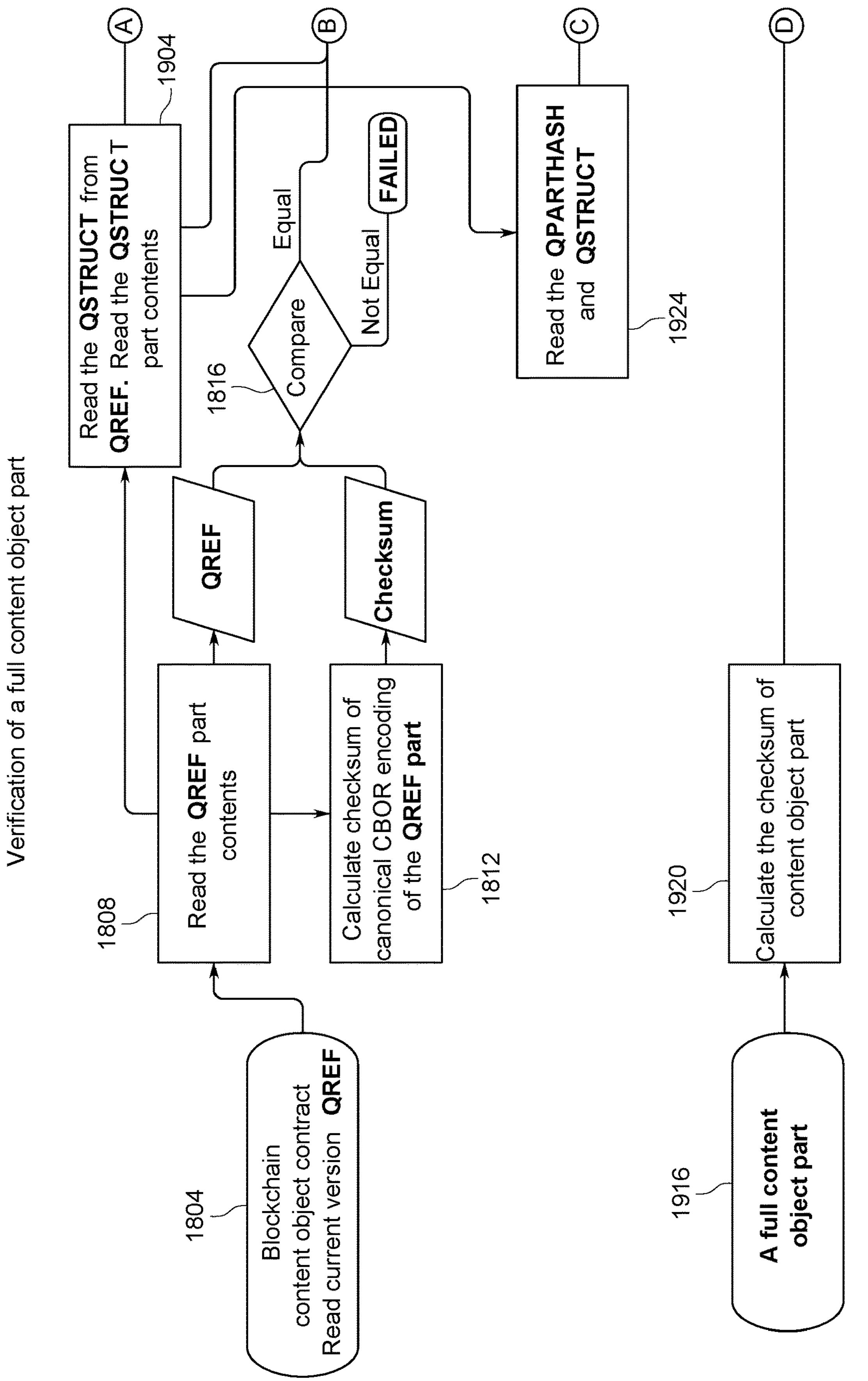
FIG. 19 shows an example of a method for verification of a full content object part.
Figure 19:
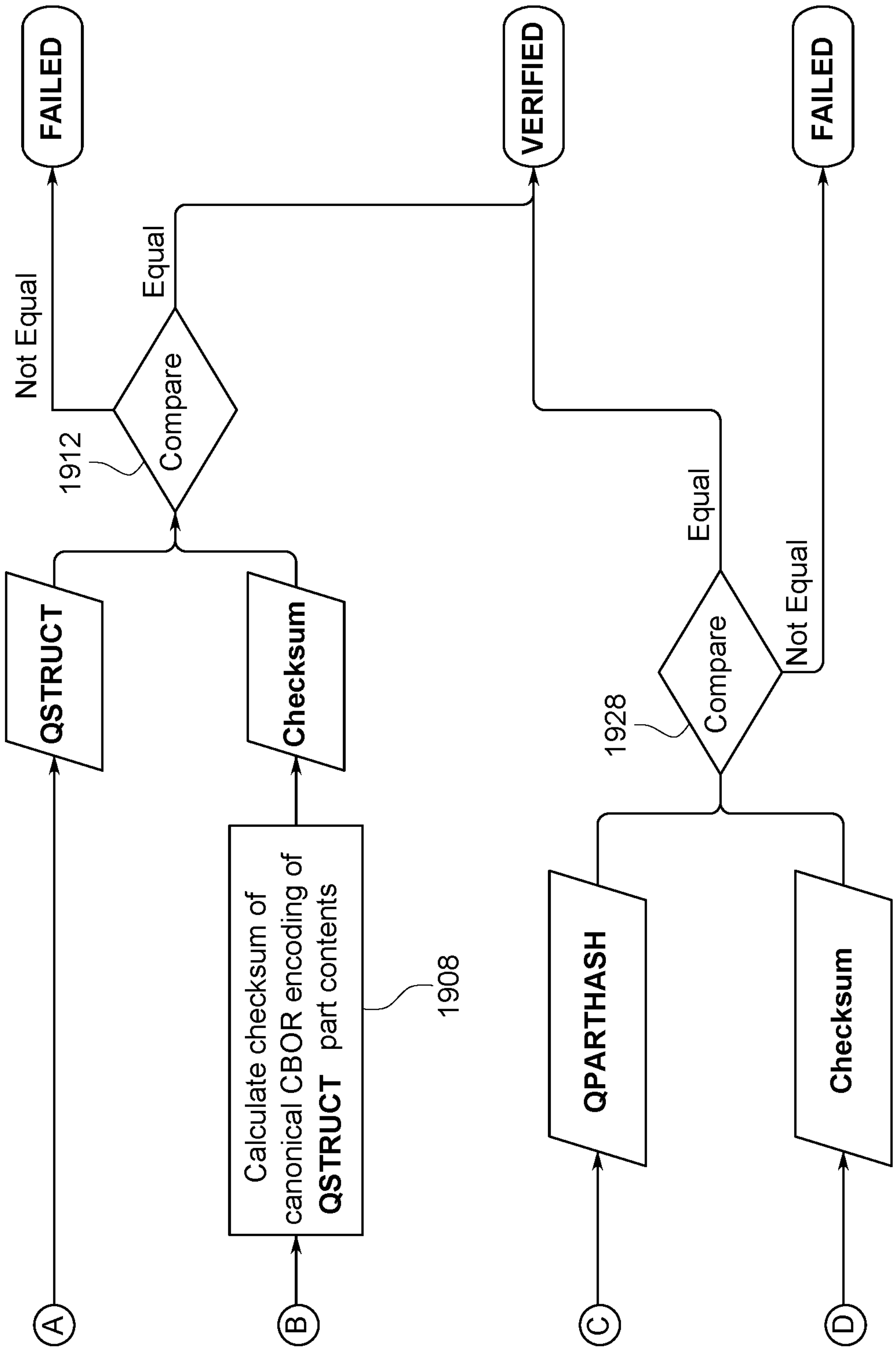

FIG. 19 shows an example of a method for verification of a full content object part. In FIG. 19, operations 1804, 1808, 1812 and 1816 as described above with reference to FIG. 18 are performed. In FIG. 19, following 1808, QSTRUCT hash **1404*a* of QREF 1404 of FIG. 14 is read at 1904 of FIG. 19. Following 1904, at 1908, a checksum of canonical CBOR encoding of QSTRUCT contents is calculated. This operation at 1908 also follows a determination at 1816 that operands are not equal. The QSTRUCT hash and checksum of 1908 are then compared at 1912. If the QSTRUCT hash and checksum are not equal, verification fails. If the QSTRUCT hash and checksum are equal, verification is established. Also, in FIG. 19, a full content object part is provided as an input at 1916. At 1920, a checksum of the content object part is calculated. This checksum is compared with a QPARTHASH read from QSTRUCT 1408 of FIG. 14 at 1924 of FIG. 19 in a compare operation at 1928. If the QPARTHASH and checksum of 1920 are not equal, verification fails. If the QPARTHASH and checksum of 1920 are equal, verification is established. It should also be noted that operation 1924 is desirably repeated for all QPARTHASHes contained in QSTRUCT 1408 of FIG. 14** for separate verifications, in some implementations.

Figure 20:
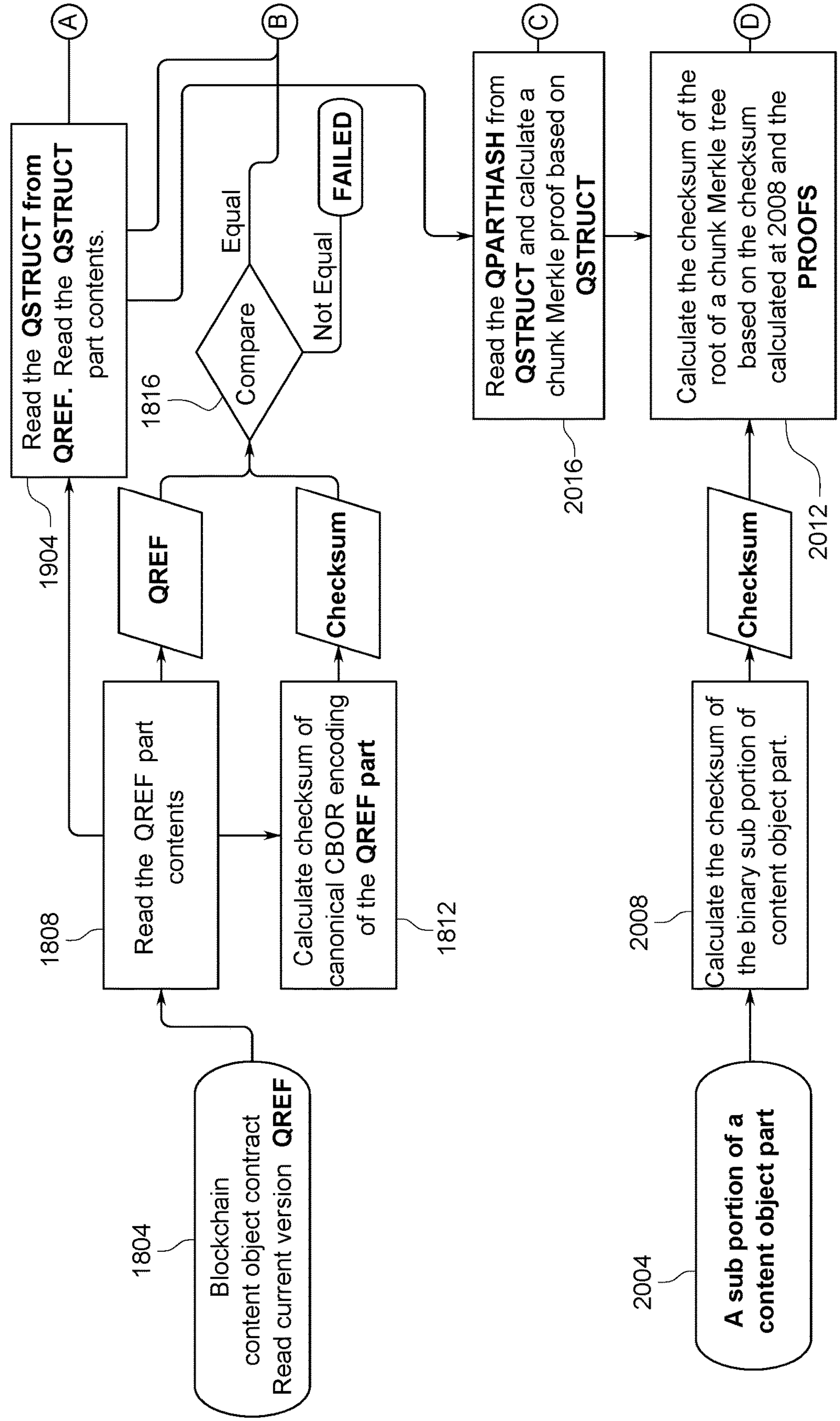
FIG. 20 shows an example of a method for verification of a sub-portion of a content object part.
Figure 20:
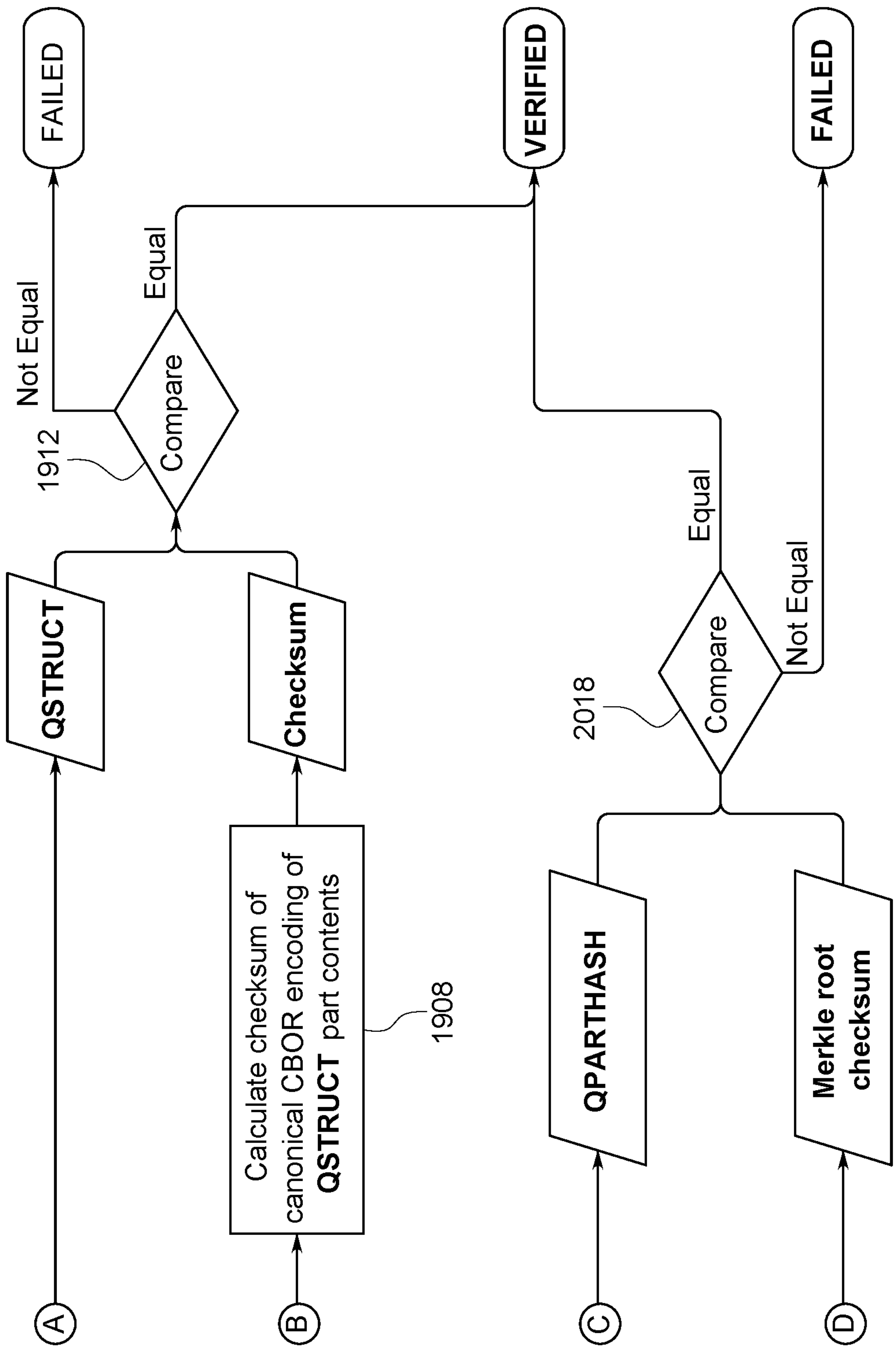

FIG. 20 shows an example of a method for verification of a sub-portion of a content object part. In FIG. 20, operations

1804, 1808, 1812, 1816, 1904, 1908 and 1912 are performed in the manner described above with reference to FIGS. 18 and 19. In FIG. 20, rather than a full content object part being provided as an input, a binary sub-portion of a content object part is provided as an input at 2004. At 2008, a checksum of the sub-portion of the content object part is calculated. Then, at 2012, a checksum of the root of a chunk Merkle tree based on the checksum calculated at 2008 and based on proofs is calculated. At 2016, following 1904 in FIG. 20, QPARTHASH is read from QSTRUCT obtained at 1904, and the Chunk Merkle Proof, as described in greater detail herein, based on QSTRUCT is calculated. Then, QPARTHASH is compared with the Merkle root checksum of 2012 at 2018. When QPARTHASH and the Merkle root checksum are not equal, verification fails. When QPARTHASH and the Merkle root checksum are equal, verification is established.

In some implementations, re-use of the same content in creation of output variants, and consequent benefits to distribution efficiency and personalization, are facilitated in the content fabric through use of JIT compilation capabilities that allow multiple front end compilers to leverage the optimization of compilation to machine code (backend compilation) for multiple source code languages. In some implementations, the system compiles the source code to an intermediate representation language, e.g., abstract syntax tree (AST), and allows for development of maximally optimized compilation of AST to machine code.

In some implementations, this method decouples "front end" compilation from source code, and "back end" compilation from source to machine code, via AST, and many beneficial side effects, one of which is the ability to support JIT compilation of source code to machine code via AST. Also, the system may use cross-platform compilation (static and dynamic). In some implementations, the content fabric benefits by providing a purpose-built "sandbox" for deploying code that modifies content objects. The sandbox can be part of the content fabric and can be extended to clients using application programming interfaces (APIs) via web assembly machine code (WASM).

In some implementations, bitcode can be written in any supported language, e.g., C++, Go and Javascript for WASM, but different languages may be used. Some implementations define an interface between the content fabric and modules loaded JIT that allows for a content fabric method to call into the module, and the module to call back into the content fabric method. This calling context can facilitate reading/writing content and metadata to/from the content fabric, and can facilitate a security sandbox for both authorizing code operations and metering their use of system resources (e.g., for compensation and charging).

Figure 21:
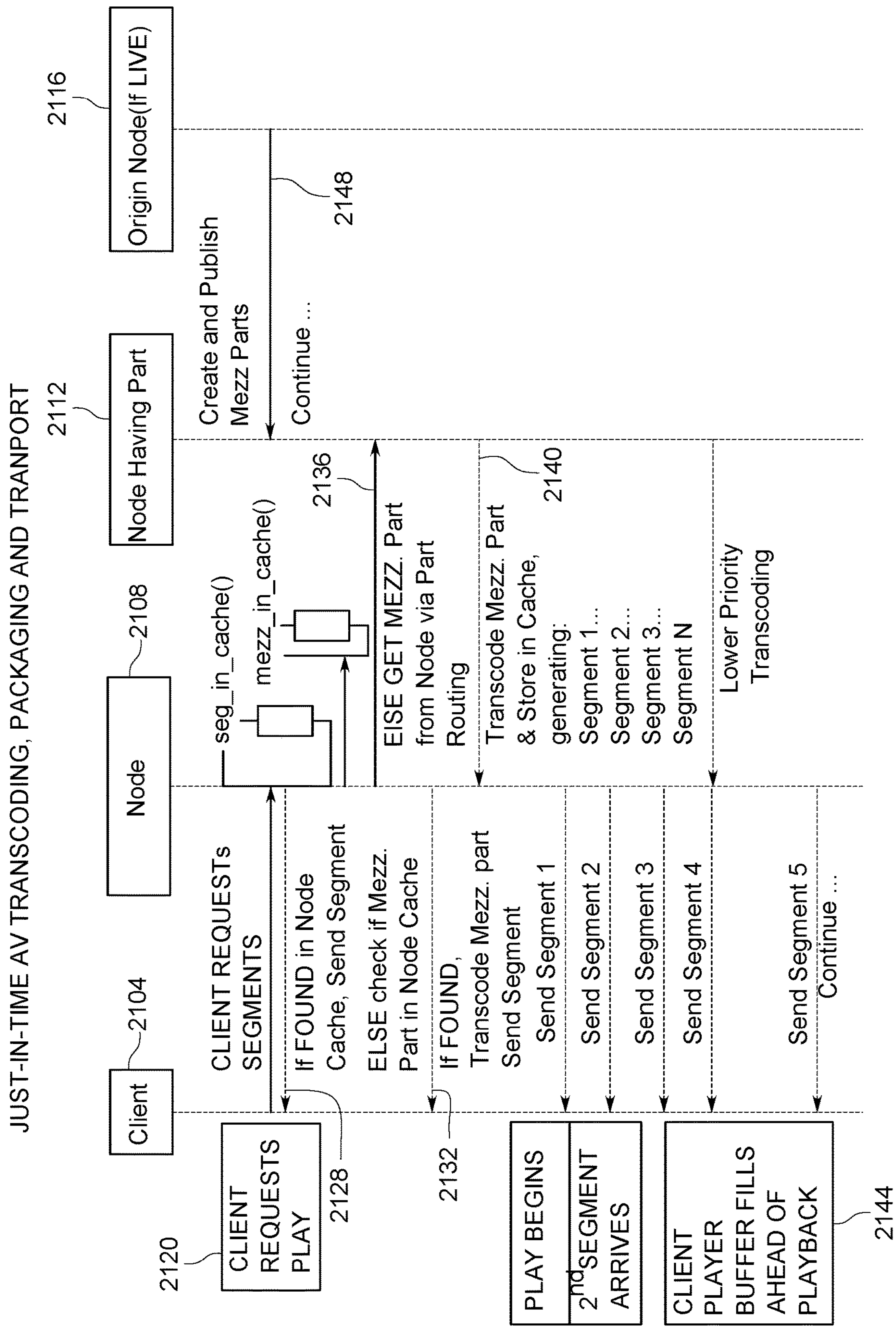
FIG. 21 shows an example of a method for just-in-time (JIT) transcoding, packaging and transport within the content fabric.

FIG. 21 shows an example of a method for just-in-time (JIT) transcoding, packaging and transport within the content fabric. Entities participating in the method of FIG. 21 include client 2104, a fabric node 2108, another fabric node having a desired content object part 2112, and an origin fabric node 2116 in the case of a live streaming implementation. At 2120 of FIG. 21, client 2014 requests to play digital content in the form of a video. At 2124, client 2104 requests a segment of the video from fabric node 2108. If fabric node 2108 finds at 2126 the requested segment in cache at node 2108, the segment is returned from node 2108 to client 2104 at 2128. In some instances, node 2108 is not able to find the requested segment in node 2108's cache, so node 2108 can determine at 2130 if a corresponding mezzanine-marked part, a higher bit rate version of the segment, is stored in node 2108's cache. If the mezzanine version is found, the mezzanine version can be transcoded and returned, at 2132, to client 2104.

In FIG. 21, in some instances, if the requested segment and the mezzanine version of the segment are not in cache at node 2108, node 2108 can send a GET for the mezzanine version to the node having the part 2112 at 2136, using routing methods described in greater detail herein. Node 2112 can return the mezzanine version to node 2108 at 2140. Node 2108 can then begin transcoding the received mezzanine version into individual segments 1, 2, 3, 4 . . . N at 2142. As the segments 1-N are transcoded, node 2108 sends the transcoded segments to client 2104, where the segments can be desirably buffered ahead of playback at 2144.

In FIG. 21, in the case of live transmission, in some implementations, it is desirable to create and publish mezzanine versions of segments from origin fabric node 2116 at 2148 as those mezzanine versions are available in the live transmission. In this way, latency can be minimized or eliminated in streaming live video as the live video is pushed into a pre-established content object structure.

In some implementations, new output variants can be introduced without having to create additional copies of a mezzanine source (language versions, territory versions, repairs, new playout device formats, etc.) and can be updated or extended without changing or taking down the content fabric. In some implementations, bitcode stored in content object parts in the content fabric can be versioned and updated without having to change other parts of the pipeline.

When new content is published to the content fabric, such as an interoperable master format (IMF) package, an ingest content type template can be selected by the user or client of the API. That content type implements bitcode that the content fabric invokes to write the content in the package to the content fabric. FIG. 22 shows an example of IMF package content in the content fabric after ingest of the selected content type, implemented with bitcode. In this example, for the IMF content type, the audio and video tracks can be written as content object parts, and the relevant portions of the content play lists and offering playlists (CPLs and OPLs respectively) are written as metadata key, value tuples. In some implementations, the core logic to create an output variant is written as a metadata value using a JSON object; this object, termed an "offering," is a grouping of the key names for the audio and video tracks, starting time code, duration and parameters, for example, to create an output version. FIG. 23 shows an example of description for an English language version of a consumer streaming deliverable from an IMF package where the package specifies multiple language versions.

In some implementations, when a user requests to stream a DASH or HLS version of a content object in its target language version, the bitcode module reads the appropriate metadata and the metadata pointing at the constituent video and audio content object parts, reads the content of these parts, and generates a manifest file, which is then served to the client and the stream, which is served. The manifest and the segments can be built on-the-fly by the bitcode. In this case, the bitcode drives audio/video processing modules to perform the scaling and bitrate transcoding to generate only the segments the client requests as the requests are made. For instance, in FIG. 21, there can be DASH and HLS manifest files and segments generated from a mezzanine master package, for instance, in IMF format, using bitcode at the time of user request.

In some implementations, the bitcode environment in the content fabric can accommodate code that operates on the parts such as raw data and metadata of a content object in the content fabric for personalizing or customizing output such as consumable media. Some implementations use bitcode to, for example, apply custom watermarks, as described below with reference to FIG. 24, provide custom clipping functions, and implement automatic video classification and metadata tagging via ML. In this case the ML model that provides the video classification code runs inside a container loaded by the bitcode sandbox, illustrating a breadth of possibilities for creating intelligent content coding pipelines. In some implementations, the content fabric allows such operations to be embedded directly into the media delivery pipeline, to be versioned and updated without affecting the rest of the pipeline, and to draw on re-usable metadata and content.

FIG. 24 shows an example of metadata stored in an original content object created from an IMF source package used to specify content, dimensions and placement of a watermark by bitcode in generating an output stream. In this example, the content object was created from an IMF source package with mezzanine level video.

In some implementations, the content fabric has capacity to store metadata classifying the content, and, with the programmability of the bitcode sandbox, to use this metadata to create customized or personalized media output or to offer personalized, JIT searching and interest matching of content in the fabric. A video classification machine using a deep learning pipeline can be incorporated, in some implementations.

In some implementations, video tagging is performed to iterate video frame by frame, e.g., using OpenCV, FFMPEG, or the content fabric AV pipe, followed by applying a per-frame encoding procedure using a convolutional neural network, resulting in an n-dimensional vector per frame expressing the frame-level video features. The frame-level features are then aggregated to form a video-level feature vector, which is then input to a video-level classifier to predict the video labels.

In some implementations of the content fabric video tagging pipeline, some videos are encoded into one-frame-per-second frames. Raw frames are fed into an inception network, and the ReLu activation of the last hidden layer is fetched to form frame-level features. These frame-level features are aggregated. In some implementations, context gating, a learnable non-linear unit, is applied to the aggregated video-level features, followed by a video classifier—a mix of neural network expert systems—to perform final tagging. Some implementations aggregate spatial representation in recognition of 'places.'

In some implementations of the video tagging architecture, context gating is performed, which generally refers to training a non-linear gating unit such that relevant aspects of a video are enhanced, and off-topic features are suppressed. Some implementations use a method called "mix of neural network experts," which is based on the original mixture of expert methods in which one trains multiple simple 'expert' networks, to optimize their 'expert' domain, followed by a convolution with a gating distribution, effectively learning both the parameters of the individual expert networks and the parameters of the gating function. Such an approach effectively forms an ensemble for the final prediction, where the bias and variance can be appropriately balanced, thereby overcoming overfitting effects in individual expert models.

The paradigm of engineering sufficiently "trustworthy" systems is becoming increasingly difficult to sustain successfully as more and more content flows over the Internet to ever more variations of rights management, ever more points of vulnerability exist in the increasingly complex technological supply chain, and the value of digital content incentivizes theft.

In some implementations, the content fabric backs content access control -- operations to create, update, or access content—with blockchain transactions executed through a native ledger embedded in a content fabric software stack. The system ensures that parties are authentic, and its consensus ensures that only valid (authorized) transactions on the content can be carried out. The content fabric can intrinsically couple control over the content's modification and access to the blockchain, while maintaining scalable storage and distribution outside of the blockchain.

In some implementations, the content fabric allows content access control and authorization to take advantage of blockchain ledgers for "programmable" transactions between parties. For instance, each transaction on the blockchain can execute a small piece of code that represents the terms of access for each content object. This small piece of code is referred to as a smart contract. In some implementations, the content fabric may implement a blockchain that is compatible with the Ethereum protocol and exposes an Ethereum Virtual Machine interface for applications, although other protocols/blockchains may be used.

In some implementations, the 'ledger' is charged with at least three operations: 1) providing the authoritative 'directory' of content including the only trusted reference to the list of versions of each content object and the final verification 'hash' (the ground truth) for each of these versions, 2) execution of the 'access control' logic allowing users to read and write content as well as contract terms enforcement and commercial terms reconciliation (payments and credits), and 3) recording access operations on content in the content fabric (the 'ledger' operation).

In some implementations, the blockchain provides an ordered list of transactions. Each transaction is performed by a blockchain participant and could have side effects: a state change in a particular account or contract, a transfer of value, or one or more blockchain 'events'. Transactions are identified by a 'transaction ID.' The content of a transaction as well as the 'transaction receipt' are available to blockchain participants. In some implementations, because the ledger is public, transactions can store 'proofs' of the activities they are recording, for example in the content fabric, the final 'checksum' of a new content after an update. The way in which transactions can offer public verification of a particular action without revealing the details of the action belongs to a class of cryptography referred to as zero-knowledge proofs.

In some implementations, participants in the blockchain fall into two categories: account owners and contracts. Account owners are primarily people in control of their actions against the blockchain, for example, creation or update of content, accessing or viewing content, etc. Applications operated by people or automated processes also can be account owners. These applications are often trusted by the people who run them to do what they were constructed to do, and they are trusted to operate the blockchain accounts they have been given access to. On the other hand, contracts are generally autonomous participants—they operate based on their 'code'. For example, a contract written to pay 2 credits to each user who supplies a particular record signed by a signature accepted by this contract will behave the same way and pay the 2 credits when the signature is matched, and decline to pay otherwise. An account owner generally is identified by its 'address' on the blockchain and owns a public/private key pair that it uses to sign its transactions against the blockchain.

In some implementations, a contract is identified by its 'address'. The contract will have an address if it has been successfully deployed by its creator. The creator is generally known because the creation of the contract is done in a 'transaction' where the 'from' address is the contract creator.

In some implementations, a content space is configurable to set base policies controlling access to associated content objects. The content space can be represented by the smart contract and, in such instances, is referred to as a content space contract. In some implementations, the content fabric operates as a single, global content space. In some other implementations, additional content spaces can be created for special purpose use.

In some implementations, a content node has a blockchain account, represented by its public/private key pair. By the same token, a user of the content fabric can have a blockchain account represented by its public/private key pair.

In some implementations, a library is implemented as a repository of content, setting policies for how the library's content objects work. The library can be created inside a content space and can be represented by a smart contract, referred to herein as a library smart contract, which is determined by the containing content space. The library can have a user as an owner.

In some implementations, content is a representation of a digital asset and is created in a library. The content can be represented by a smart contract, referred to herein as a content smart contract, which is determined by the containing Library. In some implementations, each content object has an instance of the content smart contract.

Users can have various roles, in some implementations. For instance, a library owner can dictate the behavior of content objects inside the library, for example, who can create content, who owns the content once created, how content is accessed or commercialized, etc. Another role of a user is content owner. This owner of a content object can control reading and writing access to the content. A content object can have multiple owners, and these owners can have slightly different privileges, for example, modifying or updating the content object versus publishing the content object for consumer access and determining commercial terms. In some implementations, a degree of control over the content is set by the library. Another role is consumer, referring to a user who does not own content and can access content based on the content object's contract terms, including commercial terms such as access or viewing charge.

Figure 25:
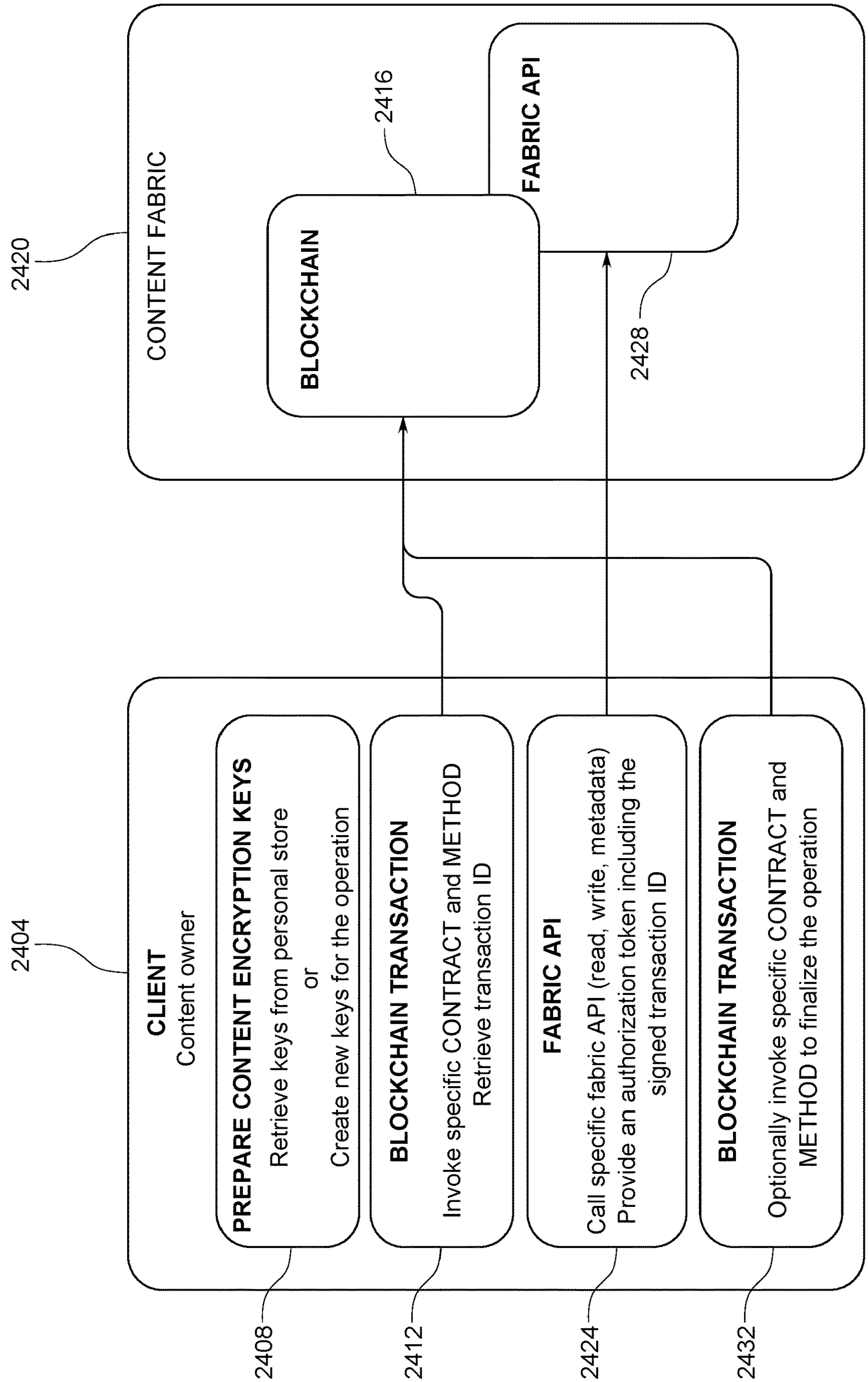
FIG. 25 shows an example of a flow of content fabric operations providing content security and blockchain control.

FIG. 25 shows an example of a flow of content fabric operations providing content security and blockchain control. In some implementations, operations on content objects in the content fabric follow a flow of first invoking the appropriate blockchain transaction on the appropriate contract address, and then using the proof of a valid transaction indicating that the operation is authorized to make an authorized API call on the content fabric. Specifically, a client 2404 of the content fabric API securely obtains his/her public/private keys, for instance, by retrieving keys from a personal store or creating new keys at 2408. At 2412, client 2404 creates a blockchain transaction signed with the private key, and the transaction is recorded in a blockchain 2416 of content fabric 2420. At 2412, a specific contract and associated method may be invoked. On successful completion of the transaction (which can perform authorization logic), at 2424, client 2404 creates an authorization token including the transaction ID, and passes this token in a corresponding content fabric API 2428. Optionally, content fabric API 2428 may prompt client 2404 to call a finalization method on the contract in order to complete the API transaction at 2432.

In some implementations, publishing a content object into the content fabric assumes a content library has been created, and that library exists within a content space. The content library is created within the content space and, as such, often is based on the content space giving a user permission to do so. For example, a global content space can allow users to create libraries for a fee. In some implementations, the content space is created by the originator of the content fabric, but additional content spaces can also be created by participants in the content fabric for special use, such as for private or semi-private subsets of the content fabric with dedicated private fabric nodes.

In some implementations, because of their genesis roles, content spaces are trusted by fabric nodes, and fabric nodes are configured to trust content spaces by their maintainers. A new content space is created by deploying the content space contract and configuring fabric nodes to recognize the new space.

In some implementations, to create a library, a user or client program makes an API call directly, or via a user interface. The API implementation executes a method on the content space contract, createlibrary() , which in turn will create a new instance of the library smart contract for that particular library based on the parameters specified. The calling user becomes the owner of the library contract and as such will be able to further configure the library contract.

Figure 26:
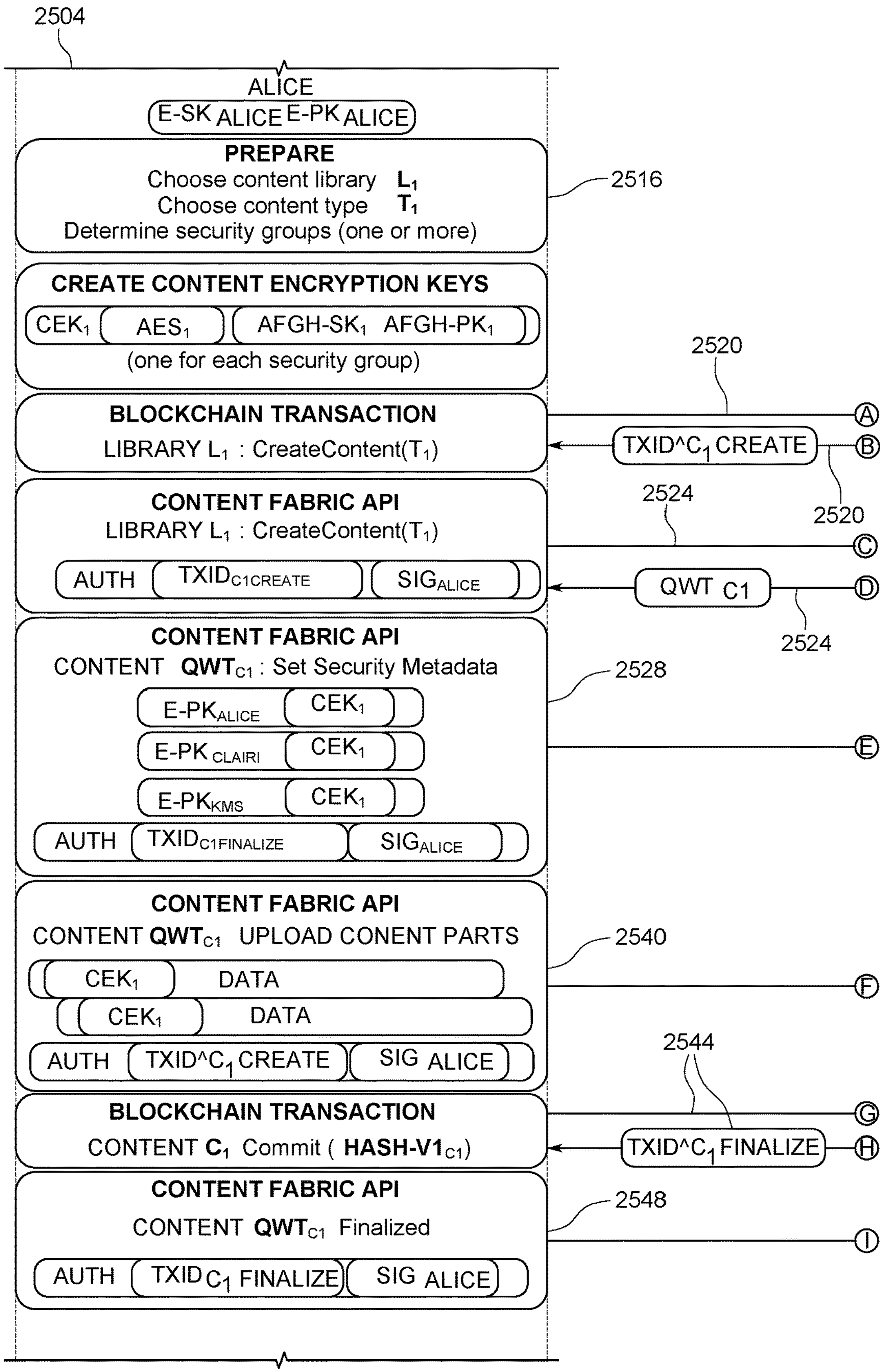
FIG. 26 shows an example of a method for implementing secure content creation in the content fabric.
Figure 26:
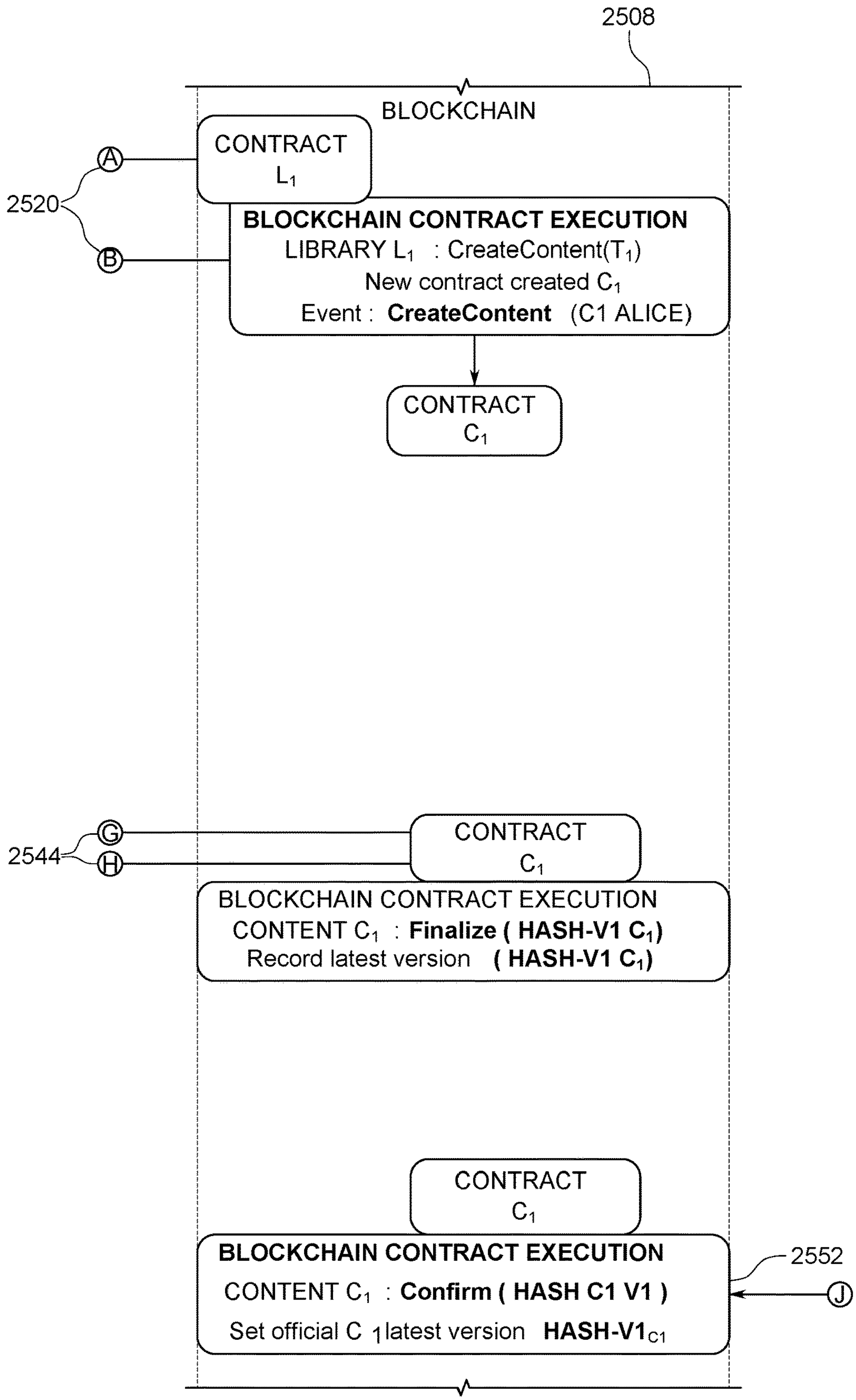
Figure 26:
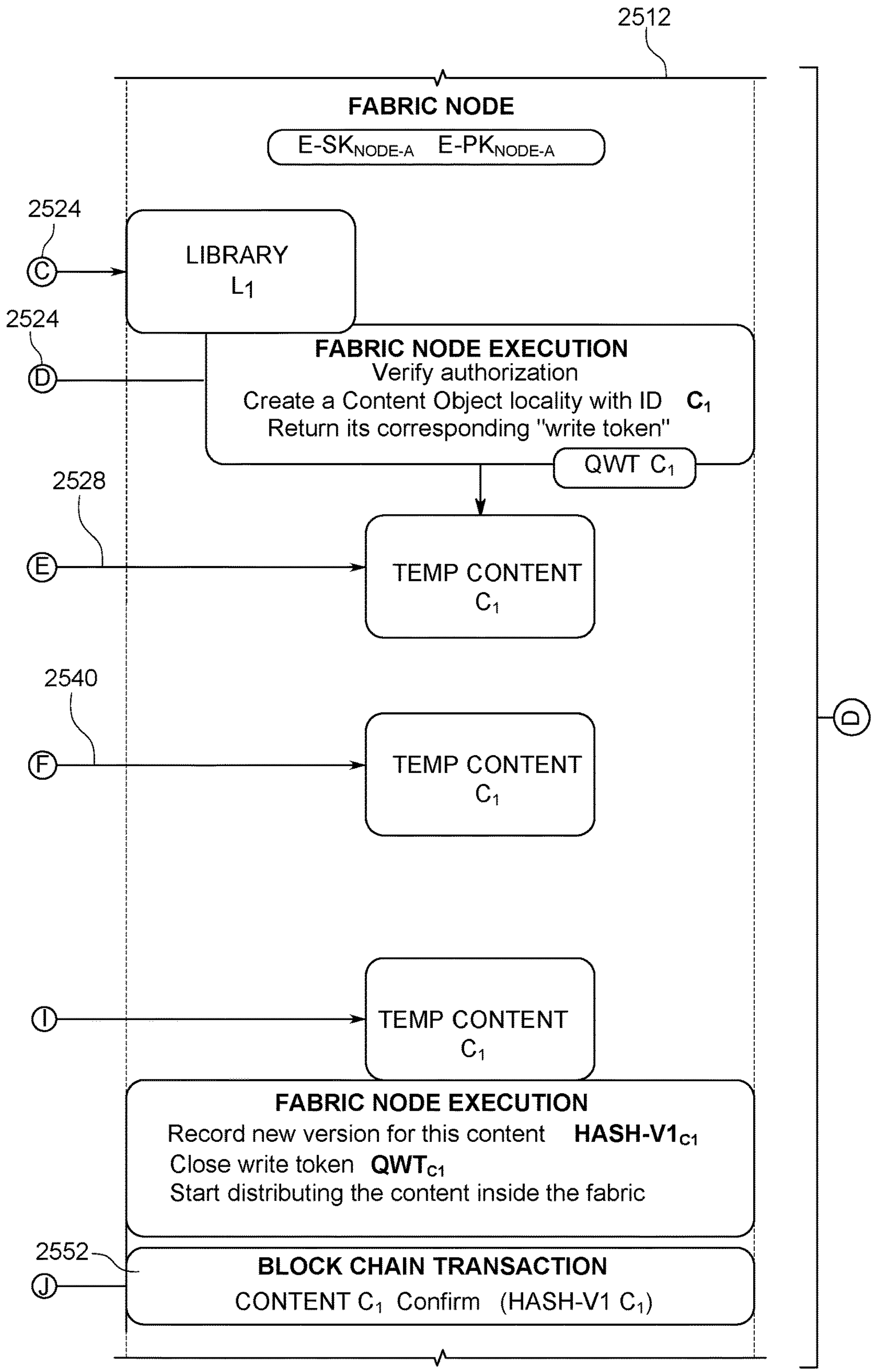
Figure 26:
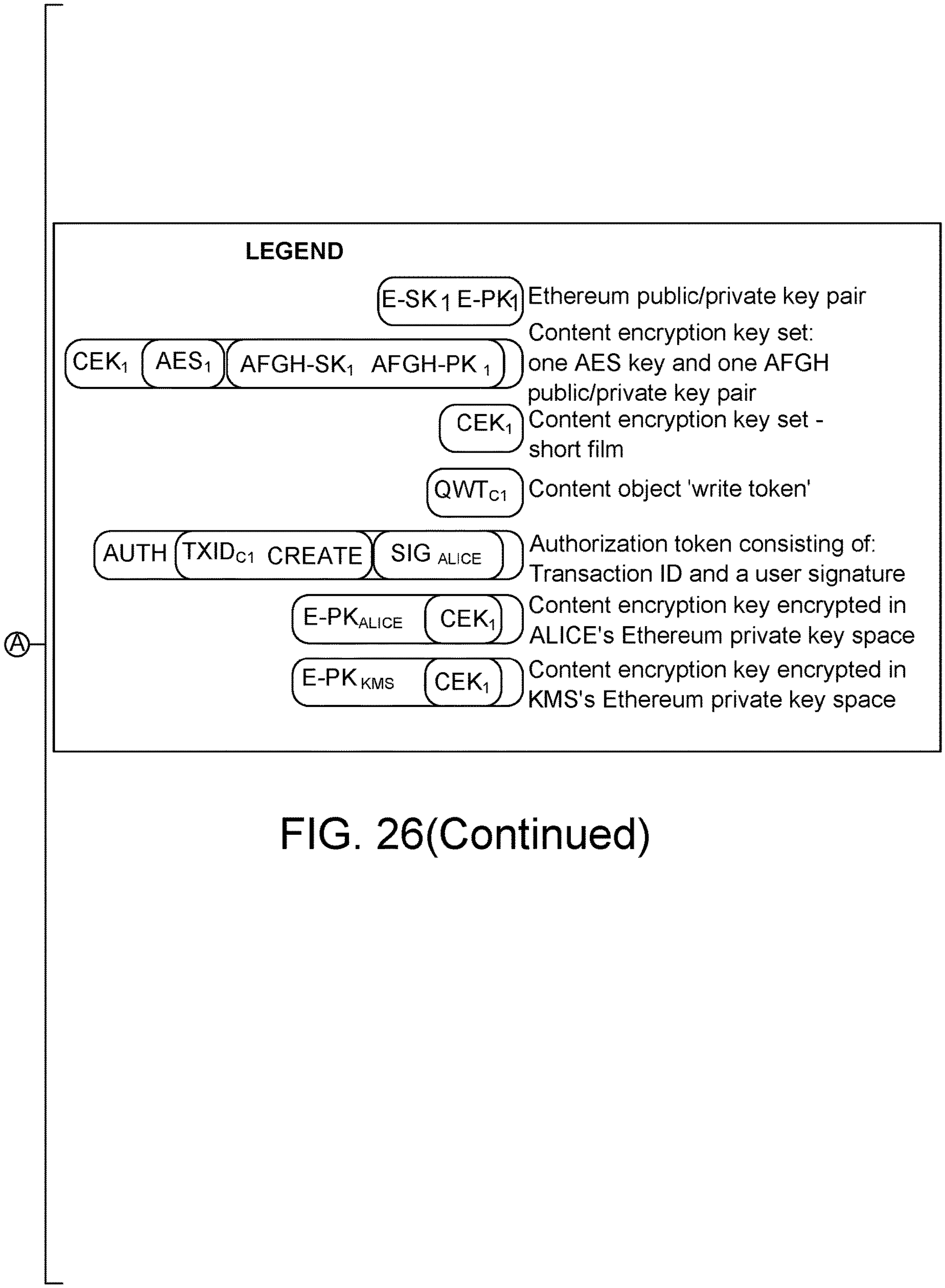

FIG. 26 shows an example of a method for implementing secure content creation in the content fabric. In some implementations, the creation of a new content object for ingestion into the content fabric and updating of existing content objects involves carrying out one or more of the following operations, illustrated in FIG. 26, in which a client, "ALICE" 2504 interacts with a blockchain 2508 and a fabric node 2512. At 2516, preparation begins by calling a method on the library contract to look up possible content types and their security groups offered by the library. At 2520, a method createcontent( ) is called on the corresponding library contract, passing the content type and the chosen security groups. This returns a transaction ID and a new content ID. At 2524, createcontent() is called on the content fabric passing in an authorization token containing the transaction ID obtained above and the content ID, signed by the content creator. This returns from the content fabric a valid write token. At 2528, a content encryption key set is generated: an AES symmetric key and a proxy re-encryption public, private key pair (AFGH) for each security group. Also at 2528, the content encryption key set is encrypted for three parties: the owner, the content fabric's key management service, and any owner delegates, using their respective public keys. Also at 2528, a method setsecuritymetadata () is called to store this data mapped to these three entities.

In FIG. 26, at 2540, content object parts are uploaded to the content fabric, encrypting each content object part with the AES content key first, and then using the AFGH key. At 2544, a method commit() is called on the library contract passing in the 'content hash', which is a new version of the content, uniquely identified by this hash. Note that each content update API invocation returns the potential 'content hash' if a version of the content were to be finalized without further modifications. At 2548, a finalize() method is called on the content fabric passing an authorization token including the transaction ID obtained above and signed by the owner (the creator). At 2552, fabric node 2512 supporting the operation calls a confirm() method on the library contract passing in the final content hash, and signing the transaction with the fabric node's key to prove that this fabric node supported the operation.

In some implementations, updating content in the content fabric skips operations 2516-2540 above and instead includes a call of writeaccessrequest() on the content contract to authorize the update, and then OpenWrite on the content fabric using the obtained transaction ID in the authorization ID.

Figure 27:
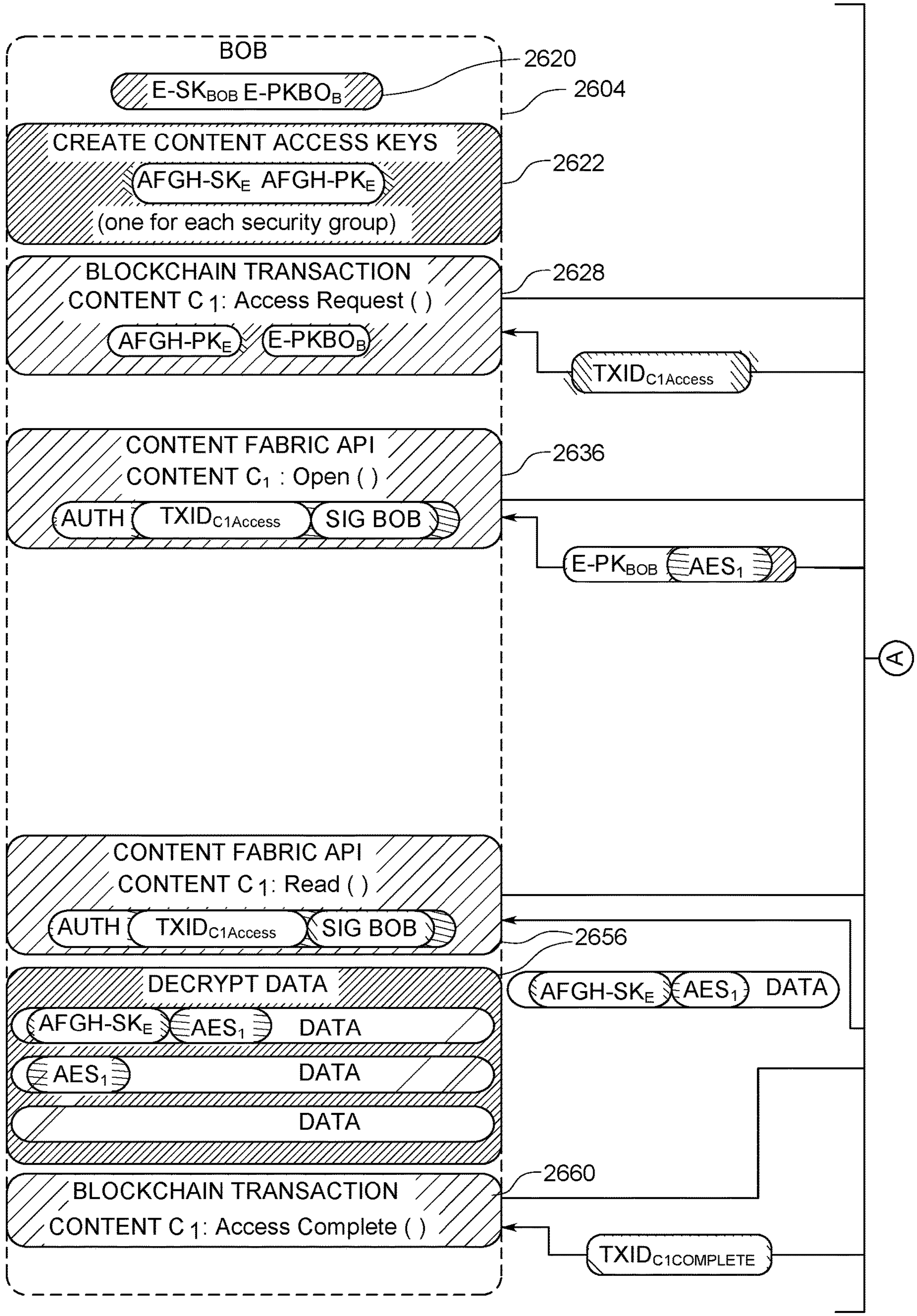
FIG. 27 shows an example of a method for implementing secure content access in the content fabric.
Figure 27:
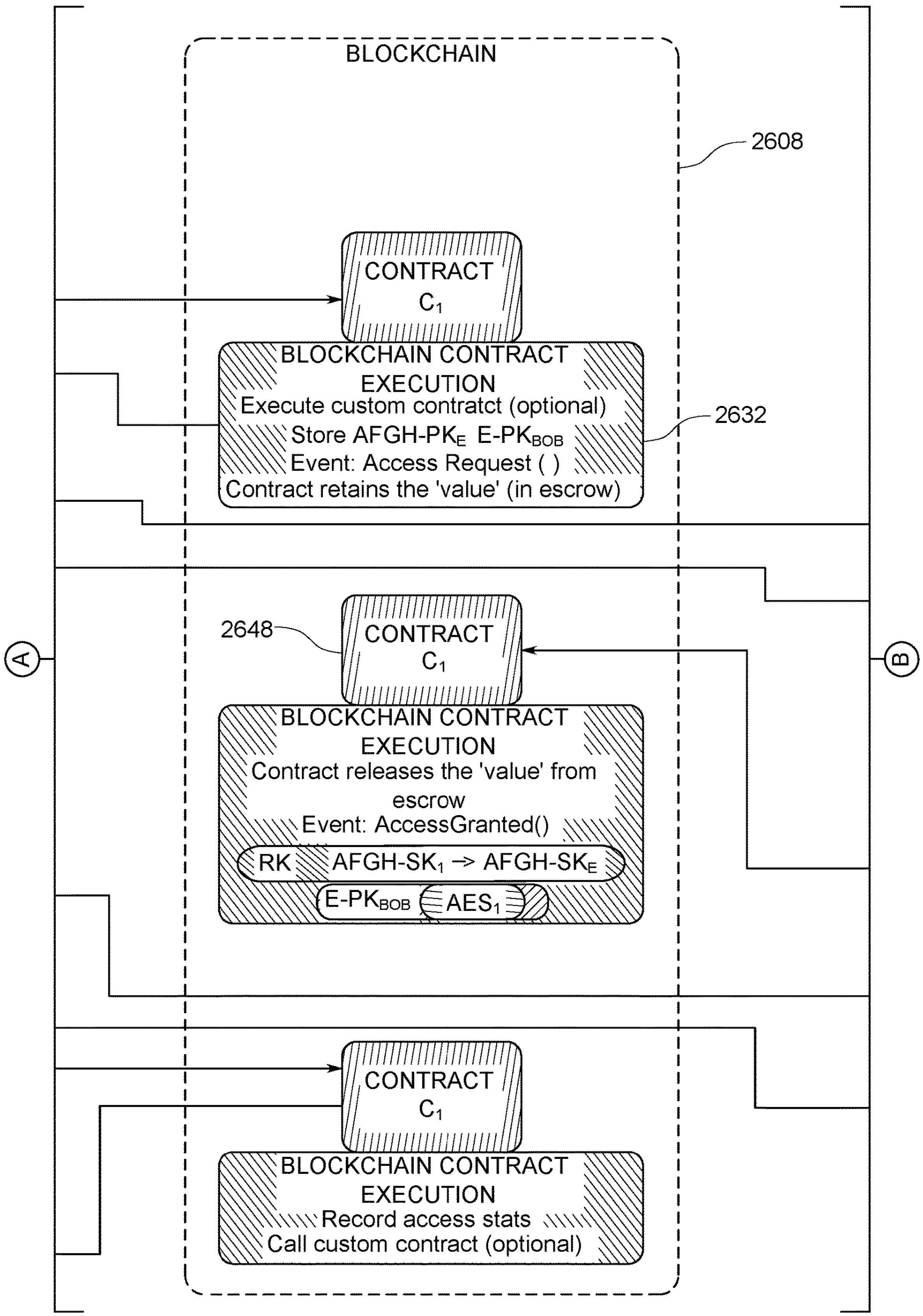
Figure 27:
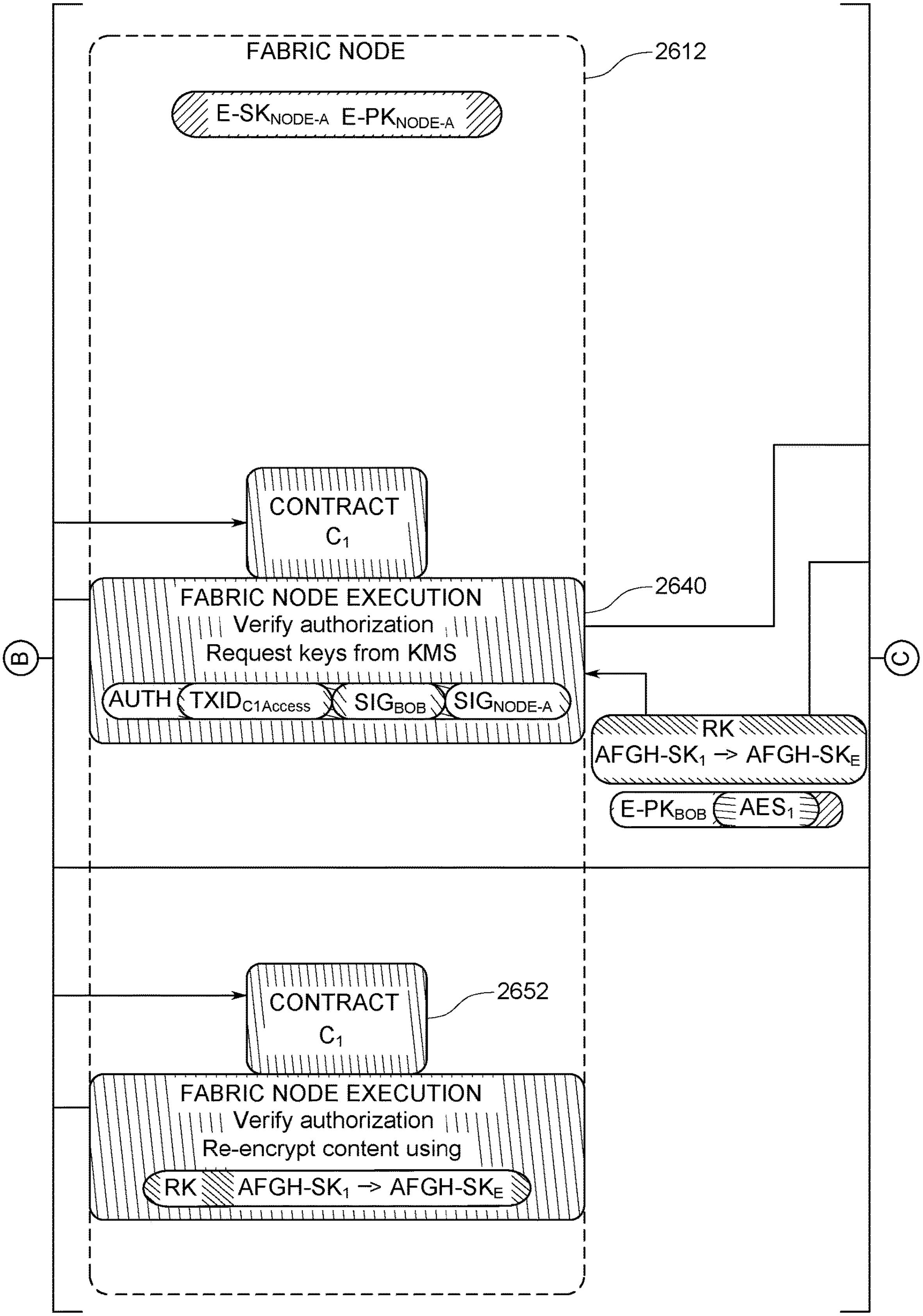
Figure 27:
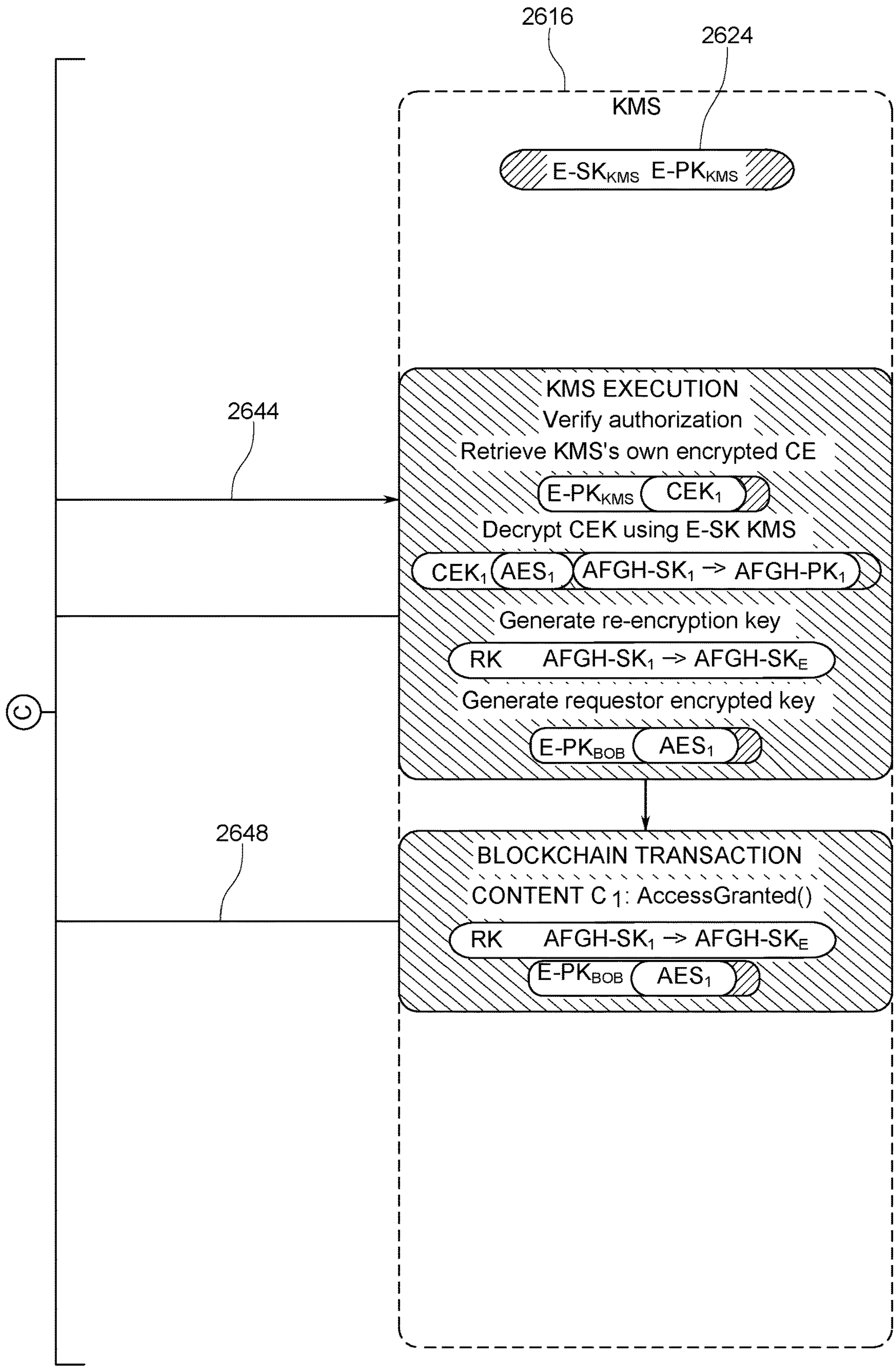

FIG. 27 shows an example of a method for implementing secure content access in the content fabric. In some implementations, the consumption of content as an output, e.g., consumable media, from the content fabric by a client involves carrying out one or more of the following operations. Entities participating in the method of FIG. 27 include a client, "BOB" 2604, a blockchain 2608, a fabric node 2612, and a key management service (KMS) 2616. At 2620, an ephemeral key set is created. At 2622, a proxy re-encryption public/private key (AFGH) is encrypted with the public key of the consumer. At 2624, the ephemeral key set is encrypted for the content fabric's key management service using its public key. At 2628, a method accessrequest() is called on the content object's blockchain contract passing in the encrypted ephemeral key set. At 2632, the contract records the ephemeral key set in the contract's state using a unique key, escrows any value required by the AccessRequest from the consumer's credit, and returns the transaction ID. At 2636, BOB 2604 calls a contentoper() method on the content fabric passing in an authorization token containing the transaction ID obtained above, signed by the consumer. At 2640, fabric node 2612 calls KMS 2616 (the delegate) passing in the authorization token above including the transaction ID and signed by the consumer for the authorized accessrequest() . At 2644, KMS 2616 verifies the request by verifying the transaction ID (consumer's signature and success status) and then generates: the proxy re-encryption key using the AFGH key in the ephemeral key set, and returns the re-encryption key to the fabric node; and an encrypted version of the content AES key, encrypted with the consumer's public key.

In FIG. 27, at 2648, KMS 2616 calls accessgranted() on the content contract recording the re-encryption key and the content key encrypted for the consumer, obtained above. The contract releases the "value" from escrow to the content owner. At 2652, fabric node 2612 uses the re-encryption key to re-encrypt the content from the original AFGH key space into the consumer's ephemeral AFGH key space. At 2656, BOB 2604 reads the re-encryption content delivered by the fabric node and the encrypted key blob recorded by an accessgranted() contract method. BOB 2604 is now able to decrypt the content as follows: extract the AES content decryption key from the encrypted key blob using its private key; first decrypt using its ephemeral AFGH secret key; and then decrypt the result using the AES content decryption key obtained above. Optionally, at 2660, BOB 2604 calls the content contract's accesscomplete() method.

In some implementations, the re-encryption of content published by the owner for an authorized consumer occurs without the software stack or host computing device it runs on having access to the plain text content or to the AES content decryption key, allowing for a "trustless" re-encryption of the content. This capability utilizes proxy re-encryption, based on public/private key cryptography, allowing data encrypted with one user's public key to be transformed such that it can be decrypted with another user's private key. The re-encryption transformation is 'permissioned' in the sense that it is possible when the original, encrypting user generates a re-encryption key that is based on the encrypting user's private key and the public key of the target user. The re-encryption key itself is protected and does not expose useful information about the original encrypted data. Further, this re-encryption key is used by a third party -- a proxy -- to re-encrypt the data without it becoming unencrypted.

In some implementations, proxy re-encryption provides a useful and powerful service for a secure (trustless) content management system to prevent unintentional or intentional unauthorized access to content; specifically, proxy re-encryption can allow for secure, encrypted data to be easily shared with other users without exposing valuable private keys with any intermediary technology or allowing a malicious end-user to trivially share keys that could be used to decrypt (and steal) other content in the system.

Unlike conventional content management systems, the disclosed content fabric can be implemented to run in a distributed, trustless environment. Security assumptions are different in a trustless environment; in particular, it is not valid to entirely delegate content security to the content nodes themselves.

In some implementations, secure data is encrypted with a set of keys generated and stored by the content publisher. Two distinct sets of keys are generated for each content object part by default: a symmetric key and a public/private key pair for proxy re-encryption. For instance, the symmetric key and method can be AES-256. The content fabric's proxy re-encryption is implemented with pairing-based cryptography so a pairing-friendly elliptic curve can be used. In some implementations, the content fabric uses the curve, BLS12-381.

In some implementations, while each form of cryptography independently provides strong security guarantees, the two distinct key sets are used to implement the trustless model. The symmetric content keys are managed securely in the content fabric. The keys for proxy re-encryption are managed by a separate, independent online system, e.g., a key management service. When a user is granted access to a content object, the symmetric key is transmitted directly to the authorized user. This key by itself can be insufficient to decrypt the data. To perform the proxy re-encryption, the authorized user's computing device generates its own set of BLS12-381 keys. The system creates a re-encryption key based on the original content owner's key and the content-specific key of the end user. This key is then transmitted to one or more fabric nodes in the content fabric. These fabric nodes then proxy the encrypted data, using the provided re-encryption key to transform the data in real-time into the target key of the end user. The end user then decrypts first with their private key and then the symmetric key. This form of two-tier encryption can ensure that the keys the end user controls cannot be used to directly decrypt the original source data that is stored in the content fabric.

In some implementations, key generation, storage and management are performed automatically and transparently on behalf of both the content owner and content consumers. Encryption and decryption can be performed in near real-time while data is stored and retrieved from the content fabric. A scalable library can be used for server-side processing, and the same library is cross-compiled into Web Assembly (WASM) to execute in client software, including modern browsers.

In some implementations, the content fabric's unique architecture and security model allow for creating a blockchain-verifiable (tamper resistant) content versioning system that can both provide integrity verification of content and a traceable history of content version changes. Some implementations use fast proofs of content version integrity and the recording of content version history into the blockchain for traceability.

In some implementations, the content fabric security model provides for authenticity of the parties and privacy of the content. With respect to integrity of the content, the managing of content in the content fabric takes into account that: 1) content can be created and updated by many users, 2) content can live in the content fabric for an extended time, and 3) content can be accessed by many users.

In some implementations, the content fabric uses a fast proof method, a Chunk Merkle Proof, that allows a client reading a content object to verify the hashes of the object's constituent parts in a short time and therefore allows a client to verify the integrity of a content object which the client has read.

An example of the fast proof method is as follows:

Each content object part is broken down in smaller segments—for instance, 1, 2 or 10-20 MB in size Each segment is 'hashed' using, by default, SHA-256 (configurable to include future standards such as SHA-3)

Segment hashes are organized in a tree, such as a Merkle tree or a Patricia tree This tree has the following properties:

The root of the Merkle is a hash that reflects each change in the content, so a given Merkle tree root fully identifies a particular version of the content For any given segment, some implementations can calculate what is called the Merkle proof that allows a user in possession of the segment to ascertain that the segment is correct and it resolves to the known root of the Merkle tree. This proof can be a list of hashes of adjacent branches of the tree up to but not including the root hash.

Content object parts are listed in a special metadata store in a format, such as a CBOR format. The user can retrieve the data blob and verify that (a) the root of the Merkle tree for the desired part is present and (b) the hash of the data blob is further resolved correctly toward the content version hash as described below.

Metadata stores are similarly stored in a data blob and can be verified the same as #2 above.

The content object "reference store" can be a data blob containing the hash of the content object parts data blob #2 and metadata #3.

Using this structure, a user in possession of any part of a content object (e.g., data or metadata) can verify that this data is correct and resolves to the known hash of the content object version.

In some implementations, the 'content object version' is recorded in the blockchain upon creation of the content object and update of the content object. The content object version can be recorded in the Commit transaction following a write to content. This transaction encodes the address of the account that performed the write operation and, in combination with the object proof, can prove unambiguously the blockchain account, and therefore the actor, responsible for a content operation. Applying this capability across the functioning of the content fabric allows for a transparent, provable chain of record for content as shown in FIG. 28. FIGS. 29 and 30 show examples of content object verification trees.

Another example of a content verification tree in JSON format is as follows:

```
{
  "hash": "hqQmemnsVGtimQkKVCJRot79DAW5wazrWhYdB7x35Lxdx9Pq",
  "qref": {
    "valid": true,
    "hash": "hqp_QmemnsVGtimQkKVCJRot79DAW5wazrWhYdB7x35Lxdx9Pq"
  },
  "qmd": {
    "valid": true,
    "hash":
"hqp_QmdQXKXRLE4gzmphrbin6F51cESTKd6U5XLtwg7hi8UXsq",
    "check": {
      "valid": true,
      "invalidValues": [ ]
    }
  },
  "qstruct": {
    "valid": true,
    "hash":
"hqp_QmdwfHGH9mX73ccw8NCQFvGh4i2oU1ChAVzdoiaw7BuojH",
    "parts": [
      {
        "hash":
"hqp_QmUv75ETf9x22cjNNbTncVPMuKZpXLPHF7tVz2D9ACthqD",
        "proofs": {
          "rootHash":
"acda1564dfc542064b7becdbc2d107c84fe1f942337bfe3c06f2b4eec5e806b
8",
          "chunkSize": 49,
          "chunkNum": 49,
          "chunkLen": 50,
          "finalized": 116
        },
        "size": 2634
      },
      {
        "hash":
"hqp_QmUDs9mNqWLBuZcTEA7SUAJZb6SEqwoj18ETvKjwjXnePW",
        "proofs": {
          "rootHash":
```

-continued

“901d2cef310ba329a3fbfcadaaa776de13c1cab9cf342d88a7afb268ca5ec37
9”,
        “chunkSize”: 49,
        “chunkNum”: 49,
        “chunkLen”: 51,
        “finalized”: 116
      },
      “size”: 3270
    },
    {
      “hash”:
“hqp_QmTy4yE4ti5xWjrMwhEvK29QYQ12ysoVdtSEp4L2qhmWaF”,
      “proofs”: {
        “rootHash”:
“83a5f2b6b5ca0d4112862264dec3b778c1973fd442df1aaad5558b041524228
9”,
        “chunkSize”: 49,
        “chunkNum”: 49,
        “chunkLen”: 52,
        “finalized”: 116
      },
      “size”: 4740
    },
    {
      “hash”:
“hqp_QmduUaq5891hFH7sBytrjXvwmw4EpGkRfpUZ8rdY6tFhum”,
      “proofs”: {
        “rootHash”:
“9c50884174f78a6b13006f2fe0eb642b29cfd0813924e8da7c8bdd0abf735d6
d”,
        “chunkSize”: 49,
        “chunkNum”: 49,
        “chunkLen”: 52,
        “finalized”: 116
      },
      “size”: 4008
    },
    {
      “hash”:
“hqp_QmSZhnv1qkQd3LdjEvHLWjP1dJbcBT45cdhiNfiv92UYPA”,
      “proofs”: {
        “rootHash”:
“2baedb36c987a03c6d3afc4989de96aeb4303cc3b1ae750ca0e1ae1e80fa8c2
6”,
        “chunkSize”: 49,
        “chunkNum”: 49,
        “chunkLen”: 51,
        “finalized”: 116
      },
      “size”: 3638
    },
    {
      “hash”:
“hqp_QmcQC7wk72X3NmPSuoTm1Pi7anPZzrLaeXRrSouhY2onmV”,
      “proofs”: {
        “rootHash”:
“ec776feaff71865a5bfcc512926a1ece766fd78339d2b5e69008dd8c31d2f99
f”,
        “chunkSize”: 49,
        “chunkNum”: 49,
        “chunkLen”: 51,
        “finalized”: 116
      },
      “size”: 3119
    },
    {
      “hash”:
“hqp_QmV2pZmWfuqPtCCEjwPQPRAFQhJoP1DNEGHVP7Jft9xMma”,
      “proofs”: {
        “rootHash”:
“c9a5b4e77c8a314bb31035aafd02c6a2c5adb19e1b673e64706ed7185200086
c”,
        “chunkSize”: 49,
        “chunkNum”: 49,
        “chunkLen”: 51,
        “finalized”: 116
      },
      “size”: 3725
    }, -continued {
"hash":
"hqp_QmczFwuf1PmyZHbX1Tq4yQkUkohvPu2tQifgEMzE9TVCkp",
"proofs": {
"rootHash":
"9f336d22faec24919675fe38904e9bc317134dc913cda839d9e476f49ceb0a0
0",
"chunkSize": 49,
"chunkNum": 49,
"chunkLen": 52,
"finalized": 116
},
"size": 4139
},
{
"hash":
"hqp_QmQQSHdKE3u4PeNJ1idgoG3QRDEBEowZNTaXmkwitQPVUv",
"proofs": {
"rootHash":
"f5a8225bc3df71e1b650ffa9b792ef712c1dde552cd984e5dc330201a65e8f3
f",
"chunkSize": 49,
"chunkNum": 49,
"chunkLen": 51,
"finalized": 116
},
"size": 3512
},
{
"hash":
"hqp_QmXMd9EYhjkD8q3beCEpgCDbL4MnMXzHirhCiQwStEshQt",
"proofs": {
"rootHash":
"29e49c187271b344ba58154fd4ce6db181cdbfedfb87c6ab4ce548edcb942f7
6",
"chunkSize": 49,
"chunkNum": 49,
"chunkLen": 51,
"finalized": 116
},
"size": 3406
},
{
"hash":
"hqp_QmafFJSxwCf9HWNuc1iyzRfH8guNSLN4RUHsid8QXuHc4z",
"proofs": {
"rootHash":
"1fcae272731987195bf91c877733c5b80d276e56f091baef8b06af73e030d51
b",
"chunkSize": 49,
"chunkNum": 49,
"chunkLen": 55,
"finalized": 116
},
"size": 7407291
},
{
"hash":
"hqp_QmaeAzsWkufMhbm5v8mSxwMJXJ3PmVynYbgYndTkPSdi6x",
"proofs":
"rootHash": {
"6bfc296a266462eb34c1fbad68d40a7f9805f0d4d6c2b75b0a5664fd5e844da
2",
"chunkSize": 49,
"chunkNum": 52,
"chunkLen": 51,
"finalized": 116
},
"size": 38057642
},
{
"hash":
"hqp_QmYNZvVwaSWAVKpRhst5quPRdBA1QnQks3EDx3H7B7PxEV",
"proofs": {
"rootHash":
"71ac3a124d0e17c38f269373c63321c53c0b4e19eda4863a6a2aebcc2eed06c
1",
"chunkSize": 49,
"chunkNum": 49, -continued

```
            "chunkLen": 54,
            "finalized": 116
          },
          "size": 6726419
        },
        {
          "hash":
"hqp_QmbZtVndHd85atZL1y3PXp1idXa7RZJeQEeCT8NsqBYiKA",
          "proofs": {
            "rootHash":
"2d8d5f097e9aadf17219dd7f86e1ca8944aa5ef7b19710c7969a75bbd51965f
3",
            "chunkSize": 49,
            "chunkNum": 50,
            "chunkLen": 49,
            "finalized": 116
          },
          "size": 15757990
        },
        {
          "hash":
"hqp_QmQXx83NoJnyuKp2SP8mTQh7LA9dsNNFS8q5bfSsC7PHeT",
          "proofs": {
            "rootHash":
"c85ea23550d2eb306ef5904f7480b6711e69fc47be07fd245b425472a447c74
b",
            "chunkSize": 49,
            "chunkNum": 50,
            "chunkLen": 49,
            "finalized": 116
          },
          "size": 13814854
        },
        {
          "hash":
"hqp_QmRkG7AXbSc54KxzP13oW7226hEupTagggrN1w3sEjgSpE",
          "proofs":
            "rootHash":
"665f3b9b11fd9ef2b334fc8ec28f9170708457a13cc693039fcd2c4b618b03c
5",
            "chunkSize": 49,
            "chunkNum": 49,
            "chunkLen": 57,
            "finalized": 116
          },
          "size": 90509
        }
      ]
  },
  "valid": true
}
```

For instance, given a content object part with the root_hash, "6bfc296a266462eb34c1fbad68d40a7f9805f0d4d6c2b75b0a5664fd5e844da2" and a segment size of 10 MB, the following proof is constructed such that if a user is in possession of any of the 10 MB segments, the hash tree can be calculated up to the 'root_hash'.

```
{
  "root_hash":
"6bfc296a266462eb34c1fbad68d40a7f9805f0d4d6c2b75b0a5664fd5e844d
a2",
  "proofs": [
    {
      "byte_beg": 0,
      "byte_end": 10485759,
      "proof": [
"6bfc296a266462eb34c1fbad68d40a7f9805f0d4d6c2b75b0a5664fd5e844d
a2",
"33355cb42bb31bae5cbb1881afaa4b612b050654ec173b7a627489f844dc8d
26"
        ]
      },
      {
        "byte_beg": 10485760,
        "byte_end": 20971519,
        "proof": [
"6bfc296a266462eb34c1fbad68d40a7f9805f0d4d6c2b75b0a5664fd5e844d
```

-continued

```
a2",
"2bdff03703f7c71dd27e58ac52dc675a183b9df336ace85c928cb239b5fe09
5c"
        ]
      },
      {
        "byte_beg": 20971520,
        "byte_end": 31457279,
        "proof": [
"6bfc296a266462eb34c1fbad68d40a7f9805f0d4d6c2b75b0a5664fd5e844d
a2",
"b0409db2ba129ba4279378e22bfebcc492e196544b9a09c9056aa9de4927f0
7a"
        ]
      },
      {
        "byte_beg": 31457280,
        "byte_end": 38057641,
        "proof": [
"6bfc296a266462eb34c1fbad68d40a7f9805f0d4d6c2b75b0a5664fd5e844d
a2",
"0fd7816bd9f06f3cf976aa24034e5de704cae01eae1f1efa4e2013538f3e02
ea"
        ]
      }
    ],
    "proof_data": {
"0fd7816bd9f06f3cf976aa24034e5de704cae01eae1f1efa4e2013538f3e02
ea":
"+FugPFTGTXwdYttZq5dn0MN7mxhQ326xWs46OfS9OQp0Jym4OAMAAAAAAAAAAAA
DgAQAAAACptkQCAAAAALxUxk18HWLbWauXZ9DDe5sYUN9usVrOOjn0vTkKdCcp"
,
"2bdff03703f7c71dd27e58ac52dc675a183b9df336ace85c928cb239b5fe09
5c":
"+FugPedu9h8GXkgK0RrW0OD3SMiFqcLCElw7SYmLEEyOa1S4OAEAAAAAAAAAAAA
CgAAAAAAD//z8BAAAAAG3nbvYfB15ICtEa1tDg90jIhanCwhJcO0mJixBMjmtU"
,
"33355cb42bb31bae5cbb1881afaa4b612b050654ec173b7a627489f844dc8d
26":
"+FugOgJLxu2N9IQYm7cXjVahA3nG+i5WKgjclAbdoPB4iw+4OAAAAAAAAAAAAAA
AAAAAAAAD//58AAAAAADoCS8btjfSEGJu3F41WoQN5xvouVioI3JQG3aDweIsP"
,
"6bfc296a266462eb34c1fbad68d40a7f9805f0d4d6c2b75b0a5664fd5e844d
a2":
"+JGAgICgMzVctCuzG65cuxiBr6pLYSsFBITsFzt6YnSJ+ETcjSaAgKAr3/A3A/
fHHdJ+WKxS3GdaGDud8zas6FySjLI5tf4JXICAgICgD9eBa9nwbzz5dqokA05d5
wTK4B6uHx76TiATU48+AuqAgKCwQJ2yuhKbpCeTeOIr/rzEkuGWVEuaCckFaqne
SSfweoCA",
"b0409db2ba129ba4279378e22bfebcc492e196544b9a09c9056aa9de4927f0
7a":
"+FugNuieiyxh4owFusQG1xj7t2Ogj4gGoC4NiRXqQLbjRuy4OAIAAAAAAAAAAAA
BAAQAAAAD//98BAAAAAObonossYeKMBbrEBtV4+7djoI+IBqAuDYkV6kC240bs"
  }
}
```

In some implementations, the content fabric provides for scaling and monetizing the management and distribution of media with personalization, intelligence, and high efficiency. The following describes several areas of applications. Other use cases are possible.

In some implementations, the content fabric's JIT distribution capability allows consumer streaming variants differing in packaging format (DASH, HLS), bitrate, scaling and platform (smart TV, mobile, desktop, cable/over the air set top) to be generated from single master, i.e., mezzanine level sources without pre-generation (transcoding, packaging) and storage of the variants, saving time to market, complexity costs, and eliminating significant use of storage and distribution bandwidth.

In some implementations, failed content segments—bad or missing tracks, failed compliance, or other mistakes in quality control—can be corrected by replacing only the repaired portion of the master source, avoiding re-packaging and re-distributing new versions.

In some implementations, because the access to specific output variants is authorized via the fabric smart contracts, specific territorial variants and in theater versus home/retail release window policies ("avails terms") can be encoded into smart contract policies, allowing a single source to serve global, and time-varying availability contracts and reduce the huge multi-department upstream work to control and implement date and time-specific availability terms.

In some implementations, flexibility and scalability of the smart contract-controlled content access in the content fabric and the programmable content transformation via bitcode allows for powerful new monetization opportunities directly between content owners, content licensees, content consumers and third party sponsors/advertisers. The following highlight a few categories:

In some implementations, users can earn credit via use of the custom pre- and post-hooks in content AccessRequest methods, allowing the content fabric to credit a user for viewing an ad, and the credit can be applied toward the subscription fee for accessing paid for content. Similarly users can choose to watch content with no ads. In some implementations, the content fabric can provide that:

the advertiser can be assured that an entire ad was streamed and be provided with details of the user that has watched the ad (optionally reported through data passed into the smart contract method);

the user can precisely control and consent to the data that he or she is contributing for collection, because the data collected can be verified through a blockchain transaction, and sponsor recipients can be traced;

ad coupling to content can be as "smart" as desired, based on matching ad content to user preferences or content tags (see next point) and can be placed with the content via any dynamic insertion, overlay or even in-content (scene based) product placement, using bitcode;

users may choose to watch content with NO ads, while the marketplace dynamics of the smart contracts allow the content owner to charge a market-bearing price for the content subscription.

In some implementations, with tagging and in particular the automated video classification and tagging of video via ML in the content fabric, and the flexibility of bitcode to "use" these tags as data to drive bitcode pipelines that generate the output content, advertising can be made specific to the end user and, as described above, fitted with the content in highly integrated ways.

In some implementations, combining this programmability with smart contracts, the content fabric can support giant-scale content marketplaces—where sponsors can bid on the content tags, owners can connect with sponsors universally (without bespoke/pre-existing advertising relationships), and users can even select content and advertising of their specific interest through their indicated preferences. User access to advertising content can be precisely known due to the contract transactions around content delivery, and this proof and settlement between content owners and advertisers can be handled quickly via smart contracts. In some implementations, the content fabric connects smart contracts to external digital payments services, so payment can continue to be done in flat currency avoiding any requirement relying on or influenced by cryptocurrency.

In some implementations, bitcode can be used to allow users to view, select ("clip") and download preferred content, such as in online archives of news and sports, and the supporting smart contracts can feed back any metadata about the selected content, such as tags, or consented user data. Additionally, the price of content or even parts of the content can be intelligently updated by updating the content access charge in the smart contracts, allowing content owners to have smart, dynamic control to maximize the performance of their online content platforms.

Similarly, contributors of the content such as affiliate stations, partners, or content licensees can be directly paid based on the specific content performance by crediting their accounts through a smart contract transaction, avoiding delays, intermediate accounting and creating an efficient incentive for performance.

In some implementations, the content fabric can increase the possibility of direct performance-based payment through the following features: content licensees can accept contract terms quickly and digitally implementing a state recorded in a smart contract, and upload content according to a template that is dynamically rendered from the content type, and automatically request approval from the content owner. The approval can automatically update the state of the content object's smart contract and in turn credit the account of the licensee. Similarly, audience performance data recorded into the content object's contract can be used to compute and credit additional royalty payments. Both content owners and licensees benefit from the efficiency, scale, and performance incentives.

In some implementations, end users can be incentivized to review and report quality problems in content with credit via the backing smart contracts supplementing top-down content quality control with efficient crowd-sourced efforts.

In some implementations, as described with respect to ML for video classification, the content fabric's scalable metadata storage with content allows for creating giant scale search engines in which users can search for content matching preferences or even matching existing content samples. The "like this" content to be matched will itself be tagged and content with "similar tags" located and scored.

In some implementations, the content fabric can be used to build new media networks, platforms and channels that are based on traceable, provable content. In some implementations, the content fabric makes it possible to prevent this exploitation from the ground up by certifying the version and origin of any content it serves, and opens the possibility for a new class of provable media platforms.

Figure 31:
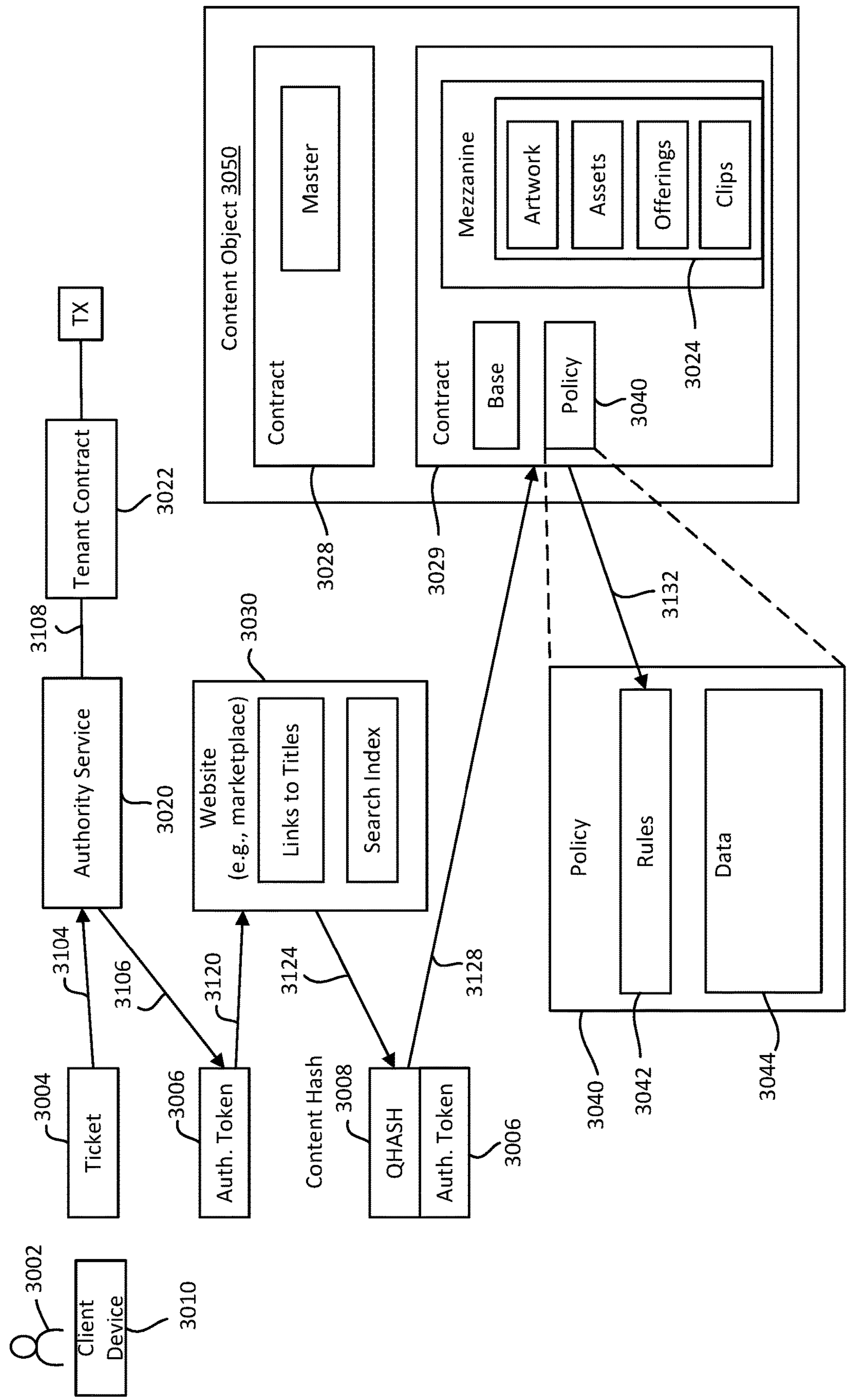
FIG. 31 illustrates a block diagram of an example of aspects of a decentralized content fabric configured to provide access control and ownership transfer of digital content in accordance with some implementations.

FIG. 31 illustrates a block diagram of an example of aspects of a decentralized content fabric configured to provide access control and ownership transfer of digital content in accordance with some implementations. A flow of operations is illustrated in FIG. 31 including a client device 3010 presenting a digital ticket 3004, exchanging the digital ticket for an authorization token 3006 by interacting with an authority service 3020, presenting the authorization token, the content fabric verifying the authorization token against a contract policy, followed by the content fabric granting permission to perform an action with respect to the digital content (e.g., viewing access and/or delegating ownership of the digital content) when contract policy rules are satisfied.

In the example of FIG. 31, the digital ticket 3004 may serve as proof of payment that can allow a user 3002 of the client 3010 to obtain an authorization token from the content fabric. For instance, the user can purchase the digital ticket from a digital payment system or win an electronic auction for the digital ticket. In other instances, a content owner or publisher can give or award digital tickets to users as part of a promotion, by way of illustration. In some implementations, a digital payment system or electronic auction can therefore provide payment screening for access control as well as ownership transfers of digital content. Using some aspects of the content fabric, the digital ticket is redeemable for authorization to stream or download media managed as a content object in the content fabric, in this example. Aspects of the content fabric can thus be used to attach or otherwise associate the payment with the authorization.

In FIG. 31, at 3104, the client 3010 presents the digital ticket 3004 to the authority service 3020. As described in further detail below, the interaction between the client device and the authority service can involve an exchange of other types of digital information besides a ticket. More generally, the functionality at 3104 can involve the client device presenting one or more identity credentials to the authority service 3020. The identity credential(s) serve to identify the user 3002 in connection with the user's assertion of a right to access content in the content fabric. The user's assertion need not be tied to a specific item of digital content. For example, the digital ticket 3004 can be a ticket for one-time viewing of content, with the specific content to be viewed being selected by the user 3002 after presenting the authorization token 3006 to a website 3030 that participates in the content fabric.

Client 3010 can be a computing device running a player application. In some implementations, the player application is executed within a Web browser. However, the player application can also be a standalone application or embedded within some other type of program. The manner in which content is accessed by the client 3010 depends on the media format of the content and can include, for example, audio played over a speaker/headset and video or static images rendered on a display screen. In some implementations, the content may be presented within an augmented, mixed, or virtual reality environment. For instance, the content can be a livestreamed concert held virtually, in which case the player application can be presented through a virtual reality headset.

Client 3010 can acquire the digital ticket 3004 and/or other credentials in various ways. For instance, the user can purchase the digital ticket 3004 from a digital payment system or win an electronic auction for the digital ticket. However, acquisition of the digital ticket 3004 is not necessarily conditioned upon payment or an exchange of value. In some implementations, the functionality in 3104 involves a sign-on process in which the identity of the user is verified through the user supplying their credentials (e.g., a username and password), either directly to the authority service or via a separate identity service provider. For instance, instead of a digital ticket, the client 3010 may present a single sign-on (SSO) token obtained from an O Auth service.

Presenting the digital ticket 3004 serves as a request to exchange the digital ticket for the authorization token 3006. In the example of FIG. 31, the digital ticket is exchanged through a redemption process (at 3108) that is executed as a transaction on the content fabric. In FIG. 31, the authority service 3020 is another participant in the content fabric and may, for example, correspond to a fabric node managed by an operator of the content fabric. Accordingly, the authority service 3020 can have a tenant contract 3022 (e.g., a node contract) associated with it. Work done by the authority service 3020, such as redemption of digital tickets, can be recorded in a blockchain ledger. Alternatively, in some implementations, the authority service 3020 may not be a participant in the content fabric.

At 3108, the authority service redeems the digital ticket 3004, for instance, by sending an authorization request through an API call to the content fabric to execute the tenant contract 3022, which can reside within the fabric node of the authority service or on another node in the content fabric. The redemption can be recorded as a transaction (TX) in the blockchain ledger. The redemption process can involve the authority service (or some other entity executing the tenant contract 3022) checking whether one or more criteria associated with generating the authorization token 3006 are met. The one or more criteria can be specified as terms in the tenant contract 3022 and can include time windows within which the digital ticket 3004 is valid, restrictions for different classes of tickets, restrictions on the number of times the digital ticket can be redeemed for an authorization token, and/or the like. It should be noted that the criteria applied during the redemption process are not necessarily the same as the criteria by which the content fabric decides whether to grant the client access to content. For example, as discussed below, the criteria applied by the content fabric for determining access can be based on ownership of a digital instrument such as a non-fungible token (NFT). By way of analogy, the digital ticket and/or other user credentials can be viewed as a general admission ticket to a public venue, with the authority service serving as a gatekeeper. In order to access a specific service within the venue, the user needs to demonstrate that they own the right to do so, for example, by acquiring a separate ticket for the specific service. In some implementations, this separate ticket is a digital instrument that can be recorded in the content fabric any time prior to the decision whether to grant access to the content item being requested.

At 3106, upon successful redemption of the digital ticket, the authority service returns the authorization token 3006 to the client. In some implementations, the client may sign the authorization token upon receiving it, using a private key of the user 3002. Alternatively, the authorization token 3006 can be digitally signed on behalf of the user 3002 by the authority service using the private key of the user. In this manner, the authorization token 3006 may, in some instances, be considered a "self-signed" token that is presentable as proof of the right of the presenter to act in the capacity of the user 3002 or, more specifically, in the capacity of a user ID associated with the user. As discussed below, the user ID can be the user's blockchain address, which in some instances is an address of the user's cryptocurrency wallet.

At 3120 the user can then use the authorization token to browse a website 3030. The website 3030 is configured to manage and display links to titles of content objects such as video or audio streams, video or audio downloads, static digital images, etc. as well as a search index. The user 3002 can view content offerings (e.g., titles) through the website 3030 by submitting the authorization token 3006, using client 3010. For instance, website 3030 can prompt the user 3002 to submit the authorization token 3006 or a reference to the authorization token in an input field of a web page. In some implementations, the website 3030 operates as a portal to a content marketplace. The website 3030 may provide a digital catalog or search engine through which the user can obtain links to content that has been indexed. The specific offerings that are available to the user through the website 3030 may depend on the user's access rights. For instance, the website 3030 may limit the titles that are visible to the client 3010 based on the contents of the authorization token.

In some implementations, the website 3030 is a fabric node in the content fabric and can forward the authorization token 3006 to the content fabric for evaluation against a policy in a contract associated with the website 3030 to determine what content should be made visible to the client 3010. This evaluation process can be performed in a similar manner to the authorization token based evaluation described below for determining whether to grant the user access to content. However, in this case, the access rights pertain to the right to discover content rather than access the underlying content. Content that is discoverable can be rendered visible using metadata, images, and/or other media representing the content, for example, the name of a title, cover art of a music album, a thumbnail or preview image, a teaser video, etc. Accordingly, when navigating the digital catalog or performing searches on the website, the user 3002 may only be able to see images and links for content that are deemed discoverable for the user.

In some implementations, the user 3002 can indicate which item of digital content the user wants to access by selecting a corresponding link on the website 3030. Accordingly, at 3124, the website 3030 can return a content hash 3008 that identifies a content object 3050 associated with the selected link. The content hash 3008 may correspond to QHASH in FIG. 15 and maps to a smart contract 3029 of the content object 3050.

At 3128, the client can then request, from the content fabric, access to the content object 3050 identified by the content hash 3008. However, as described below, there are other ways for the content fabric to determine which digital content the user wants to access, such as linking to a digital instrument (e.g., an NFT) that is stored in association with the content object 3050. The access request at 3128 includes the authorization token 3006.

Upon receiving the authorization token, the content fabric verifies the authorization token against terms in the contract 3029. The terms of the contract 3029 include a policy 3040 defined by rules 3042 and data 3044. For example, the smart contract can query the policy rules at 3132 to determine a yes or no response. As described above, smart contracts can be implemented as executable code. Accordingly, in some implementations, the querying of the policy rules at 3132 can be performed using a function call to program code that evaluates the policy rules 3042. The policy rules 3042 can include at least one rule that specifies one or more conditions for determining whether to grant or deny access. The one or more conditions can include a condition relating to the data 3044. For instance, the data 3044 may include a list of NFTs associated with the content object 3050 or, more specifically in this example, a mezzanine version. Further, the policy rules 3042 may include one or more rules that condition access to the mezzanine version upon ownership of an NFT in the list of NFTs. The one or more rules can be in the form of logical expressions (e.g., regular expressions) that are configured to evaluate whether a listed NFT is owned by one or more user IDs/addresses. Thus, smart contract terms can be used to grant or deny access to content by the client 3010. Also or alternatively, smart contract terms can be used to grant or deny transfers of ownership to a user, for instance, to add the user 3002 as a co-owner of the content object 3050 or to transfer ownership to another user, from a cryptographic perspective.

The querying of the policy rules 3132 can be performed by a fabric node storing the contract 3029, which is not necessarily the same as the node receiving the access request or the node storing content being accessed. It will be understood from the disclosure in connection with FIGS. 14 and 15 that the content corresponding to the content object 3050 can include multiple parts that are stored in a distributed manner across the nodes of the content fabric. Further, as described above in connection with retrieval of a content object part and content routing in FIGS. 7-10, a request for a content object part can be handled by an egress node (e.g., egress node 708), where the egress node may or may not store the content object part. For example, the supplying (origin) node can be a separate node in the same or a different domain than the egress node. In some instances, then, a content object part is communicated to the egress node from an origin node for onward transmission to a requesting client. Accordingly, the fabric node receiving the access request at 3128, the fabric node querying the policy rules at 3132, and the fabric node that is the source of the content delivered to or otherwise accessed by the client can be a single node or different nodes.

As shown in FIG. 31, the content object 3050 can include multiple contracts, e.g., a contract 3028 in addition to the contract 3029. The content hash 3008 maps to the specific contract that includes the policy rules used to determine whether to grant or deny access (contract 3029), which can be a base contract of the content object. In the example of FIG. 31, the base contract is associated with a mezzanine version of the content object 3050. As described above in reference to FIG. 21, mezzanine versions are useful for reducing latency in live transmission. The contract 3028 is associated with a master format. The content object parts associated with the contract 3038 can form an IMF package (e.g., as shown in FIG. 22) from which the mezzanine version associated with the contract 3029 is created, for instance, as a streaming variant. Accordingly, the content object 3050 can include multiple content object parts that serve different functions, and multiple contracts can be used to set the terms of access to these content object parts for different users. The content object parts associated with the content object 3050 are not shown in FIG. 31. However, it will be understood that the content object parts can be stored in the content fabric separately from the contracts 3028 and 3029.

In the case of the user 3002, the policy rules 3042 may provide for access to data 3024 of the mezzanine version but not the master format. For instance, the data 3024 of the mezzanine version can include version-specific artwork or video clips that can be viewed through the website 3030 when browsing or searching for the title of the mezzanine version. The mezzanine version can also include offerings (as described above in reference to FIG. 22) and other assets that can be presented through the website 3030 and/or the player application running on the client 3010.

Further, the policy 3040 can be customizable to configure various extensible terms restricting access and/or ownership to particular roles or categories of users, particular timeframes, geographic regions (e.g., based on client IP address), etc. Such rules and data of the policy 3040 are linked with the contract 3029 and are highly configurable to set various limitations such as the number of times the user 3002 can stream the content (e.g., the mezzanine version), the number of times the user can download the content, etc. The policy's rules and data can be applied to control access to any static content or dynamic offering that is created via a transaction on the contract 3029. Also or alternatively, the policy 3040 can control whether a proxy owner can add additional owners of the content object, how many additional owners can be added, etc. Thus, onward transfer of content ownership can be limited, for instance, to increase or otherwise regulate commercial value of the content via the content fabric. A policy for access to content and/or for content ownership can include an ERC-20 token price, for instance, enforced by a smart contract.

Proxy transfer of ownership in the context of the content fabric is available is illustrated by an example in which an original owner A decides to sell or otherwise grant ownership of content associated with a content object to another user, referred to as owner B in this example. The ownership in this example is implemented as proxy ownership in that co-owners A and B are required to consent to any further transfer of ownership. So owner A has to consent if owner B wants to add another owner, owner C, in this example. Encryption mechanisms of the content fabric support such an implementation. For instance, owner B's keys can be added to owner A's keys in the content fabric's encryption scheme to provide two or more owners of the same content (e.g., another owner of the mezzanine version besides the user 3002).

Access to the content associated with the contract 3029 can involve any one of various access operations with respect to the content. For instance, the client may read the content, e.g., via file download or streaming. The client may also modify the content or generate derivatives of the content such as variations on a song or video. In some instances, access involves adding another owner or transferring ownership of the content to another user. Each of these access operations may result in the execution of a transaction recorded in a blockchain ledger. Access can be performed according to the methods described above. For example, through just-in-time transcoding as described in reference to FIG. 22 and/or using proxy re-encryption as described in reference to FIG. 27.

Figure 32:
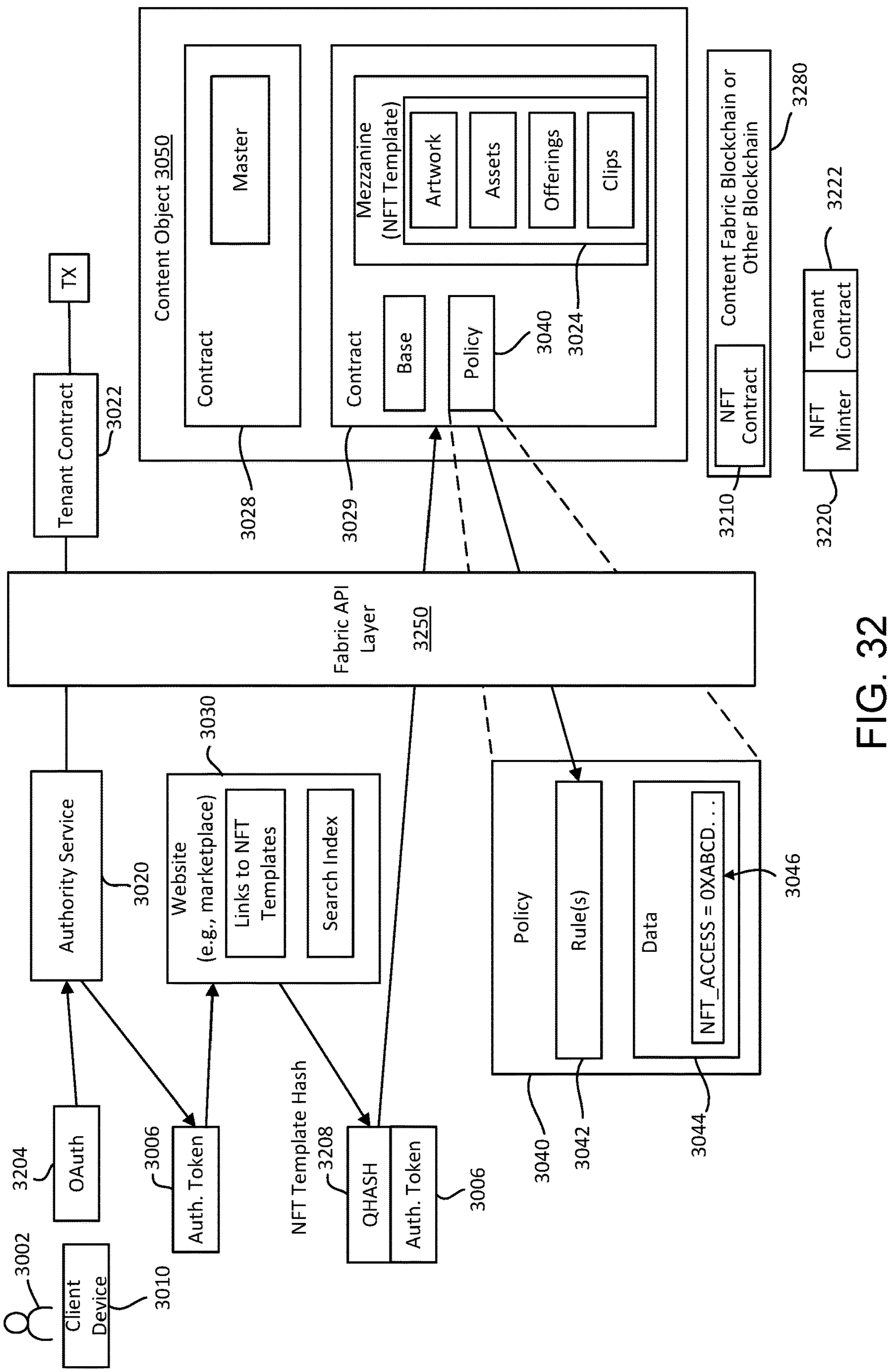
FIGS. 32-34 illustrate block diagrams of examples of aspects of a decentralized content fabric configured to provide access control and ownership transfer using non-fungible tokens.

FIG. 32 illustrates a block diagram of an example of aspects of a decentralized content fabric configured to provide access control and ownership transfer of digital content in accordance with some implementations. The block diagram in FIG. 32 includes a flow of operations similar to that of FIG. 31. In FIG. 32, the client 3010 presents an OAuth token 3204 to the authority service 3020. Alternatively, the client can present some other form of sign-on token or identity credential. The OAuth token 3204 can be generated by the authority service 3020 or a third-party identity service provider based on credentials supplied by the client sometime prior to presenting the OAuth token. For instance, the OAuth token 3204 can be a single sign-on token that was generated in connection with the user signing into some other application besides the application through which the OAuth token is presented. Authority service 3020 can validate the OAuth token 3204 to exchange the OAuth token for the authorization token 3006 described earlier. In this example, the contents of the authorization token 3006 may be similar or identical to when the authorization token is generated based on the digital ticket 3004. In particular, the authorization token 3006 in FIG. 32 can be signed using the private key of the user 3002.

Another difference from the example in FIG. 31 is that the website 3030 in FIG. 32 is configured to manage and display links to NFT templates. In some implementations, at least some of the digital content stored in the content fabric is represented by an NFT. An NFT is uniquely associated with an instance of digital content and typically has a single owner, e.g., user 3002. In a livestreaming scenario, multiple users can each have their own NFT that provides for access to a livestream. Although the livestreams may appear identical, each NFT corresponds to a separate content item in the sense that the owner of the NFT possesses a right to access a specific instance of the livestream, whereas a non-owner has no such right. Similarly, in the case of a music album, multiple NFTs can be generated to provide different users with access (e.g., download permission) to the same music album so that each user becomes an owner of a respective instance of the album. Therefore, although each NFT may be unique, the content represented by an NFT is not always unique.

An NFT template can be a collection of content object parts that are used to create or "mint" a new NFT and therefore a new instance of digital content. For example, the mezzanine version associated with the contract 3029 can be an NFT template from which variations of the mezzanine version can be created. In this manner, a single content object (e.g., content object 3050) can serve as a source of data from which numerous representations of an original content item (e.g., a master format) and/or representations of a derivative of the original content item (e.g., a mezzanine version) can be created in conjunction with recording ownership of such representations.

In the example of FIG. 32, an NFT contract 3210 (e.g., an ERC-721 contract) contains the terms and conditions under which an NFT can be created. The NFT contract 3210 is stored in a blockchain 3280. The blockchain 3280 can be the same as the blockchain of the content fabric or a separate blockchain that is external to the content fabric. In some implementations, NFT contracts are stored in both the blockchain of the content fabric as well as one or more external blockchains. In addition to containing the terms and conditions for NFT minting, the NFT contract 3210 may store data representing one or more NFTs. For instance, in some implementations, the NFT contract includes a hash table that maps NFT IDs (e.g., NFT addresses within an address space of the blockchain 3280) to their corresponding owner addresses. The NFT contract 3210 may include such ownership information for multiple content objects or derivatives thereof, for example, the mezzanine version of the content object 3050.

Minting pursuant to the NFT contract 3210 can be performed by an NFT minter 3220 on behalf of a content owner. The content owner does not necessarily need exclusive ownership over the content object 3050 in order to mint an NFT using the content object 3050. For example, the content owner can be a sole or co-owner of the mezzanine version but not an owner of the master format. The minter 3220 can have its own tenant contract 3222. When NFTs are initially created for a content object (e.g., prior to any downstream minting by subsequent owners), the minting is typically performed at the request of a content creator or publisher. Accordingly, in some instances, the tenant contract 3222 of the minter may be the same as the tenant contract that governs whether an authorization token can be generated for the user (e.g., tenant contract 3022). Additionally, in some implementations, the content fabric may be in communication with one or more external blockchains, and NFTs minted on those external blockchains can be recorded in association with the content object 3050, as part of the NFT contract 3210.

In some implementations, the website 3030 or the authority service 3020 is configured to make a call into the NFT contract 3210 in order to determine which NFT template links are viewable for the client. The call may invoke a transaction that returns a list of all NFTs owned by the user ID or blockchain address of the user 3002. The call into the NFT contract 3210 can be performed after the authority service 3020 generates the authorization token 3006. Alternatively, in some implementations, the call into the NFT contract 3210 can be performed as part of generating the authorization token 3006, for example, so that the list of NFTs owned by the user 3002 is included in the authorization token 3006 and/or communicated to the website 3030 prior to the client representing the authorization token to the website 3030.

When the user 3002 selects a link to an NFT template, the website 3030 returns an NFT template hash 3208, which can be implemented using QHASH as described earlier. The NFT template hash 3208 functions similarly to the content hash 3008 in FIG. 31 and serves to identify content. In this example, the content identified is an NFT template which, as described above, can include a collection of data from which an instance of digital content can be created in conjunction with the minting of an NFT.

As shown in FIG. 32, when the client sends an access request including the authorization token 3006 and referencing the NFT template hash 3208, the access request passes through a fabric API layer 3250 of the content fabric. Thus, the access request can invoke a blockchain transaction through making an authorized API call on the content fabric, in a manner similar to an API call made by a content publisher when publishing content to the content fabric.

Upon receiving the authorization token, the content fabric verifies the authorization token against terms in the contract 3029, in particular the policy 3040. In FIG. 32, the policy data 3044 includes a list of NFTs associated with the policy 3040. For example, the policy data 3044 may include an address (e.g., a token ID) 3046 of an NFT representing the mezzanine version of the content object 3050. It should be noted that the policy data 3044 does not necessarily include all the information for an NFT. As explained above, the NFTs can be stored as part of the NFT contract 3210, which may reside in the blockchain of the content fabric or on an external blockchain. The format of an NFT can depend on the type of NFT contract used. For example, if the NFT contract 3210 is an ERC-721 contract, the NFTs listed in the policy data 3044 are compliant with the ERC-721 standard. In its simplest form, an NFT can be any non-interchangeable piece of data that is stored in a ledger of a blockchain and is associated with an instance of digital content.

An NFT can be identified by a token ID, which in ERC-721 is a unique ID in the form an unsigned 256-bit integer that represents a single asset. The token ID is mapped to an owner ID that is a blockchain address. Thus, the owner of the NFT, and therefore the owner of the digital content represented by the NFT, can be looked up based on a function call using the token ID as an input parameter. Transfers of ownership can be recorded using a "from" address of the transferring owner and a "to" address of the new owner. ERC-721 supports an optional metadata extension that permits an ERC-721 contract to return, based on input of a uniform resource identifier (URI), NFT metadata such as the name of the digital content, a description of the digital content, or a thumbnail image representing the digital content. The token URI can be a location-based address such as an HTTP address. In some implementations, the token URI is an InterPlanetary File System (IPFS) content identifier (CID). The CID is a cryptographic hash of the content it identifies (e.g., NFT metadata) and therefore provides for content-based addressing, which is generally more permanent than location-based addressing. An IPFS can be used to optionally store NFT metadata off-chain, external to the blockchain of the content fabric.

Evaluation of the policy rules 3042 to determine whether to grant or deny access to the user 3002 can be performed in a similar manner to the evaluation described in reference to FIG. 31. However, in the example of FIG. 32, the policy rules 3042 include one or more rules that condition access upon ownership of a listed NFT, where ownership is recorded in an NFT contract (here, the NFT contract 3210) that resides on blockchain 3280. To determine whether the user 3002 owns a listed NFT, the fabric node querying the policy rules can extract a user ID from the authorization token 3006. The fabric node querying the policy rules can extract the user ID from the authorization token based on the user's signature. The user ID represents a blockchain address of the user 3002 and may correspond to a hash of the user's public key.

After the user ID is extracted, the policy rules 3042 can be evaluated to determine whether the user ID corresponds to an owner of one of the NFTs listed in the policy data 3044. Evaluation of the rules 3042 may involve calling into the NFT contract 3210 to check whether the extracted user ID matches any of the owner addresses for a listed NFT. For example, the extracted user ID can be compared to the owner of the NFT address 3046 to determine whether the user 3002 owns the NFT identified by the NFT address 3046. If the owner of the NFT address 3046 and the user ID match, access to the content associated with the contract 3029 (e.g., the mezzanine version) is granted assuming that other conditions, if any, defined in the policy rules 3042 are also satisfied. As described above in connection with the example of FIG. 31, access to the content associated with the contract 3029 can involve any one of various of operations with respect to the content including, in some instances, transferring ownership of the content to another user.

Figure 33:
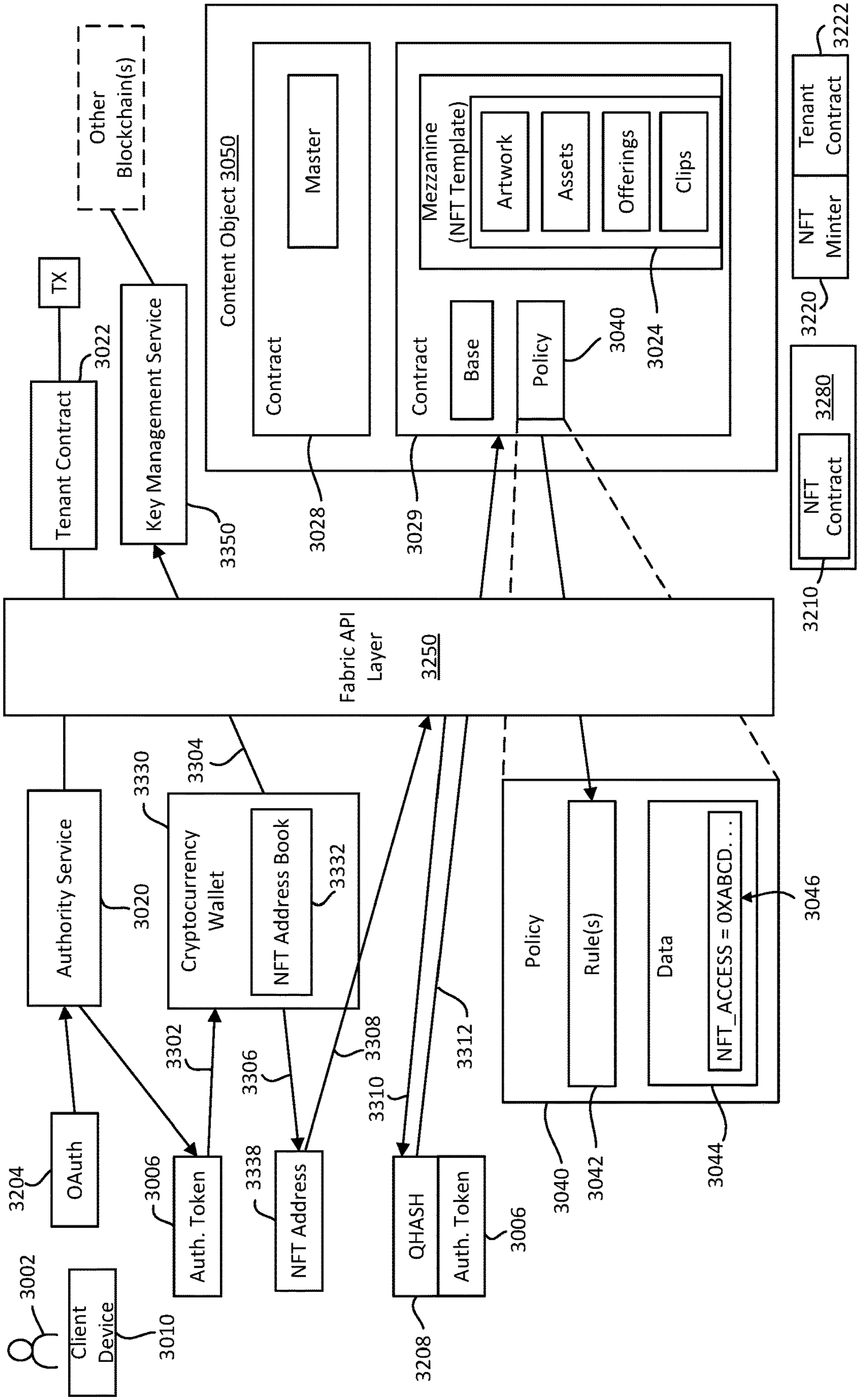

FIG. 33 illustrates a block diagram of an example of aspects of a decentralized content fabric configured to provide access control and ownership transfer of digital content in accordance with some implementations. The block diagram in FIG. 33 includes a flow of operations similar to that of FIG. 32. In FIG. 33, the client 3010 can obtain the authorization token 3006 in a similar manner as described above in reference to FIG. 32. For instance, the authority service 3020 may generate the authorization token 3006 based on validating the OAuth token 3204. In the example of FIG. 33, the OAuth token 3204 may be exchanged for the authorization token 3006 when the user 3002 signs onto the user's cryptocurrency wallet (crypto wallet) 3330. Accordingly, the authorization token 3006 may, in some instances, be signed by a custodian of the crypto wallet 3330 on behalf of the user 3002, for example, using a private key associated with the crypto wallet 3330 rather than the user's private key.

The authorization token 3006 in FIG. 33 is passed to the user's crypto wallet 3330 at 3302. Upon receiving the authorization token 3006, the crypto wallet may verify, based on the user's signature, that the address of the crypto wallet is associated with the user, i.e., that the crypto wallet 3330 belongs to the user 3002. The crypto wallet 3330 can be implemented as a software application running on the client 3010, on a separate computing device operated by the user 3002 (e.g., a mobile application running on a smartphone), or on an online platform. Alternatively, the crypto wallet 330 can be a hardware wallet. The crypto wallet 3330 may contain an NFT address book 3332 that includes a list of NFT addresses owned by the blockchain address of the crypto wallet. Alternatively, the crypto wallet 3330 or the authority service 3020 may retrieve the list of NFT addresses through making a call into the NFT contract 3210. The retrieval can be performed in a similar manner to the retrieval of the list of NFTs owned by the user in FIG. 32 which, as discussed above, can be performed as part of generating the authorization token 3006 or after the authorization token is generated, e.g., when the authorization token is presented to the crypto wallet 3330.

At 3304, the crypto wallet 3330 sends a request to a KMS 3350 for security keys, e.g., the public/private key pair of the crypto wallet 3330. Depending on implementation, the security keys can also be stored locally within the crypto wallet 3330. Further, in some implementations, the KMS 3350 may support proxy re-encryption as described above with respect to the KMS 2616 in FIG. 27. As such, the KMS 3350 may generate a proxy re-encryption key that is used by a fabric node to re-encrypt content for transmission to the client 3010 in connection with the access request in 3312, described below. The KMS 3350 can be part of the blockchain of the content fabric or an external blockchain.

At 3306, the crypto wallet 3330 provides the client 3010 with a list of NFTs that the user 3002 owns, i.e., NFTs identified by the NFT addresses owned by the crypto wallet's address. The user can then select the NFT representing the content that the user wants to access, so that an address 3338 of the selected NFT is returned to the client 3010. In some implementations, the address 3338 is a combination of the token ID described above in reference to FIG. 32 and an NFT contract ID (e.g., an address of the NFT contract 3210).

At 3308, the client sends a request for NFT metadata to the content fabric, using an API call to the fabric API layer 3250 to pass in the NFT address 3338.

At 3310, the content fabric returns metadata of the NFT identified by the NFT address 3308. The metadata returned at 3310 includes the NFT template hash 3208 described above in reference to FIG. 32.

At 3312, the client sends an access request including the authorization token 3006 and referencing the NFT template hash 3208. The access request in 3312 can therefore be processed in the same manner as in FIG. 32, through invoking a blockchain transaction in which the content fabric verifies the authorization token against the terms in the contract 3029, including the policy 3040 that references the NFT contract 3120 in order to confirm that the owner associated with the NFT address 3046 matches the user ID extracted from the authorization token 3006 (in this example, the address of the crypto wallet 3330).

Figure 34:
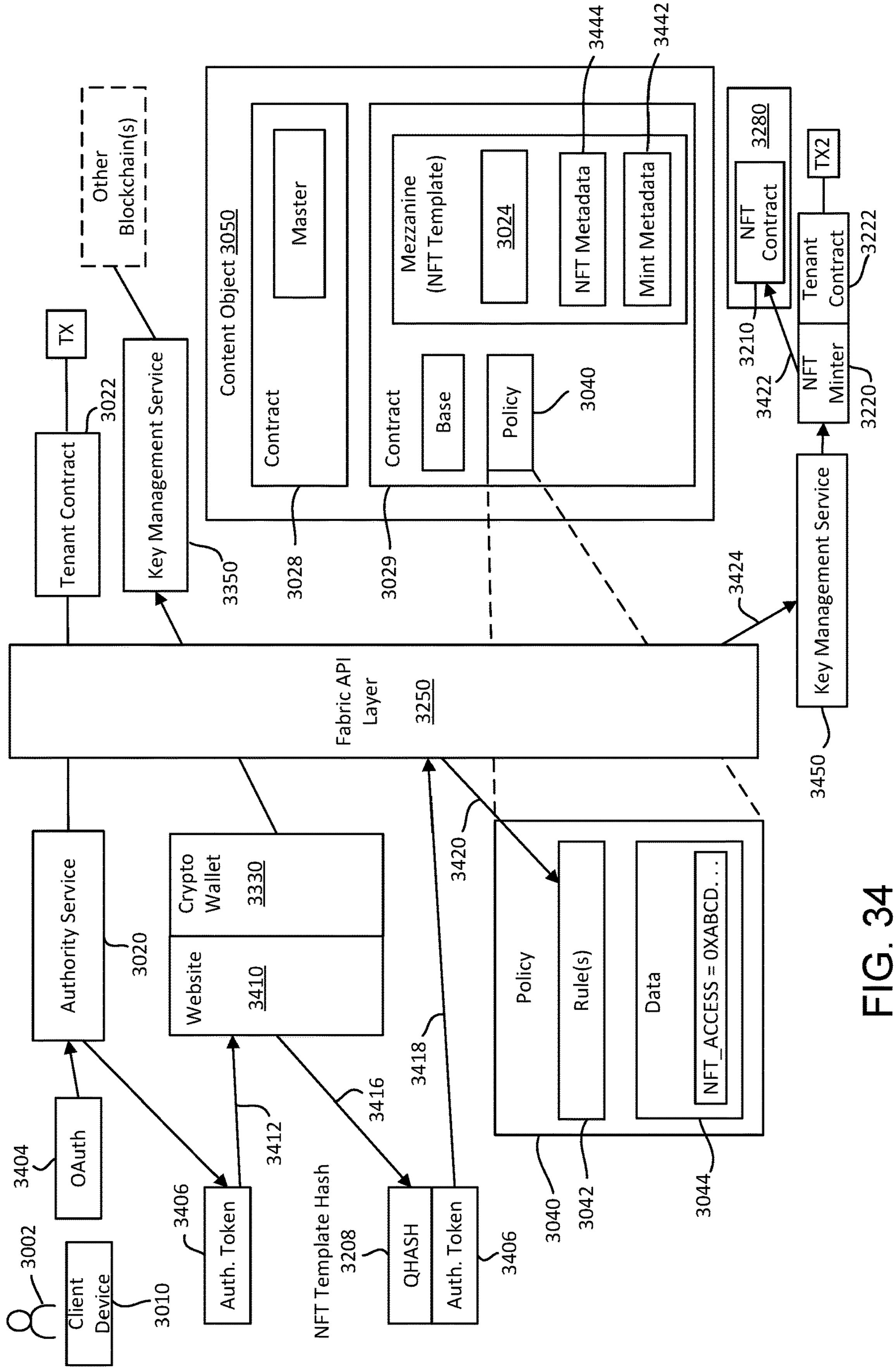

FIG. 34 illustrates a block diagram of an example of aspects of a decentralized content fabric configured to provide for creation of digital instruments representing digital content, in accordance with some implementations. In FIG. 34, the digital instrument is an NFT minted pursuant to the NFT contract 3210. However, the minting technique illustrated can be applied to other types of digital instruments that support recordation of ownership with respect to digital content. The minting in FIG. 34 is performed at the request of the user 3002 and can be performed, for example, after ownership of an NFT representing the mezzanine version of the content object 3050 has been transferred to the user 3002. That is, the policy 3040 may permit the user 3002 to create additional NFTs based on the NFT template. In general, minting of an NFT or other digital instrument can be performed on behalf of any owner of digital content. In some implementations, minting of an NFT is performed in conjunction with publishing content to the content fabric, for example, in accordance with the operations described in reference to FIG. 25. Thus, the authorization token passed into the content fabric in block 2424 of FIG. 25 can be the authorization token 3406.

The flow of operations in FIG. 34 begins with verification of user identity, which can be performed in a similar manner to FIGS. 31-33, with the authority service 3020 generating an authorization token 3406 based on the client 3010 providing an OAuth token 3404 or other identity credential(s). At 3412, the client presents the authorization token 3406 to a website 3410. The website 3410 may be the same as the website 3030, which can include a page for minting NFTs. Alternatively, website 3410 can be a separate website for managing owned content. The website 3140 is in communication with the user's crypto wallet 3330 which, as described in reference to FIG. 33, may be configured to retrieve the user's security keys from the KMS 3350. Upon receiving the authorization token 3406, the website 3140 forwards the authorization token 3406 to the crypto wallet 3330 to obtain and present a list of NFTs owned by the user. For each NFT owned by the user, the website 3410 can provide a link to a corresponding NFT template.

At 3416, in response to user selection of a link to an NFT template, the website 3410 returns an identifier of the NFT template, e.g., NFT template hash 3208, as shown.

At 3418, the client sends a mint request via an API call to the fabric API layer 3250. The mint request references the NFT template hash 3208 and includes the authorization token 3406. The mint request may further include mint metadata 3442 and/or NFT metadata 3444. Upon successful execution of the mint transaction, the mint metadata 3442 can be stored in association with the contract 3029 and describes the digital content (e.g., a variation of the content object 3050) that is represented by the NFT being created. Similar to the metadata for an IMF package, the mint metadata 3442 can define content play lists or offering playlists and, in some implementations, may implement logic for creating an output variant as a new offering, e.g., using a JSON object or a Makefile. Thus, the user 3002 can be a content consumer as well as a content publisher.

At 3420, the contract 3029 is executed to evaluate the policy 3040 for permission to mint an NFT. If one or more policy rules 3042 governing minting are satisfied, the NFT contract 3210 is executed on behalf of the user 3002, e.g., by calling into the NFT contract 3210 using the hash 3208, at 3422.

Execution of the NFT contract 3210 can be performed in response to a request from an authorized minter such as the NFT minter 3220. The NFT minter 3220 can be part of the content fabric and may, at 3424, obtain its security keys from a KMS 3450 to generate a signed mint transaction (TX2), which can be recorded in the blockchain of the content fabric. Alternatively, the minting can be performed on another blockchain. Irrespective of which blockchain the NFT is minted on, an identifier of the NFT's owner can be recorded as part of the NFT contract 3210. Unless a different owner is specified as part of the mint request in 3418, the resulting NFT may default to the user 3002 as being the owner. Thus, the resulting NFT may be linked to the address of the crypto wallet 3330 or to the address of some other user.

Figure 35:
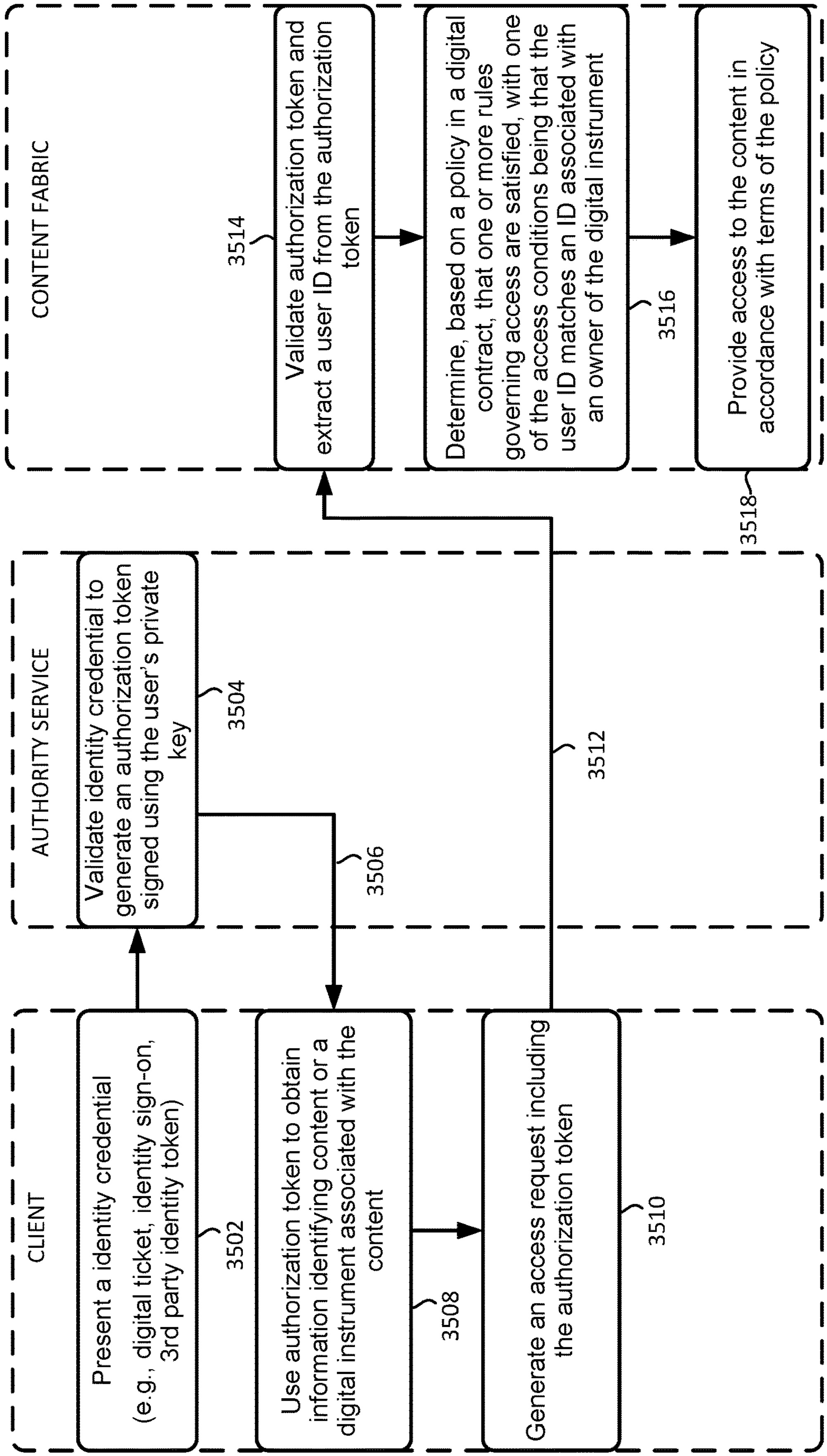
FIG. 35 shows an example of a method for accessing digital content, according to some implementations.

FIG. 35 shows an example of a method for accessing digital content, according to some implementations. The method in FIG. 35 can implement the flow of operations in any of FIGS. 31-34 and includes functionality performed by a client (e.g., client 3010), an authority service (e.g., authority service 3020), and a content fabric. As discussed above, the authority service can be part of the content fabric, which includes one or more fabric nodes configured to process an access request.

At 3502, the client presents an identity credential. The identity credential can take many forms and may, for example, be the digital ticket 3004, the OAuth token 3204, or some other sign-on token that can be evaluated to verify the identity of the user of the client. Additionally, the identity credential may include or be associated with a claim of access rights. For instance, the authority service may be configured to recognize that the identity credential is being presented in connection with an access request directed to the content fabric.

At 3504, the authority service validates the identity credential to generate an authorization token (e.g., authorization token 3006 or 3406) that is digitally signed using the user's private key. The authority service determines whether one or more conditions for issuing the authorization are satisfied. The one or more conditions can be specified as terms in a tenant contract (e.g., tenant contract 3022). Alternatively or additionally, generation of the authorization token can be conditioned upon successful return of one or more NFT addresses through a call to the content fabric, as discussed above in reference to FIGS. 32 and 33.

At 3506, the authority service returns the authorization token to the client.

At 3508, the client uses the authorization token to obtain information identifying content to be accessed or information identifying a digital instrument associated with such content. For instance, the client may obtain content hash 3008 or NFT template hash 3208 through selecting a corresponding link on a website. The website may be configured to present the links based on evaluation of the authorization token 3406, which can be performed locally or through an API call to the content fabric. In the example of FIG. 33, the NFT template hash 3208 is returned by the content fabric based on NFT address 3338, which is provided by the crypto wallet 3330 and results in a call to a digital contract (the contract 3029) associated with the content object 3050. In turn, evaluation of the policy 3040 in the contract 3029 results in a call to the NFT contract 3210.

At 3510, the client generates an access request including the authorization token, which has now been signed on behalf of the user. The access request references the information obtained in 3508 (e.g., a QHASH), thereby enabling the content fabric to locate the digital contract (e.g., contract 3029) for the content identified by this information.

At 3512, the client sends the access request to the content fabric, which validates the authorization token at 3514. The validation performed by the content fabric may involve verifying the authenticity of the authorization token based on the digital signature of the user.

Additionally, at 3514, the content fabric extracts a user ID from the authorization token. In some implementations, the user ID is extracted cryptographically as a function of the user's digital signature.

At 3516, the content fabric determines, based on a policy in the digital contract that one or more rules governing access are satisfied. The rule(s) may condition access to the content at least upon the user ID matching an ID of an owner of the digital instrument associated with the content. In this manner, ownership of the digital instrument may be a prerequisite for access to be granted. The one or more rules can impose addition conditions, including, for example, restrictions on the types of access rights that the owner of the digital instrument has (read, write, mint, ownership transfer, etc.). The digital instrument can be an NFT. More generally, the digital instrument can be any unit of data that is stored on a blockchain ledger as a unique representation of the digital content. In this context, uniqueness means that the digital instrument is itself unique and the only digital instrument that the content fabric considers to be a valid representation of the digital content. However, other digital instruments (e.g., additional NFTs) may be created to represent separate instances of the same content. The relationship between the digital instrument and its owner can be reflected in a hash table entry (e.g., a hash table in the NFT contract 3210) that maps an ID of the digital instrument to a user ID (e.g., the blockchain address of the user or the user's crypto wallet).

At 3518, the content fabric provides the client with access to the content in accordance with the terms of the policy. Depending on the nature of the access request, the content fabric can perform any of various access operations as part of providing access to the content, such as delivering the content to the client, recording a transfer of ownership, or publishing a variation of the content.

Figure 36:
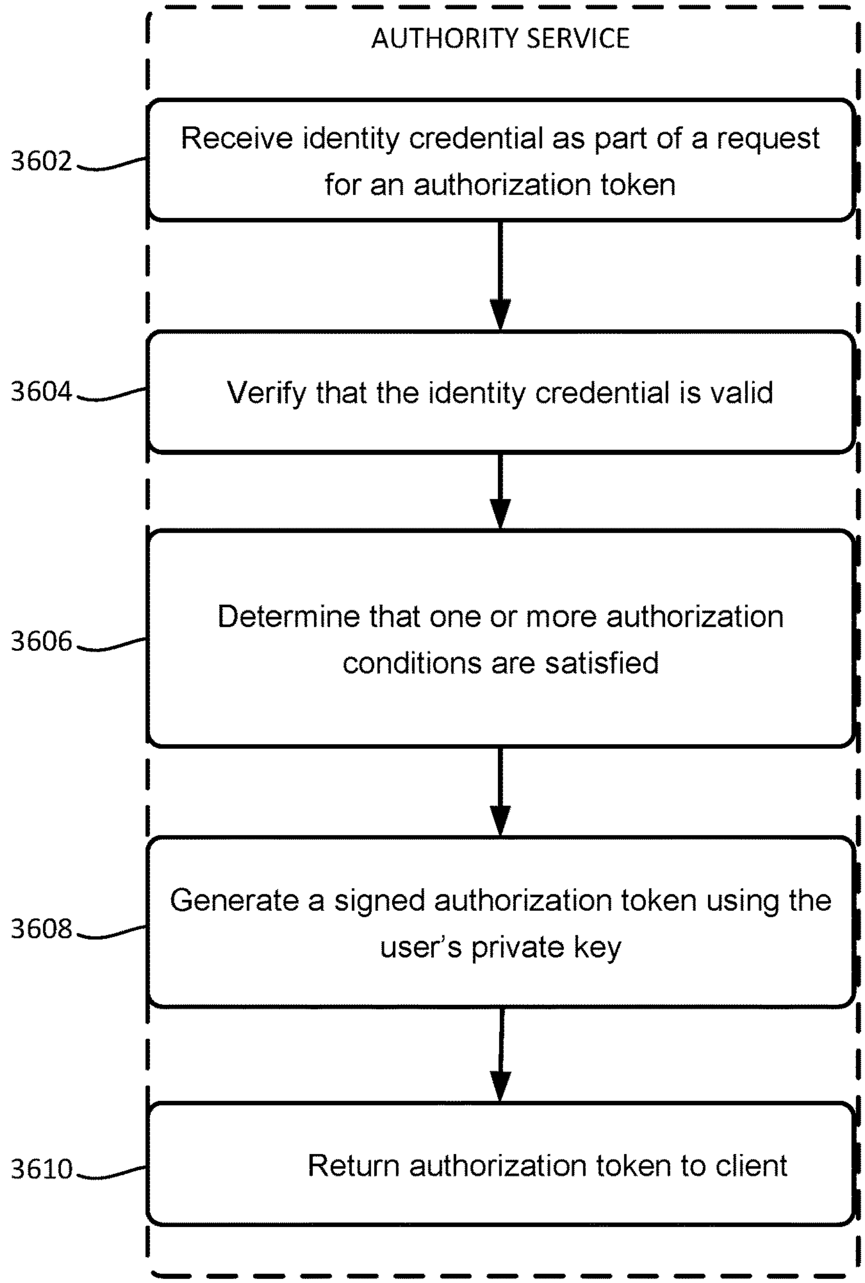
FIG. 36 shows an example of a method for generating an authorization token, according to some implementations.

FIG. 36 shows an example of a method for generating an authorization token, according to some implementations. The method in FIG. 36 can be used to implement block 3504 in FIG. 35 and includes functionality performed by an authority service (e.g., authority service 3020). At 3602, the authority service receives an identity credential. The identity credential is received as part of a request for an authorization token and can generally include any data by which the identity of the client's user can be established. The identity credential may, for example, include a username in combination with a password or access code. The identity credential can be sent to the authority service from a client (e.g., client 3010) or from a third party in response to a request from the client. For instance, a sign-on service provider may generate the identity credential as a sign-on token and communicate the sign-on token to the authority service on behalf of the client. In some instances, the identity credential may be supplied in connection with signing into the user's crypto wallet.

At 3604, the authority service verifies that the identity credential is valid, for example, that the username and password match a stored username and password. If the identity credential is a sign-on token (e.g., the OAuth token 3204), the authority service may verify a digital signature of the sign-on token, e.g., using a public key of the entity that created the sign-on token.

At 3606, the authority service determines that one or more authorization conditions are satisfied. The determination in 3606 can be based on information included in the identity credential, information included in the request for the authorization token and/or information about the client. Such information can indicate what type of access the client is requesting as well as the content that the client is requesting. The specificity of this information can vary. For instance, the information may indicate that the client is requesting streaming access to content from a library of a particular publisher but without specifying which content item in the library the client wants to access. The one or more authorization conditions can implement time based or other restrictions. For example, the identity credential may only be usable for obtaining access during certain time periods or may only be valid for certain types of content. The authorization conditions can also include quality of service conditions. For instance, a video resolution of streaming content can vary depending on the class of digital ticket or on the type of subscription associated with a user profile. In some instances, the authorization conditions may limit the number of times a digital ticket or sign-on token can be used to request an authorization token. For example, the digital ticket or the user identified by the sign-on token may be limited to a certain number of views or downloads. The one or more authorization conditions are typically specified by a content publisher to control access to their content and can be defined programmatically. In some implementations, the authorization conditions are specified as terms in a tenant contract associated with the authority service.

The determination in 3606 serves as a preliminary check on whether the client can proceed with requesting access to content managed by the content fabric. As described above, whether or not the client will be able to access content that is the subject of the access request depends on the terms of a digital contract associated with the content, e.g., the contract 3029.

At 3608, the authority service generates an authorization token in response to the determination in 3606 that the one or more authorization conditions are satisfied. The authorization token may be digitally signed by the authority service on behalf of the user. As such, the authorization token is usable for extracting the identity of the user for whom the authorization token is generated. In some implementations, the authorization token also indicates the access permissions that the presenter of the authorization token purportedly has, for example, read permission, permission to obtain a certain quality of service level, permission to transfer ownership of content, and/or the like.

At 3610, the authority service returns the authorization token to the client so that the client can present the authorization token in connection with an access request.

Figure 37:
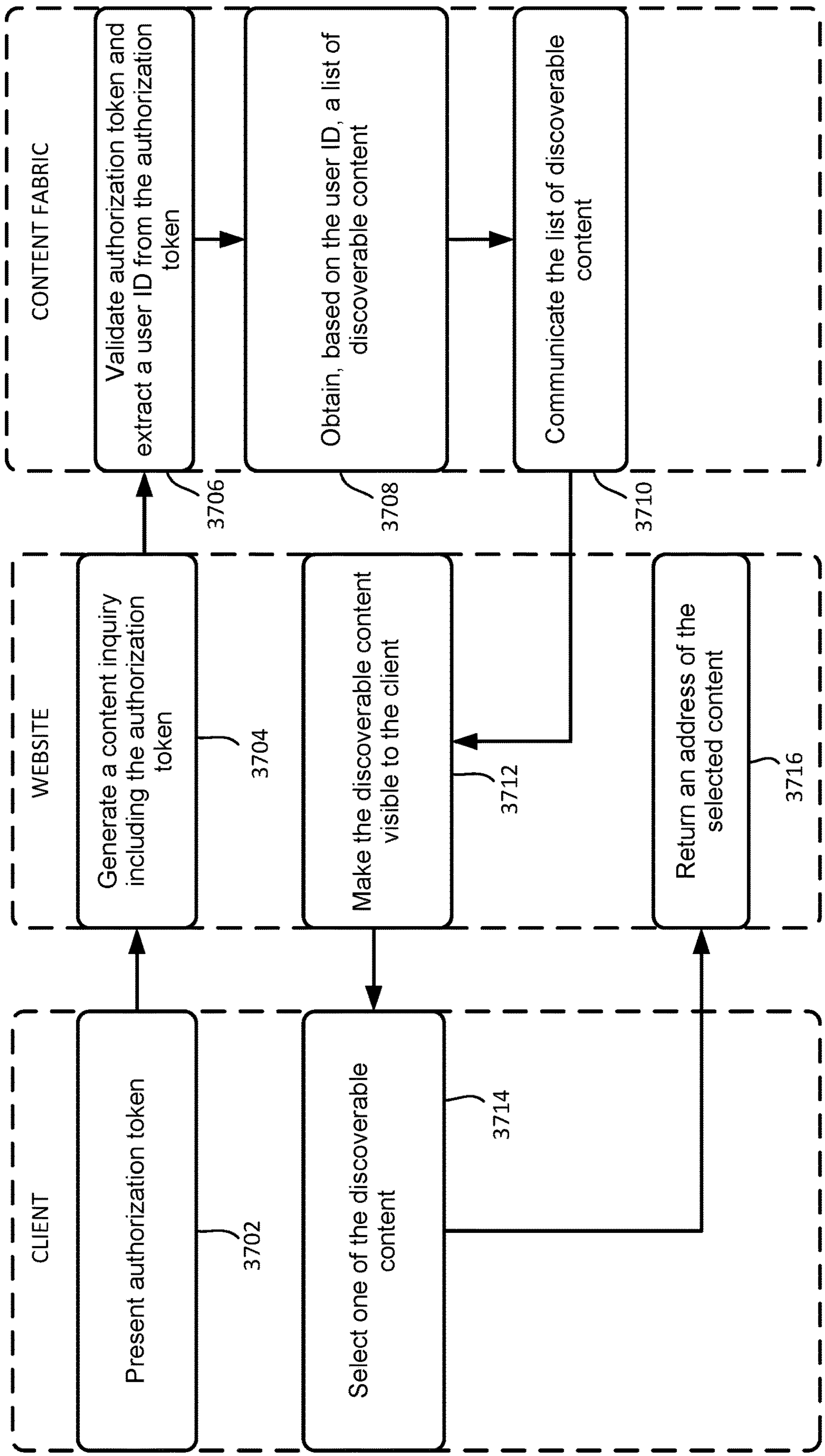
FIG. 37 shows an example of a method for making potentially accessible content visible to a client, according to some implementations.

FIG. 37 shows an example of a method for making potentially accessible content visible to a client, according to some implementations. The method in FIG. 37 can be used to implement block 3508 in FIG. 35 and includes functionality performed by a client (e.g., client 3010), a website (e.g., website 3030 or 3410), and a content fabric. Content managed by the content fabric can include publicly discoverable content (e.g., content visible to any user), content that is discoverable only for a subset of users (e.g., owners of such content), or both. The method in FIG. 37 can be performed to make discoverable content visible through the website. At 3702, the client presents an authorization token to the website. The authorization token can be generated according to the method of FIG. 36, based on an identity credential supplied by the client.

At 3704, the website generates a content inquiry and sends the inquiry to the content fabric. The inquiry includes the authorization token received from the client.

At 3706, the content fabric validates the authorization token to extract a user ID from the authorization token. The extracted user ID may, for example, be a blockchain address of the user's crypto wallet. The validation in 3706 can be performed in a similar manner as in block 3514 of FIG. 35.

At 3708, the content fabric obtains, based on the user ID, a list of discoverable content. In some implementations, the discoverable content is enumerated in a contract associated with the website. The website contract may, for example, include a list of user IDs and, for each user ID, a list of content that is discoverable for that user ID. Alternatively, the discoverable content can be identified based on an NFT contract. In the case of an NFT contract, invoking the NFT contract may return a list of NFTs owned by the user ID to indicate that the content represented by the listed NFTs is discoverable for the user. Content that is publicly discoverable need not be explicitly associated with any particular user ID. However, content that is discoverable only to select users can be specified in the website or NFT contract through associating such content with one or more user IDs that are permitted to discover such content.

At 3710, the content fabric communicates the list of discoverable content to the website.

At 3712, the website makes the content in the list of discoverable content visible to the client. The website can render the content visible using text and/or graphics, based on content metadata, NFT metadata, and/or other data available to the website. For instance, the website can present the names of content (e.g., titles), content descriptions, and/or thumbnail images representing content. In some implementations, the content metadata is communicated to the website from the content fabric prior to presentation of the authorization token in 3702. Alternatively or additionally, the content metadata can be communicated on a per inquiry basis so that only metadata associated with content discoverable for the user ID extracted from the authorization token is communicated to the website.

At 3714, the client selects one of the discoverable content, for example, by activating a corresponding hyperlink. In some instances, the selected content corresponds to an NFT template.

At 3716, the website returns an address of the selected content to the client. The address can be in the form of a QHASH. The client can then generate an access request to the content fabric and referencing the address.

It should be noted that, despite references to particular computing paradigms and software tools herein, computing device program instructions on which various implementations are based may correspond to any of a wide variety of programming languages, software tools and data formats, and be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols herein are merely by way of example. Suitable alternatives known to those of skill in the art may be employed.

Any of the computing devices described herein have components including one or more processors, memory devices, input/output systems, etc. electrically coupled to each other, either directly or indirectly, and in communication with each other, either directly or indirectly, for operative couplings. Such computing devices include clients as well as servers. For instance, computer code can be run using a processor in the form of a central processing unit such as an Intel processor or the like. Data and code can be stored locally on the computing device on computer-readable media, examples of which are described in greater detail herein. In some alternatives, portions of data and code can be stored on other computing devices in a network. A computing device can be implemented to have a processor system with a combination of processors. An input system of the computing device may be any combination of input devices, such as one or more keyboards, mice, trackballs, scanners, cameras, and/or interfaces to networks. An output system of the computing device may be any combination of output devices, such as one or more monitors, printers, and/or interfaces to networks.

Any of the modules, models, engines and operations described herein may be implemented at least in part as software code to be executed by a processor using any suitable computer language such as but not limited to C, Go, Java, and C++, by way of example only. The software code may be stored as a series of instructions or commands on a computer-readable medium for storage and/or transmission. Suitable computer-readable media include random access memory (RAM), read only memory (ROM), a magnetic medium such as a hard-drive or a floppy disk, an optical medium such as a compact disk (CD) or DVD (digital versatile disk), flash memory, and the like. The computer-readable medium may be any combination of such storage or transmission devices. Computer-readable media encoded with the software/program code may be packaged with a compatible computing device such as a client or a server as described above or provided separately from other devices. Any such computer-readable medium may reside on or within a single computing device or an entire computer system, and may be among other computer-readable media within a system or network. A computing device such as the clients described above may include a monitor, printer, or other suitable display for providing any of the results mentioned herein to a user.

While the subject matter of this application has been particularly shown and described with reference to specific implementations thereof, it will be understood by those skilled in the art that changes in the form and details of the disclosed implementations may be made without departing from the spirit or scope of this disclosure. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope should not be limited by reference to such advantages. Rather, the scope should be determined with reference to the appended claims.

What is claimed is:

1. A system comprising:

one or more memory devices; and one or more processors associated with the one or more memory devices and with a plurality of fabric nodes of a network, the fabric nodes being configurable to provide digital content corresponding to a plurality of content object parts maintained in the network, and one or more of the fabric nodes being configurable to:

determine a user identifier (ID) associated with a request from a client for the digital content;

determine satisfaction of one or more rules controlling access to the digital content based on at least:

obtaining a digital instrument using a blockchain ledger, the digital instrument configured to be processed for cryptographical verification of an owner of the digital content, the digital instrument having been generated for the digital content before the request from the client, and determining, based on the digital instrument, that the user ID matches the owner of the digital content; and provide for delivery of the digital content to the client in response to determining satisfaction of the one or more rules.

2. The system of claim 1, wherein the digital instrument comprises a unique ID mapped to an ID associated with the owner of the digital content.

3. The system of claim 2, wherein the digital instrument is a non-fungible token stored as part of a hash map in the blockchain ledger.

4. The system of claim 2, wherein the unique ID of the digital instrument is included in the request from the client.

5. The system of claim 1, the one or more of the fabric nodes being further configurable to:

locate the digital instrument based on a content hash included in the request from the client, the content hash having been generated before the request from the client, through a one-way hash operation on the digital content.

6. The system of claim 1, wherein the user ID is an address of a cryptocurrency wallet.

7. The system of claim 1, the one or more of the fabric nodes being further configurable to:

update the digital instrument in the blockchain ledger as part of transferring ownership of the digital content to a different owner.

8. The system of claim 1, wherein the digital instrument is associated with a first instance of the digital content, the one or more of the fabric nodes being further configurable to provide for delivery of a second instance of the digital content based on a second digital instrument.

9. The system of claim 8, wherein the first instance of the digital content is deliverable to the client as a live stream, and wherein the second instance of the digital content is deliverable to a second client as a separate live stream.

10. The system of claim 1, wherein the digital content comprises one or more of the following: audio, video, a digital image, an electronic document, or a software program.

11. A non-transitory computer-readable medium storing program code executable by one or more processors associated with a plurality of fabric nodes of a network, the fabric nodes being configurable to provide digital content corresponding to a plurality of content object parts maintained in the network, the program code configurable to cause:

determining a user identifier (ID) associated with a request from a client for the digital content;

determining satisfaction of one or more rules controlling access to the digital content based on at least:

obtaining a digital instrument using a blockchain ledger, the digital instrument configured to be processed for cryptographical verification of an owner of the digital content, the digital instrument having been generated for the digital content before the request from the client, and determining, based on the digital instrument, that the user ID matches the owner of the digital content; and providing for delivery of the digital content to the client in response to determining satisfaction of the one or more rules.

12. The non-transitory computer-readable medium of claim 11, wherein the digital instrument comprises a unique ID mapped to an ID associated with the owner of the digital content.

13. The non-transitory computer-readable medium of claim 12, wherein the digital instrument is a non-fungible token stored as part of a hash map in the blockchain ledger.

14. The non-transitory computer-readable medium of claim 12, wherein the unique ID of the digital instrument is included in the request from the client.

15. The non-transitory computer-readable medium of claim 11, the program code further configurable to cause:

locating the digital instrument based on a content hash included in the request from the client, the content hash having been generated before the request from the client, through a one-way hash operation on the digital content.

16. The non-transitory computer-readable medium of claim 11, wherein the user ID is an address of a cryptocurrency wallet.

17. The non-transitory computer-readable medium of claim 11, the program code further configurable to cause:

updating the digital instrument in the blockchain ledger as part of transferring ownership of the digital content to a different owner.

18. The non-transitory computer-readable medium of claim 11, wherein the digital instrument is associated with a first instance of the digital content, the program code further configurable to cause:

providing for delivery of a second instance of the digital content based on a second digital instrument.

19. The non-transitory computer-readable medium of claim 18, wherein the first instance of the digital content is deliverable to the client as a live stream, and wherein the second instance of the digital content is deliverable to a second client as a separate live stream.

20. The non-transitory computer-readable medium of claim 11, wherein the digital content comprises one or more of the following: audio, video, a digital image, an electronic document, or a software program.

21. A method associated with a plurality of fabric nodes of a network, the fabric nodes being configurable to provide digital content corresponding to a plurality of content object parts maintained in the network, the method comprising:

determining a user identifier (ID) associated with a request from a client for the digital content;

determining satisfaction of one or more rules controlling access to the digital content based on at least:

obtaining a digital instrument using a blockchain ledger, the digital instrument configured to be processed for cryptographical verification of an owner of the digital content, the digital instrument having been generated for the digital content before the request from the client, and determining, based on the digital instrument, that the user ID matches the owner of the digital content; and providing for delivery of the digital content to the client in response to determining satisfaction of the one or more rules.

22. The method of claim 21, wherein the digital instrument comprises a unique ID mapped to an ID associated with the owner of the digital content.

23. The method of claim 22, wherein the digital instrument is a non-fungible token stored as part of a hash map in the blockchain ledger.

24. The method of claim 22, wherein the unique ID of the digital instrument is included in the request from the client.

25. The method of claim 21, further comprising:

locating the digital instrument based on a content hash included in the request from the client, the content hash having been generated before the request from the client, through a one-way hash operation on the digital content.

26. The method of claim 21, wherein the user ID is an address of a cryptocurrency wallet.

27. The method of claim 21, further comprising:

updating the digital instrument in the blockchain ledger as part of transferring ownership of the digital content to a different owner.

28. The method of claim 21, wherein the digital instrument is associated with a first instance of the digital content, the method further comprising:

providing for delivery of a second instance of the digital content based on a second digital instrument.

29. The method of claim 28, wherein the first instance of the digital content is delivered to the client as a live stream, and wherein the second instance of the digital content is delivered to a second client as a separate live stream.

30. The method of claim 21, wherein the digital content comprises one or more of the following: audio, video, a digital image, an electronic document, or a software program.

* * * * *